United States Patent [19]

Nimura et al.

[11] Patent Number: 5,537,324
[45] Date of Patent: Jul. 16, 1996

[54] NAVIGATION SYSTEM

[75] Inventors: Mitsuhiro Nimura, Okazaki; Kyomi Morimoto, Nishio; Yasunobu Ito, Okazaki; Shigekazu Ohara, Chiryu, all of Japan

[73] Assignee: Aisin Aw Co., Ltd., Japan

[21] Appl. No.: 284,111

[22] Filed: Aug. 2, 1994

[30] Foreign Application Priority Data

Aug. 7, 1993 [JP] Japan .................................. 5-214964
Dec. 24, 1993 [JP] Japan .................................. 5-327460
Dec. 27, 1993 [JP] Japan .................................. 5-332823

[51] Int. Cl.⁶ .............................................. G06F 165/00
[52] U.S. Cl. ........................... 364/449; 364/443; 340/990; 340/995
[58] Field of Search .................... 364/443, 444, 364/449; 73/178 R; 340/988, 990, 995

[56] References Cited

U.S. PATENT DOCUMENTS

| 4,954,958 | 9/1990 | Savage et al. | 364/444 |
| 4,974,170 | 11/1990 | Bouve et al. | 364/444 |
| 5,365,449 | 11/1994 | Kashiwazaki | 364/449 |

FOREIGN PATENT DOCUMENTS

| 1173823 | 7/1989 | Japan . |
| 1173820 | 7/1989 | Japan . |
| 2-3899 | 1/1990 | Japan . |
| 236653 | 2/1990 | Japan . |
| 2187898 | 7/1990 | Japan . |
| 4251284 | 9/1992 | Japan . |
| 519684 | 1/1993 | Japan . |
| 5165401 | 7/1993 | Japan . |
| 5303335 | 11/1993 | Japan . |
| 5313580 | 11/1993 | Japan . |
| 5334373 | 12/1993 | Japan . |
| 5333768 | 12/1993 | Japan . |
| 666584 | 3/1994 | Japan . |
| 666578 | 3/1994 | Japan . |

Primary Examiner—Gary Chin
Attorney, Agent, or Firm—Lorusso & Loud

[57] ABSTRACT

A navigation system includes a first information storage device containing stored map data and a display unit for displaying a map by reading the map data. Provision is made for setting a point on the map displayed by the display unit and for inputting a telephone number. A second information storage device is provided for registering the input telephone number in correlation with the positional coordinates of the set point.

12 Claims, 51 Drawing Sheets

FIG.2A

TEL NO.— POSITION LIST

| NO. OF REGISTRATION | | |
|---|---|---|
| TEL NO. | EAST LONGITUDE | NORTH LATITUDE |
|  |  |  |

FIG.2B

MEMORY POINT LIST

| NO. OF MEMORY POINTS | | | | |
|---|---|---|---|---|
| MARK NO. | NAME | EAST LONGITUDE | NORTH LATITUDE | TEL NO. |
|  |  |  |  |  |

SETTING OF DESTINATION BY INPUTTING TEL. NO.

FIG.15 (a)
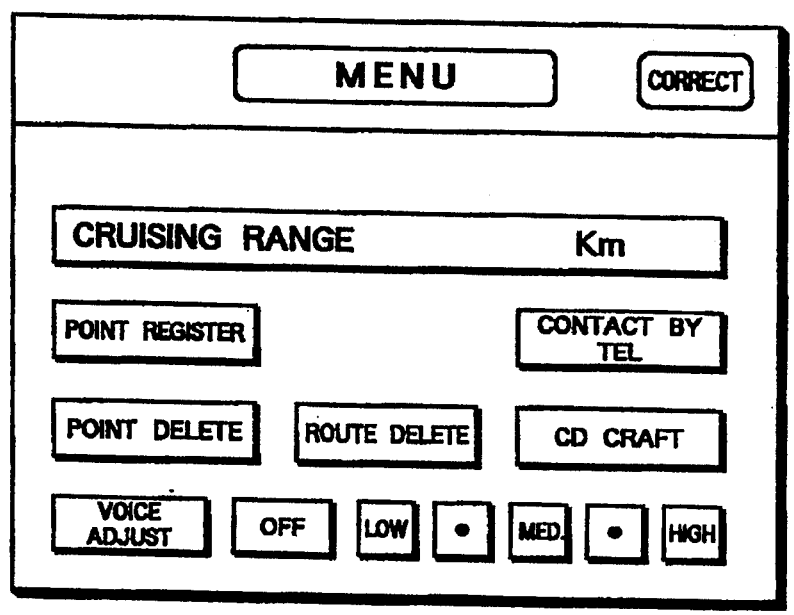
 
FIG.15 (b)
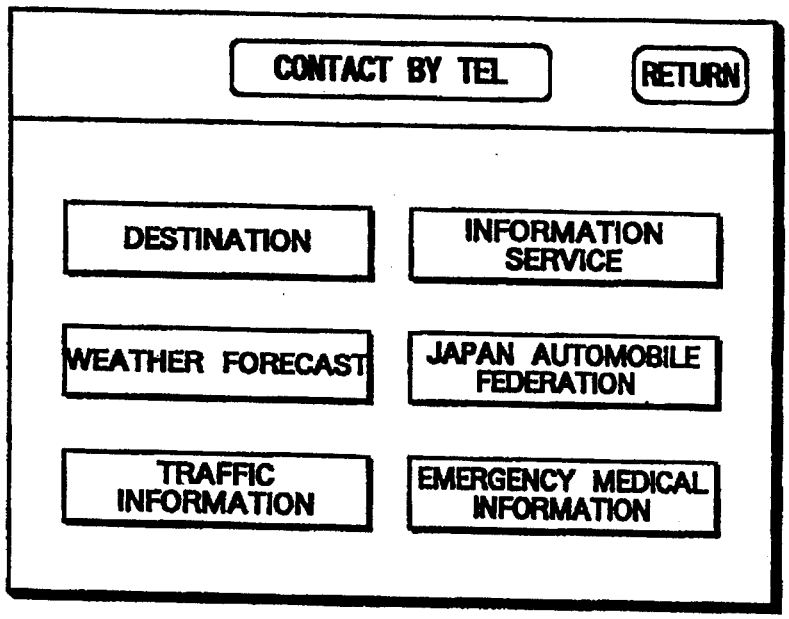
 

FIG.20

| NO.(n) | |
|---|---|
| 1 | STARTING TOLL/LOCAL NO. |
| | ENDING TOLL/LOCAL NO. |
| | NO. OF TRAFFIC INFORMATION CENTER |
| ⋮ | ⋮ |
| n | |

| NO.(ℓ) | |
|---|---|
| 1 | NAME OF CENTER |
| | TEL NO. |
| ⋮ | ⋮ |
| ℓ | |

| NO.(n) | |
|---|---|
| 1 | STARTING TOLL/LOCAL NO. |
| | ENDING TOLL/LOCAL NO. |
| | NAME OF TRAFFIC INFORMATION CENTER |
| | TEL NO. OF TRAFFIC INFORMATION CENTER |
| ⋮ | ⋮ |
| n | |

FIG.23 (a)
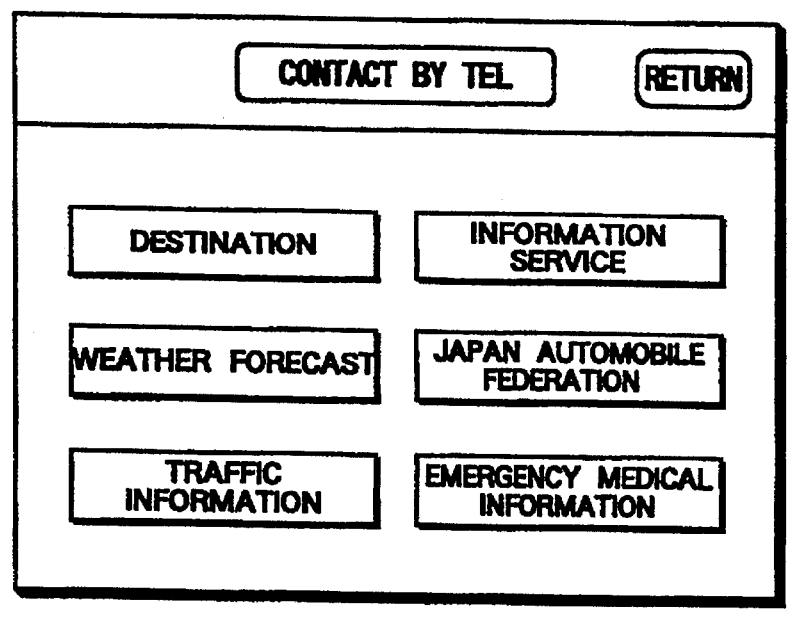
 
FIG.23 (b)
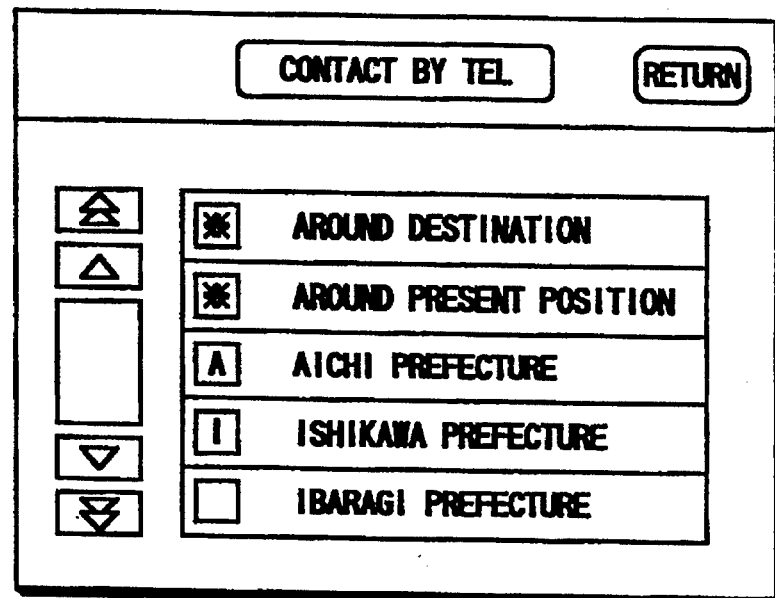
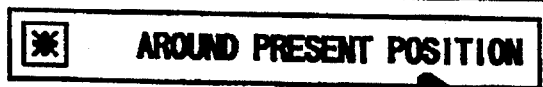 

FIG.26 (b)

| DESTINATION NO. |
|---|
| NAME |
| COORDINATE |
| TEL. NO. |

FIG.26 (c)

| BLANK |
|---|
| ADDRESS NAME |
| COORDINATE |
| INPUTTED TEL. NO. |

FIG.26 (d)

| BLANK |
|---|
| ADDRESS NAME |
| COORDINATE |
| BLANK |

FIG.26 (e)

| TOLL NO. |
|---|
| LOCAL NO. |
| SUBSCRIBER'S NO. |

TEL NO. RETRIEVED
FOR DESTINATION REGISTRATION

FIG.28 (c)

FOR ENTRY OF DESTINATION BY TEL.

| CONTACT BY TEL. | RETURN |

PLACE OF CONTACT :
AROUND HIGASHI – KU, NAGOYA – CITY

TEL NO. 052 – 682 – 4141

TRANSMISSION

INDICATE ADDRESS AROUND DESTINATION

FIG.28 (a)
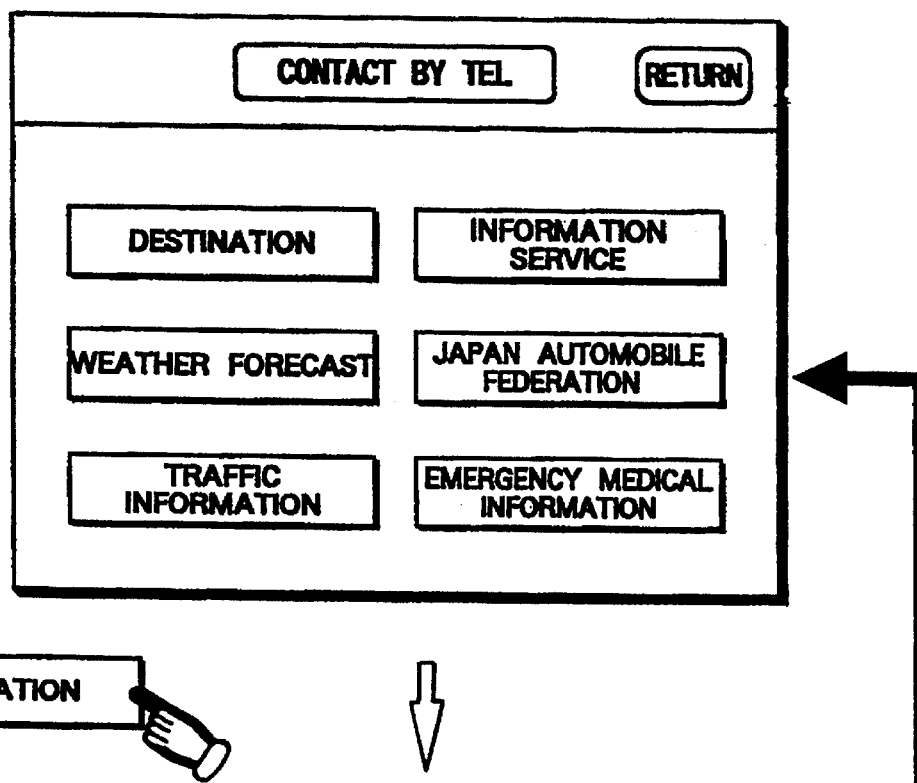
FIG.28 (d)  NO TEL NO. RETRIEVED
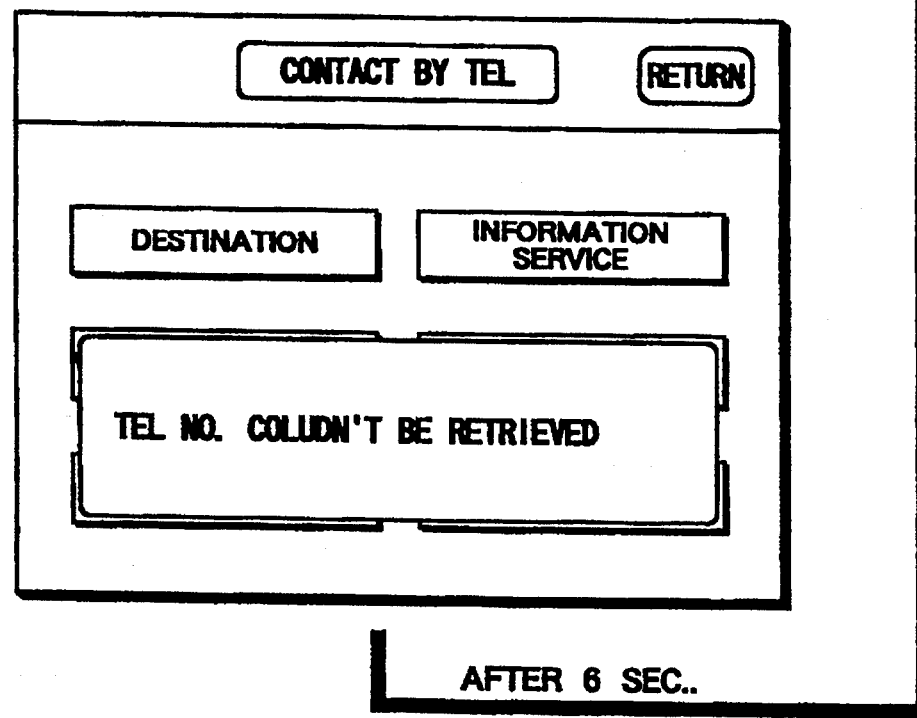

FIG.29 (b)
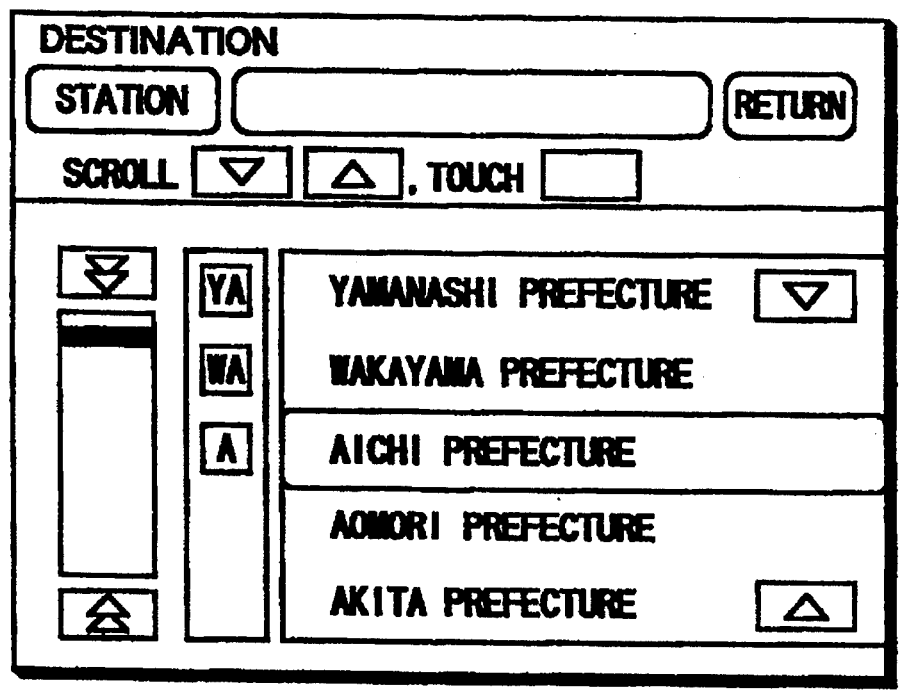
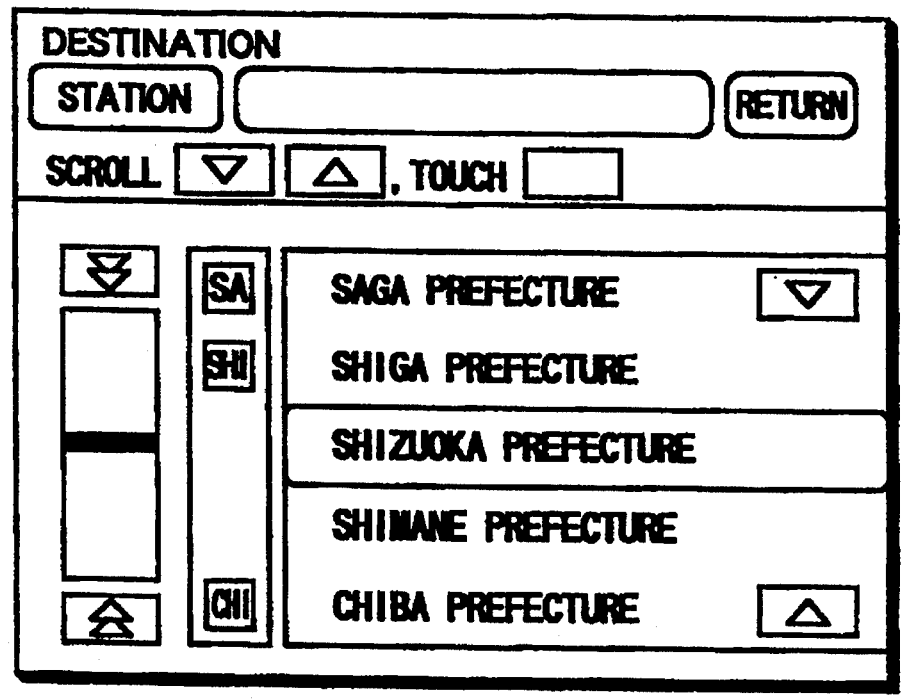

FIG.29 (c)
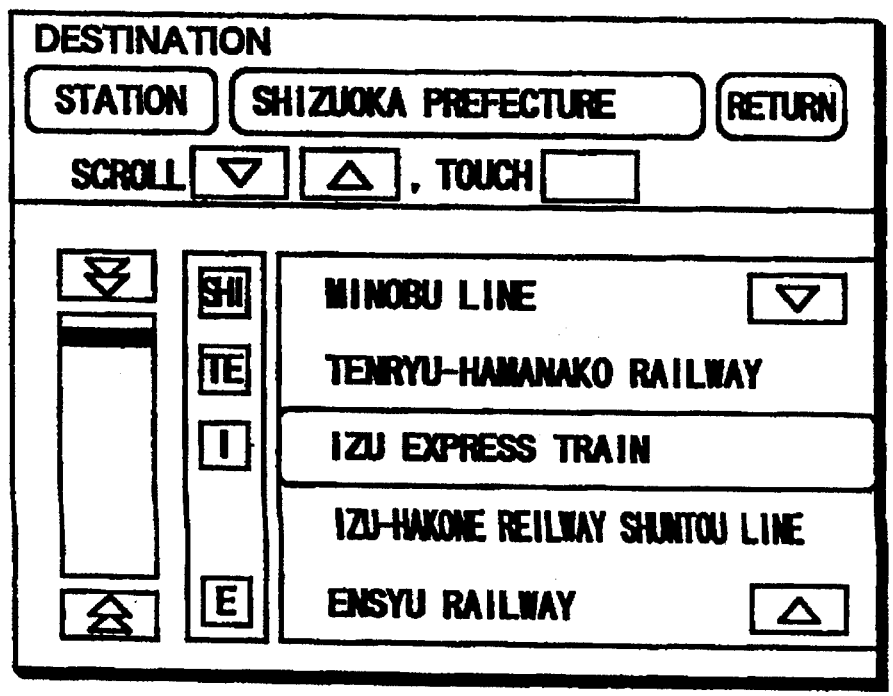
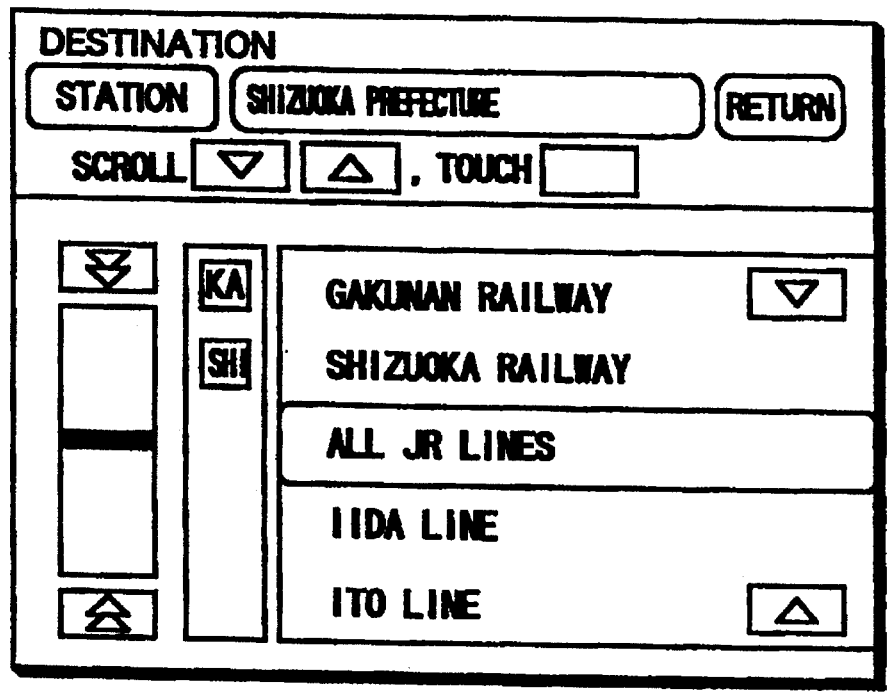

FIG.30
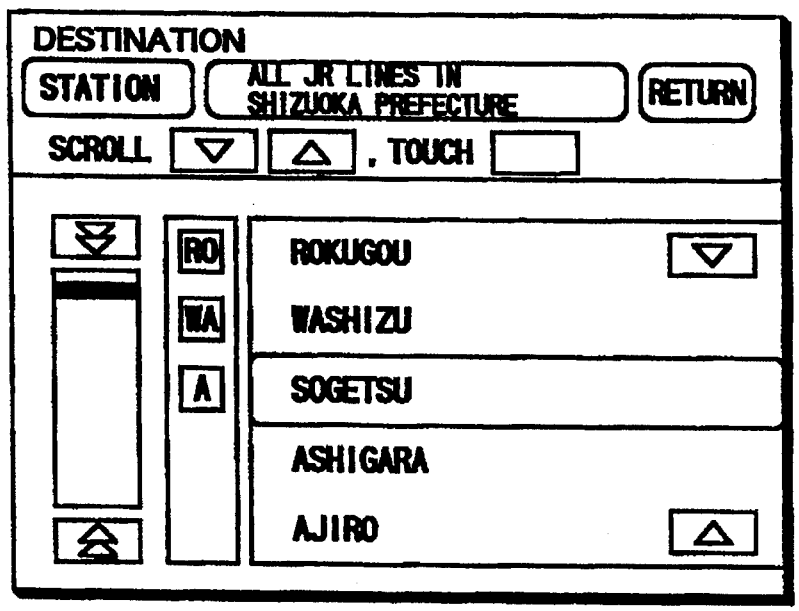
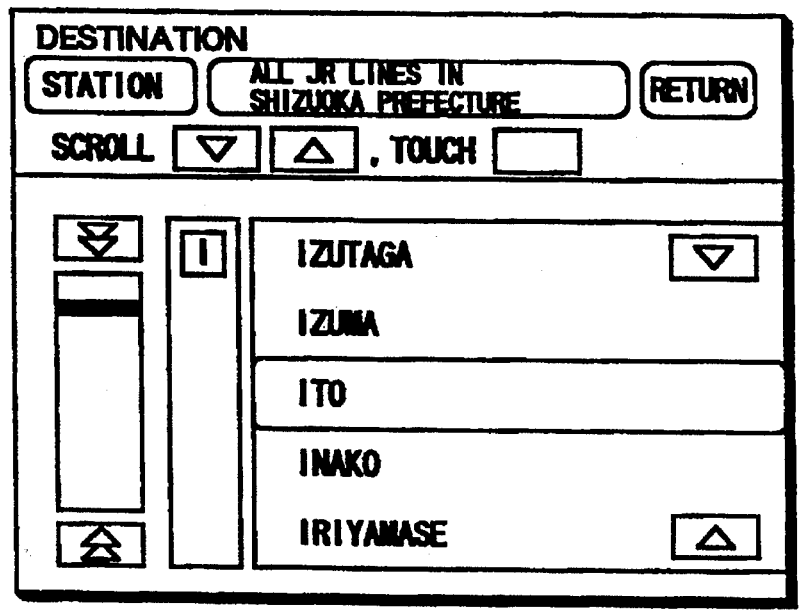

NAVIGATION SYSTEM

BACKGROUND OF THE INVENTION

1. Field of the Invention

The present invention relates to a navigation system capable of registering a telephone number for a set point.

2. Related Art

A navigation system guides a user along a route so that the user can drive his car safely to a first destination. In recent years, techniques for improving the performance and functions such as accuracy, operability and visibility of navigation have been vigorously pursued, resulting in a variety of systems. A typical navigation system is equipped with a display screen to be used for setting the route, to be opened automatically or upon request of the driver at the time of route guidance. The navigation system provides, on its display screen after the start of guidance, at least: section maps for guidance over a wide area covering several sections of the set whole route, including the section currently being travelled; and an intersection map for guidance at intersections.

The navigation system not only displays section maps and intersection maps but also: provides the remaining distance and information such as the name or turning direction for an intersection, so that the route may be followed without fail; teaches landmarks so that the route can be confirmed during the drive; guides along the route not only by visual display but also by voice; displays the route on the map so that the guidance may be provided on the displayed route for the actual drive; and scrolls the map automatically along the route so that the route can be confirmed.

In such navigation systems, in order to set the route, it is necessary to input the starting point and the destination. When the starting point and the destination are input, route retrieval is executed from the road information data around and between the starting point and the destination, so that the optimum of a plurality of routes is set. As the method of inputting the starting point and the destination, there have been proposed: a method by which the positions to be registered such as the starting point or the destination are classified by genre, e.g., sight-seeing, parking areas or restaurants, or coded according to the areas such as prefectures or cities so that the codes may be input; a method by which not only the code number is input but also a menu is displayed so that the items in the menu may be sequentially selected and input; a method by which node data are joined to define road networks so that the position may be input in terms of east longitudes and north latitudes; and a method by which a telephone number is input. In another method, not only the route between two points of the present position (or an arbitrary staring point) and the destination is retrieved, but also the priority of the transit point or the toll road is specified for retrieval.

As examples of the system of this kind: a telephone number inputting system is disclosed in Japanese Patent Laid-Open No. 187898/1990; a genre or code number inputting system is disclosed in Japanese Patent Laid-Open No. 173820/1989; a destination setting system according to the code number is disclosed in Japanese Patent Laid-Open No. 173823/1989; and a system capable of inputting the desired transit point is disclosed in Japanese Patent Laid-Open No. 3899/1990.

For the telephone number inputting system, however, as a practical matter it is difficult to store identification of locations corresponding to all telephone numbers in the memory, because the data is excessively massive. In the system of the prior art, therefore, the locations corresponding to specific telephone numbers and the positions of representative points for areas corresponding to toll/local exchange (area code) are stored as data in a CD-ROM or the like. When an input telephone number is specifically matched with stored data, the map around the position corresponding to that telephone number is displayed on the screen. For other telephone numbers, however, the map around the representative point of the toll/local exchange number is displayed.

In case, therefore, a telephone number of a personal subscriber is input, the map displayed is for the area around the representative point for the toll/local exchange number. Thus, there arises a problem that the positional accuracy in the calling up of the map is insufficient.

SUMMARY OF THE INVENTION

In order to solve the above-specified problem, therefore, the present invention has an object to provide a telephone number inputting type navigation system which can easily retrieve the position corresponding to a telephone number frequently used by the user.

In order to achieve this object, according to a feature of the present invention, there is provided a navigation system comprising: map data: display means for displaying a map by reading the map data; point setting means for setting a point on the map displayed by the display means; telephone number input means for inputting a telephone number; and storage means for registering the telephone number inputted by the telephone number input means correlated with the positional coordinates of the point set by the point setting means.

According to another feature of the present invention, there is provided a navigation system for guiding on the basis of set point coordinates, comprising: map data; a stored listing with telephone numbers correlated with coordinates; telephone number input means for inputting a telephone number; retrieval means for retrieving the coordinates from the list on the basis of the telephone number inputted; display means for displaying a map by reading the map data on the basis of the retrieved coordinates; point setting means for setting a point on the map displayed by the display means; storage means for registering the telephone number inputted by the telephone number input means in correlation with the positional coordinates of the point set by the point setting means, when it is decided by the retrieval means that the inputted telephone number is not already in the list; and point coordinate setting means for setting the positional coordinates set by the point setting means, as point coordinates.

According to still another feature of the present invention, there is provided a navigation system for guiding on the basis of set point coordinates, comprising: map data; a list of telephone numbers and correlated coordinates; telephone number input means for inputting a telephone number; retrieval means for retrieving the coordinates from the list on the basis of the telephone number inputted; display means for displaying a map by reading the map data on the basis of the coordinates of a point representative of the toll/local exchange portion of the telephone number, when it is decided by the retrieval means that the inputted telephone number is not in the list; point setting means for setting a point on the map displayed by the display means; storage means for registering in the list the telephone number inputted by the telephone number input means correlated with the positional coordinates of the point set by the point setting means; and point coordinate setting means for setting the coordinates retrieved from the list, as point coordinates, when it is decided by the retrieval means that the inputted telephone number is in the list, and for setting the positional coordinates set by the point setting means, as point coordinates when it is decided by the retrieval means that the inputted telephone number is not in the list.

The navigation system according to the present invention includes: map data: display means for displaying a map by reading the map data; point setting means for setting a point on the map displayed by the display means; telephone number input means for inputting a telephone number; and storage means for registering the telephone number inputted by the telephone number input means and the positional coordinates of the point set by the point setting means in correlation with the input telephone number. As a result, the telephone number can be registered in correlation with the positional coordinates of the point inputted, so that the positional coordinates can be detected from the telephone number.

The navigation system for guiding on the basis of set point coordinates in accordance with the present invention includes: map data; a list of telephone numbers and correlated with coordinates; telephone number input means for inputting a telephone number; retrieval means for retrieving the coordinates from the list on the basis of the telephone number inputted; display means for displaying a map by reading the map data on the basis of the coordinates; point setting means for setting a point on the map displayed by the display means; storage means for registering the telephone number inputted by the telephone number input means in correlation with the positional coordinates of the point set by the point setting means, when it is decided by the retrieval means that the inputted telephone number is not in the list; and point coordinate setting means for setting the positional coordinates set by the point setting means, as point coordinates. Thus, when the point corresponding to the telephone number input by the telephone number input means is not in the stored list of telephone numbers and corresponding coordinates, the point corresponding to the telephone number has its positional coordinates registered together with the telephone number and is set as the point coordinates. As a result, when the user inputs the same telephone number again, the positional coordinates of the point stored corresponding to the telephone number can be read out to set the point easily.

The navigation system for guiding on the basis of set point coordinates according to the present invention includes: map data; a stored list of telephone numbers and corresponding coordinates; telephone number input means for inputting a telephone number; retrieval means for retrieving the coordinates from the list on the basis of the telephone number inputted; display means for displaying a map by reading the map data on the basis of the coordinates of a point representative of the toll/local exchange portion of the telephone number, in case it is decided by the retrieval means that the inputted telephone number is not in the list; point setting means for setting a point on the map displayed by the display means; storage means for registering in the list the telephone number inputted by the telephone number input means and the corresponding positional coordinates of the point set by the point setting means; and point coordinate setting means for setting the coordinates retrieved from the list, as point coordinates, in case it is decided by the retrieval means that the inputted telephone number is in the list, and for setting the positional coordinates set by the point setting means, as point coordinates in case it is decided by the retrieval means that the inputted telephone number is not in the list. Thus, in case the telephone number inputted by the telephone number input means is not in the list, the positional coordinates of the representative point are read out from the toll/local exchange portion of the telephone number, and the map corresponding to those coordinates is read out of the map data and displayed in the display means. Then, the point is set on that map, and the inputted telephone number and the positional coordinates of the set point are stored in the list so that the positional coordinates of the point are set as the positional coordinates for the input telephone number. In case the inputted telephone number is in the list, the positional coordinates corresponding to the telephone number are read out and set as the point coordinates. As a result, if the user inputs the same telephone number again, the positional coordinates of the stored point corresponding to the telephone number can be read out so that the point can be easily set.

BRIEF DESCRIPTION OF THE DRAWINGS

FIGS. 2A and 2B are diagrams showing examples of the construction of a list for inputting telephone numbers;

FIG. 20 is a diagram showing an example of the structure of data to be used for retrieving the traffic information center from a toll/local exchange telephone number;

DESCRIPTION OF THE PREFERRED EMBODIMENTS

Figure 1:
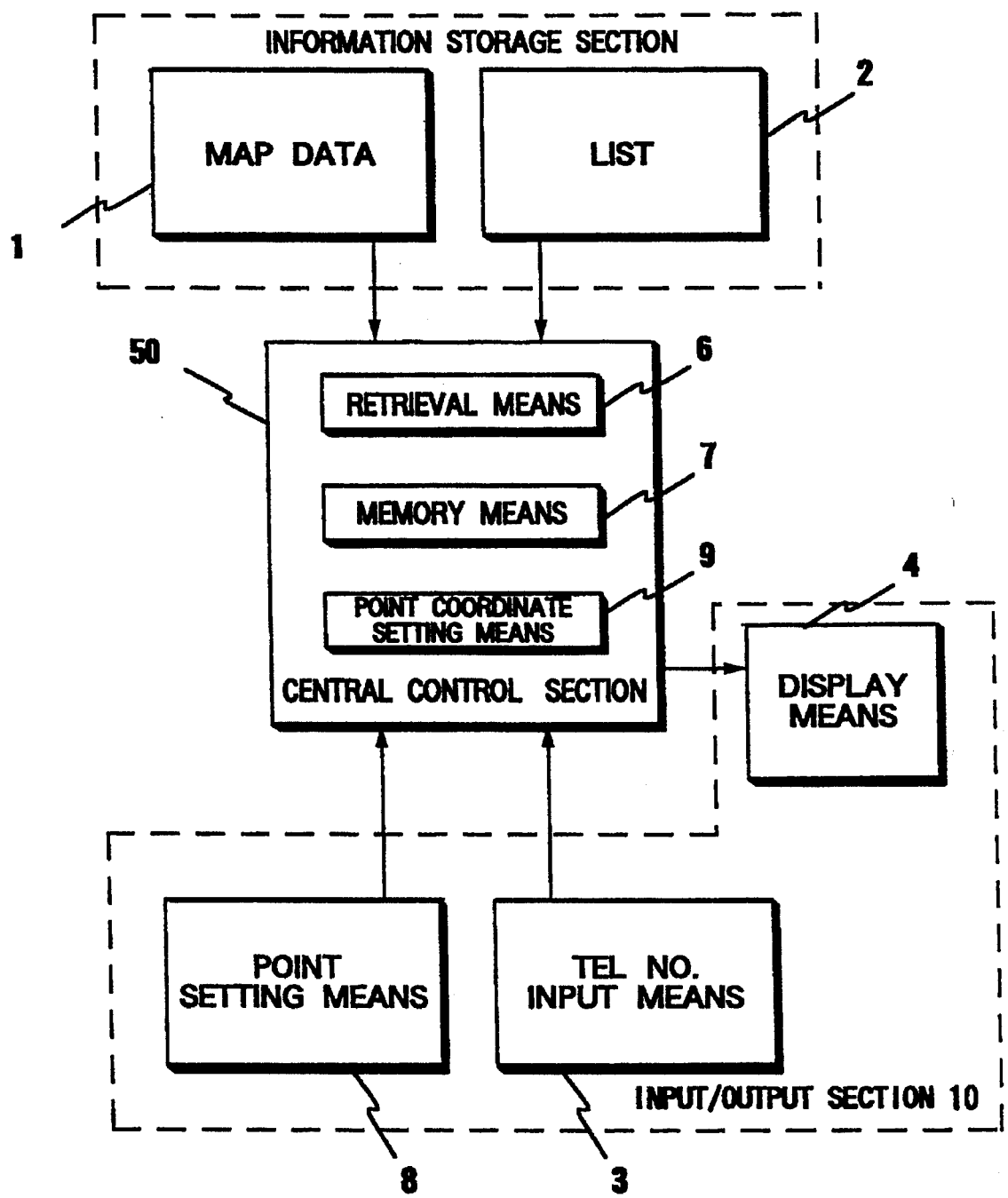
FIG. 1 is a block diagram showing one embodiment of a telephone number inputting type navigation system according to the present invention.

In FIG. 1, map data 1 includes at least positional information and the graphic information of a map to be used for setting a point. A list 2 includes coordinates on the map correlated with telephone numbers stored in advance in memory means such as a CD-ROM. Telephone number input means 3 is composed of switches such as ten keys for inputting a telephone number, numeral selecting keys and a shift key. Display means 4 not only reads and displays the map data 1 for the vicinity around the coordinates corresponding to the telephone number inputted by the telephone number input means 3, for example, and but also displays a map by reading the corresponding map data 1 responsive to another input. Point setting means 8 inputs the coordinates of a point designated by an input through a touch panel or a decision key or through a position cursor on the map displayed by the display means 4. The central control section 50 includes: memory means 7 for storing the telephone number inputted by the telephone number input means 3 and the positional coordinates of a point set by point settling means 8, correlated with the input telephone number; retrieval means 6 for determining whether or not a telephone number input by the telephone number input means 3 is prestored in memory; and point coordinate setting means 9 for setting the positional coordinates of the point set by the point setting means 8, as the point coordinates. The memory means 7 is constructed of a programmable memory such as a RAM or a floppy disc, and is stored with a list such as that shown in FIG. 2(b). Moreover, the prestored list 2, in which the telephone numbers and the coordinates on the map correspond to one another, is exemplified by the telephone number-position list, as shown in FIG. 2(a).

When a telephone number is input by the telephone number input means 3, for example, it is determined whether or not the inputted telephone number is stored in the list 2. If the answer is YES, the positional coordinates corresponding to the telephone number are read out, and the map data for the vicinity around the positional coordinates is read out and displayed in the display means 4. If the inputted telephone number is not stored in the list 2, it is determined whether or not the telephone number is stored in the memory means 7. If the answer is YES, the map is displayed like before. Otherwise, the map data 1 is read out with reference to the coordinates of the point representative of the toll/local exchange portion of the telephone number, and the map is displayed. Moreover, when the user wants to display and set a desired point and to register it, the point can be stored and registered in the memory means. Then, the desired point can be easily recalled by inputting its corresponding telephone number. Alternatively, when the inputted telephone number is not stored in the list 2 or the memory means 7, the map may be scrolled, and the point may be set. If, in this case, the set point is apart a predetermined distance or more from the representative point of the toll/local exchange number, it is decided that an input error has been made, and the telephone number may not be stored in the list. Furthermore, an input error may be decided by prestoring not only a representative position for the toll/local exchange number but also a range corresponding to the toll/local exchange number.

In the present embodiment, the data to be retrieved by the by the retrieval means is exemplified by the data (of the list 2) stored in advance in the CD-ROM or the like and the data (of the memory means 7) written by the user, but may have a programmable data construction.

The telephone number position list, as shown in FIG. 2A, registers the coordinates corresponding to the telephone numbers in terms of east longitudes and north latitudes, and its registration is carried out, for example, by inputting a telephone number to display a map of the vicinity around the representative point of the toll/local number and by retrieving and setting the corresponding position. If the telephone number and the coordinates are thus registered in the telephone number-position list, a map around the vicinity of the position of the coordinates is drawn when the telephone number is inputted.

The present embodiment utilizes the two list architectures, as described above. However, no special restrictions are imposed upon the list architecture and, accordingly, the list architecture can be modified in various manners.

The memory point list, as shown in FIG. 2B, is one which is registered in the memory by the user. This list contains a column of telephone numbers, in addition to columns of mark numbers, names of towns and addresses, east longitudes and north latitudes.

Figure 3:
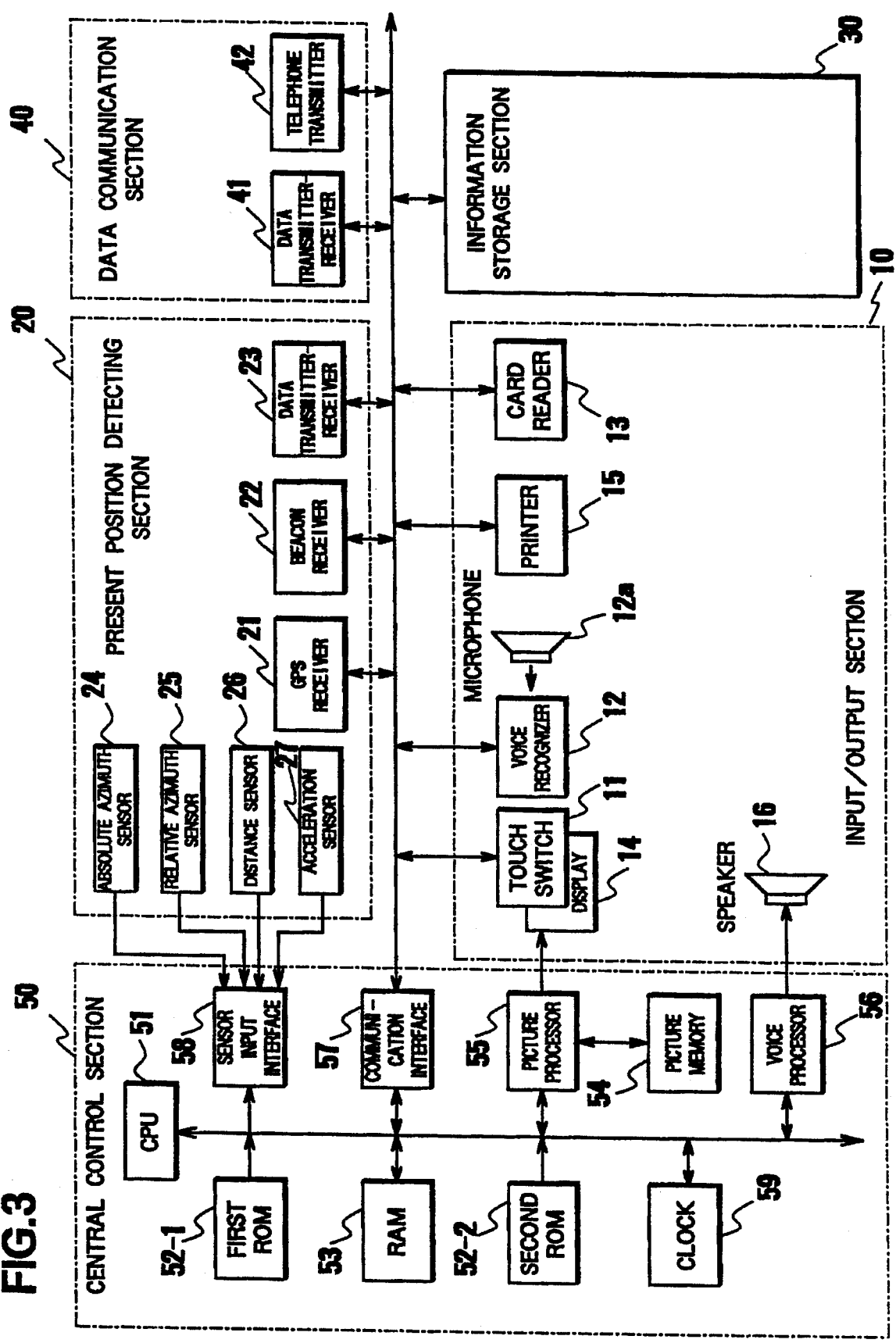
FIG. 3 is a block diagram showing an example of the construction of the individual sections of the navigation system.

FIG. 3 shows an example of the construction of the individual sections of the navigation system which include: an input/output section 10 for inputting/outputting information for a route guide; a present position detecting section 20 for detecting information on the present position of the user's vehicle; information storage section 30 stored with navigation data necessary for calculating the route and display guide data necessary for the guidance; a data communication section 40 for transmissions and receptions of navigation data to/from an information source such as an information center or an electronic note or for contacts-by-telephone; and a central control section 50 for executing the display and guide necessary for the route retrieval and guidance and for controlling the entire system.

The input/output section 10 functions to input a destination, to instruct the central control section 50 of the nature of the navigation desired by the user, so that the guide information may be given in voice and/or by screen display when the driver so desires, and to print out the processed data and the communication data. As the means for realizing these functions, the input section includes: switches 11 such as touch switches or key switches for inputting a point such as a destination or a passed point in terms of a telephone number or coordinates so as to set it, for requesting the route guide and for switching the modes; a voice recognizer 12; and a card reader 13 for reading out the data stored in an IC card or a magnetic card. On the other hand, the output section includes: a display 14 for displaying the input data on the screen or the route guide automatically, in response to the request of the driver; a printer 15 for printing the data processed by the central control section 50, the data stored in the information storage section 30, and the transmission data received from the information center; and a speaker 16 for outputting the route guide in voice.

The display 14 is constructed of a color CRT or a color liquid crystal display and displays in colors, not only all the screens necessary for the navigation, such as a route setting screen based upon the map data and guide data processed by the central control section, a section map screen and an intersection map screen, but also buttons in the main screen for setting the route guide, for guiding the route guidance and for switching the screens. Especially, information on a passed intersection, such as the name of the passed intersection, is occasionally popped up and displayed in colors in the section map diagram.

This display is so mounted in the instrument panel near the driver's seat that the driver can confirm the present position of the vehicle and acquire the information on the route ahead by glancing at the section map. Moreover, the display 14 is equipped with: a touch panel providing a display of the function buttons so that the aforementioned operations can be executed by touching the buttons; and the key switches in the periphery of the screen so that the switching of the modes for the guidance and the destination setting is executed by pushing the key switches. The input signal generating means, composed of those key switches and touch panels, also constitutes the input section.

The voice recognizer 12 is also part of the input signal generating means and produces the signals to be processed by the central control section 50 after the user has recognized the coordinate information and has input same by voice through a microphone 12a.

The present position detecting section 20 is composed of: a GPS receiver 21 making use of the global positioning system ("GPS"); a beacon receiver 22; a data transmitter-receiver 23 for receiving the corrected signals of the GPS by using the cellular phone or FM multiplex signals; an absolute azimuth sensor 24 exemplified by a magnetic sensor; a relative azimuth sensor 25 exemplified by a wheel sensor or a steering sensor; a distance sensor 26 for detecting the covered distance in terms of the R.P.M. of the wheels; and an acceleration sensor 27.

The information memory section 30 is a data base which is stored with all the data necessary for the route guidance, including map data, intersection data, node data, road data, photographic data, destination data, guide point data, detailed destination data, road name data, branching point data, address data, display guide data, voice guide data and toll/local exchange number data.

The data communication section 40 is composed of: a data transmitter-receiver 41 for transmitting/receiving data to/from an external information sensor, which stores mass route guide information and offers it upon request of a user, and for transmitting/receiving data to input the point coordinates by using the destination information which is stored in advance by the user in the information storage media (i.e., digital data storage means) such as an electronic note or IC card; and a telephone transmitter 42 for telephone transmissions both to specify a point to thereby acquire peripheral information for the point and to communicate with a destination by telephone after the destination has been set.

The central control section 50 is composed of: a CPU 51 for executing arithmetic operations; a first ROM 52-1 stored not only with programs for processing route retrieval, for display control necessary for the route guidance and for voice output control for voice guidance, but also data necessary for the programs; a RAM 53 for temporarily storing the route guide information so retrieved and the data being arithmetically processed; a second ROM 52-1 stored with display information data necessary for the route guide and the map display; a picture memory (i.e., V-RAM) 54 stored with picture data to be used for the screen display; a picture processor 55 for retrieving the picture data from the picture memory on the basis of a display control signal coming from the CPU 51 to process the picture data and output the processed data to the display; a voice processor 56 for synthesizing and converting the voice, phrase, single sentence and/or sounds, read out of the information memory section 30 on the basis of a voice output control signal coming from the CPU, into analog signals and to output these signals to the speaker; a communication interface 57 for transferring the input/output data through communications; a sensor input interface 58 for receiving the sensor signal of the present position detecting section; and a clock 59 for connecting data and time in the internal diagnosis information. The route guide is so constructed that the driver can select either the screen display or the voice output.

Figure 4:
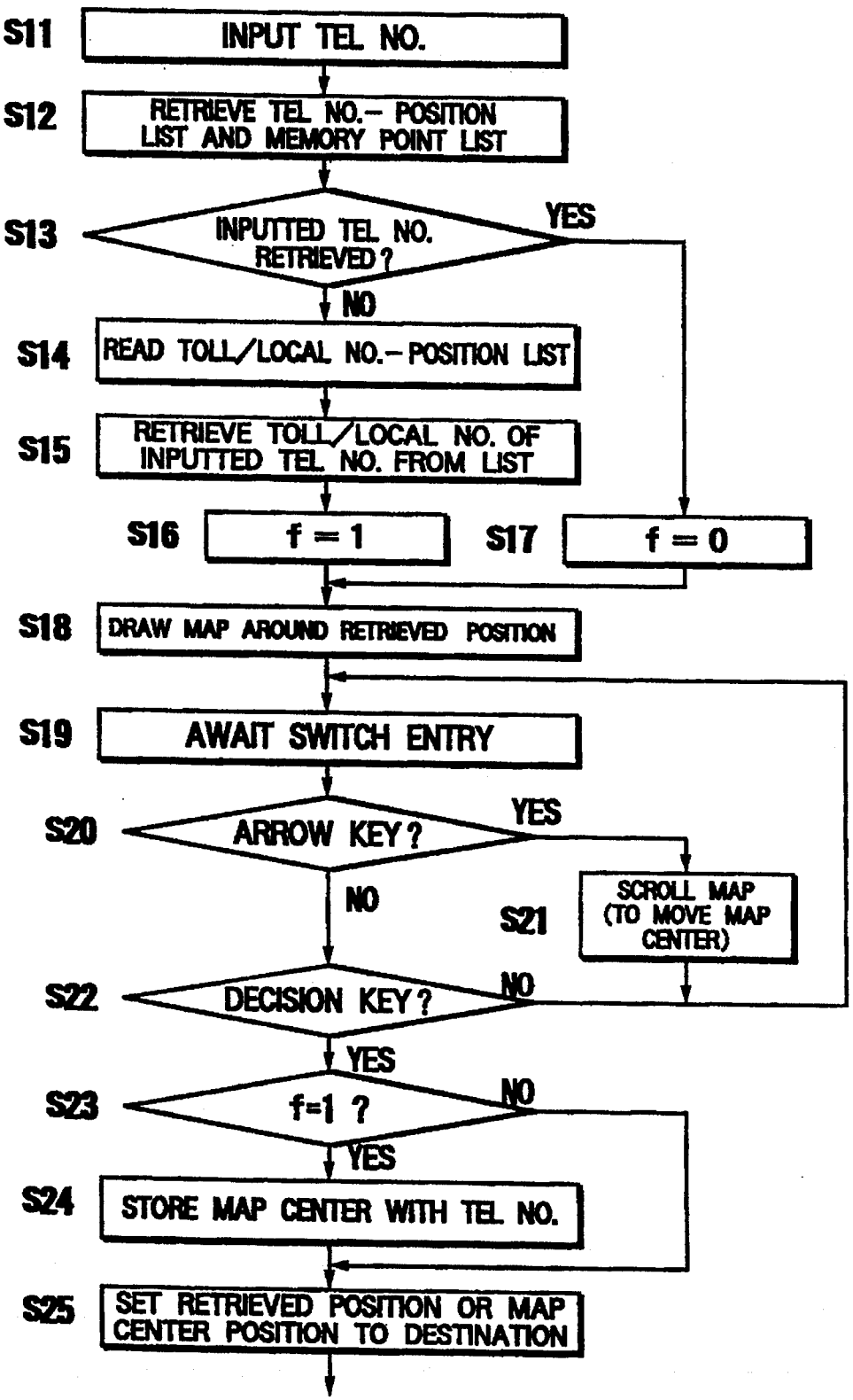
FIG. 4(a) is a flow chart for a processing routine for setting a destination by input of a telephone number.
FIG. 4(b) is a flow chart for another processing routine for setting a destination by input of a telephone number.
Figure 4:
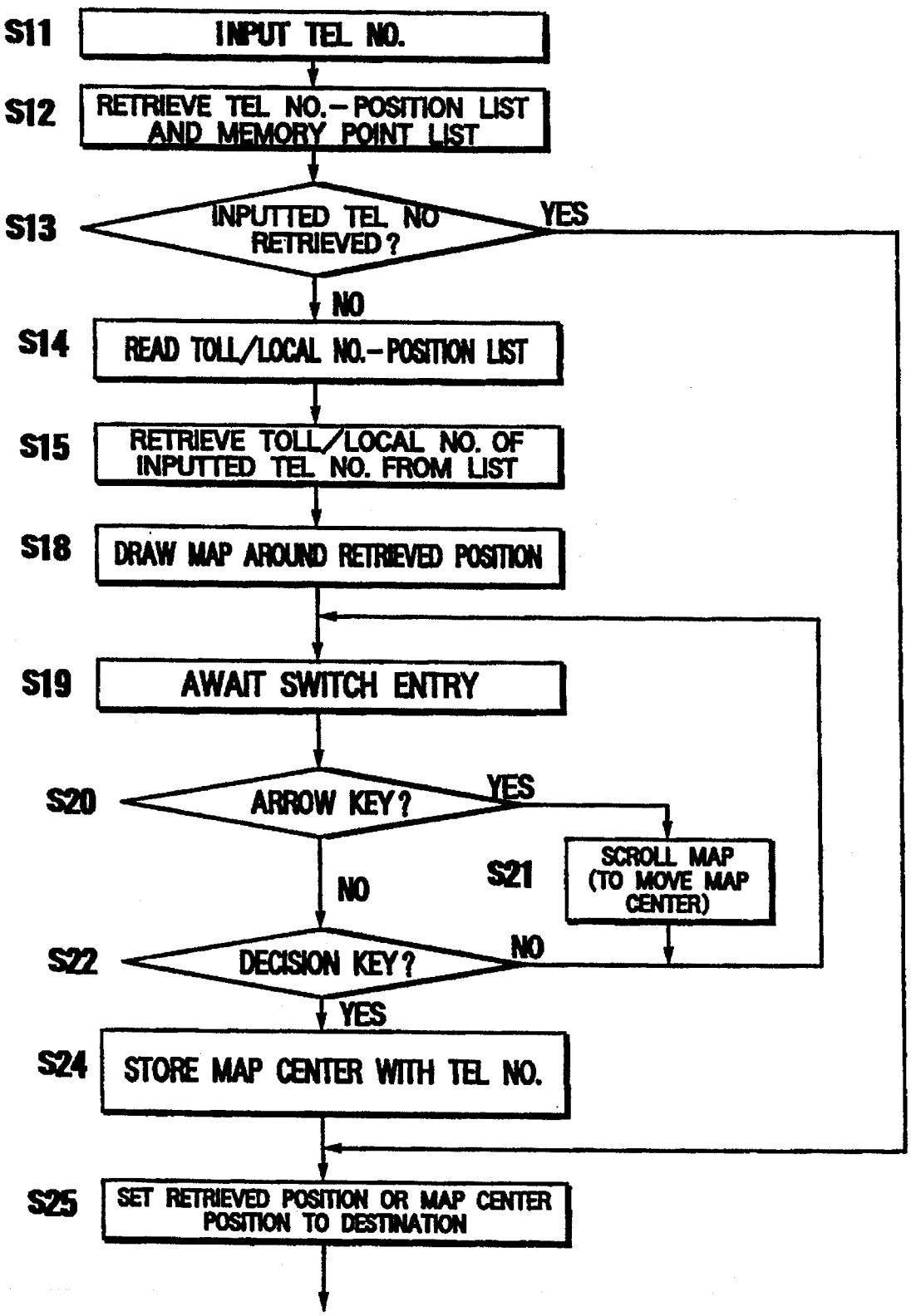
Figure 5:
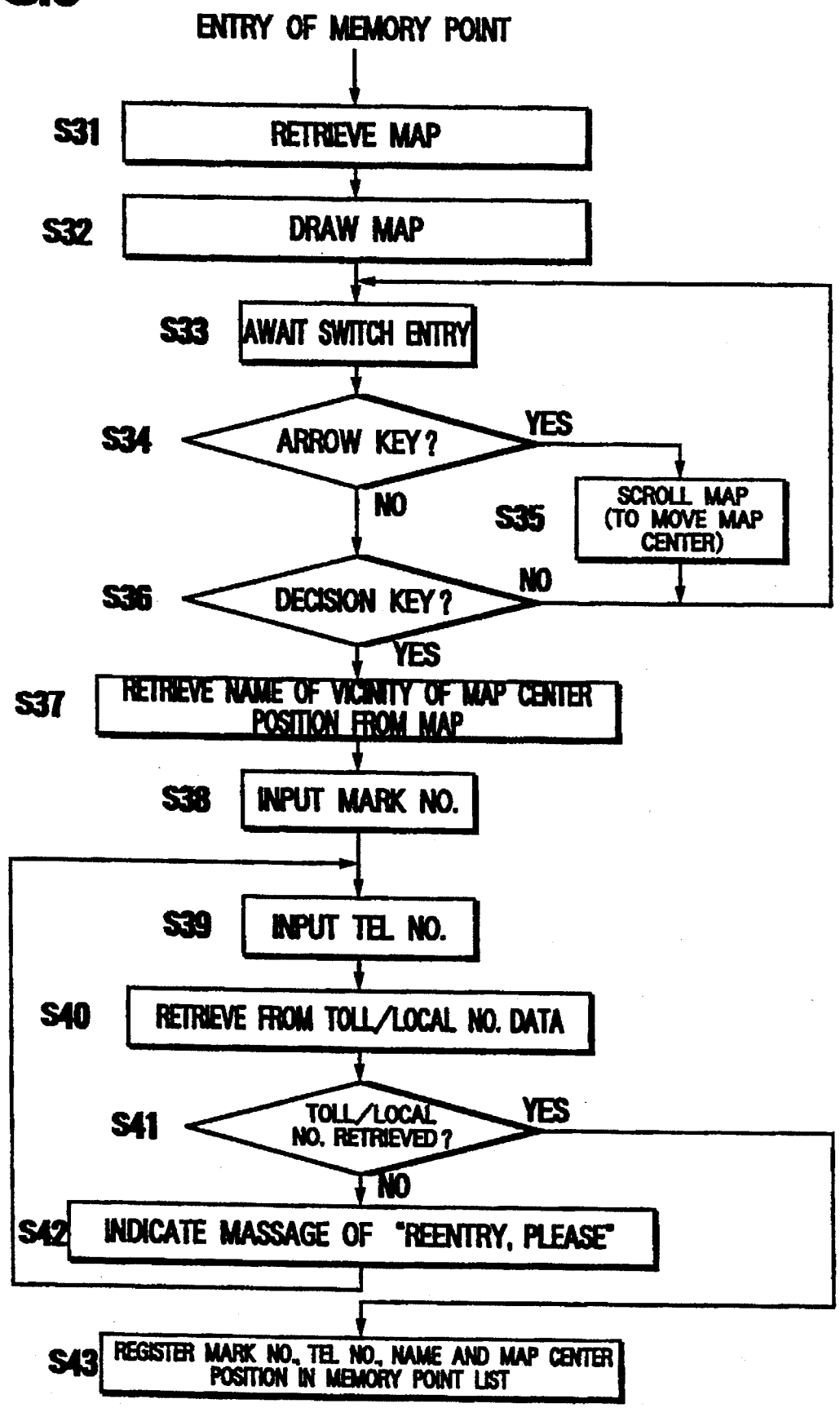
FIG. 5 is a flow chart of a processing routine for inputting a point into memory.
Figure 6:
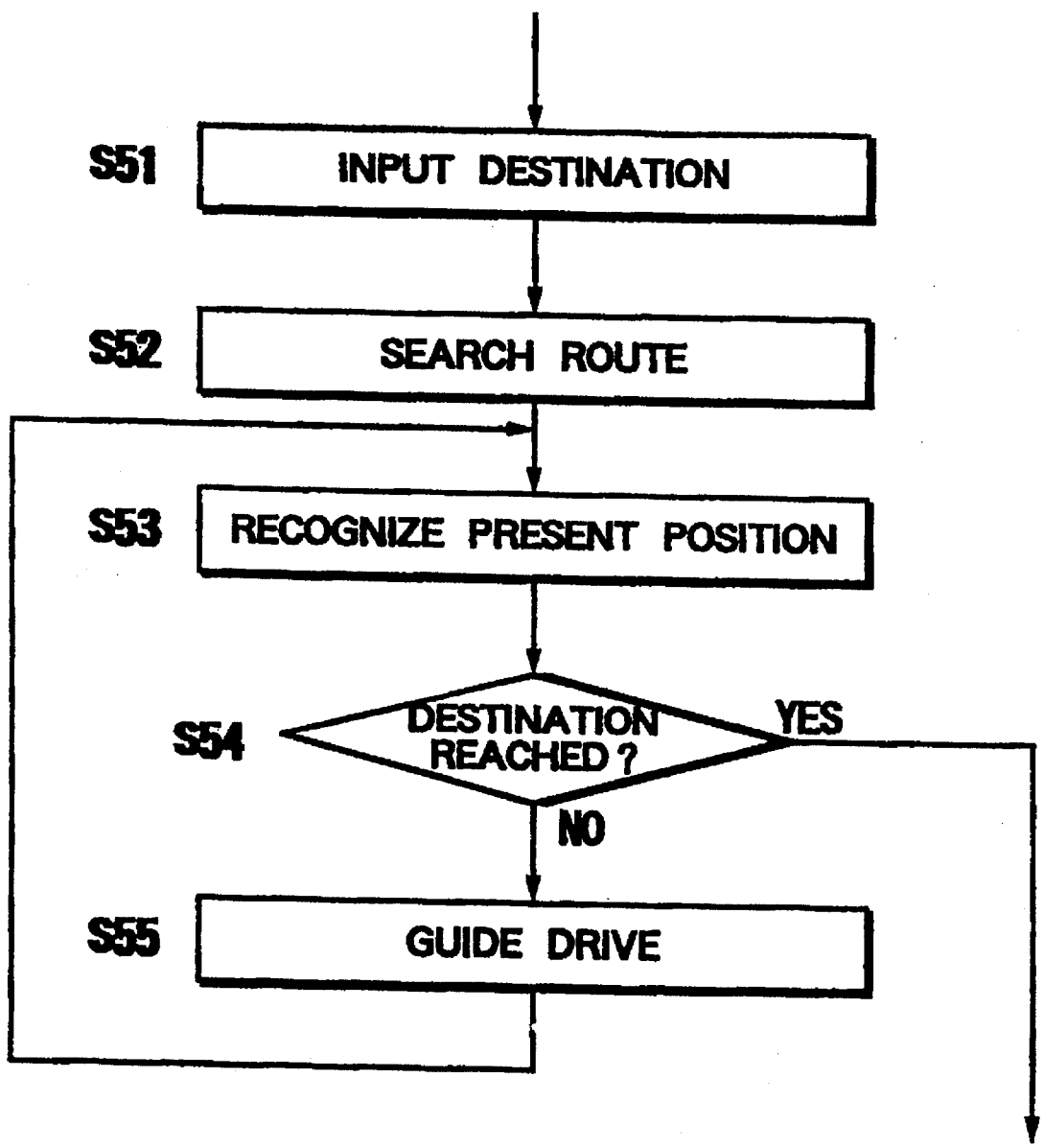
FIG. 6 is a flow chart of a processing routine providing a position inputting function through a telephone number after a point has been registered.

A routine for inputting a telephone number to set the destination, according to the present invention, is shown as a flow chart in FIG. 4. FIG. 5 is a flow chart of a processing routine for inputting a memory point. FIG. 6 is a flow chart of a processing routine executed after a point has been registered by using a position inputting function through a telephone number.

According to the processing routine for setting a destination by inputting a telephone number, as shown in FIG. 4, a telephone number is inputted, for example, as shown in FIG. 4(a). Then, the telephone number-position list is examined (at Steps S11 to S13) to determine whether or not the inputted telephone number is stored. If the telephone number is not found, the toll/local exchange number-position list is read from the memory section and retrieved from the toll/local exchange number of the inputted telephone number to set a flag f=1. If the telephone number is retrieved, the flag f is set to f=0 (at Steps S14 to S17). Next, there is drawn (at Step S18) a map of the vicinity around the position which is retrieved from the telephone number-position list or the toll/local exchange number-position list. Then, the map is scrolled according to the input from the arrow keys to move the map center. Upon receipt of the switch input through the decision key, it is decided whether or not the flag f=1 (at Steps S19 to S23). If the flag f=1, the map center is registered in the telephone number-position list as to correspond to the telephone number. If the flag f=0, the map center position is set as the destination (at Steps S24 and S25).

Likewise in FIG. 4 (b), it is determined at S13 whether or not the telephone number inputted is in the list stored in the memory section. If the answer is NO, the operations of S14, S15, S18 to S22 and S24 are executed as above to set the map center position as the destination. If the telephone number is retrieved, on the other hand, the positional information corresponding to the inputted telephone number is acquired as is to set the coordinate position as the destination (at Step S25).

On the other hand, the routine of inputting a memory point is executed, as shown in FIG. 5, by retrieving the map data by the genre, the telephone number and the present position and to draw the map of a desired range (at Steps S31 and S32). Next, the map center is moved by scrolling the map in accordance with the input of the arrow keys. With the input of the decision key, the name of the vicinity of the map center position is retrieved from the map (at Steps S33 to S37). Next, the mark number and telephone number selected by the user acre inputted to retrieve the toll/local exchange number list to thereby confirm whether or not the toll/local exchange number is stored (otherwise the message of "Reentry, please" is displayed). Then, the mark number, the telephone number, the name and the coordinates of the map center position are registered in the memory point list.

After the position inputting by the telephone number has been used to register the point, the destination is inputted by the telephone number (at Step S51), as shown in FIG. 6. Then, the route for passing through the individual intersections to the destination is retrieved (at Step S52). If this route is determined, the drive guides are repeated till the destination is reached (at Steps S53 to S65) while recognizing the present position by the present position detecting section 20.

Figure 7:
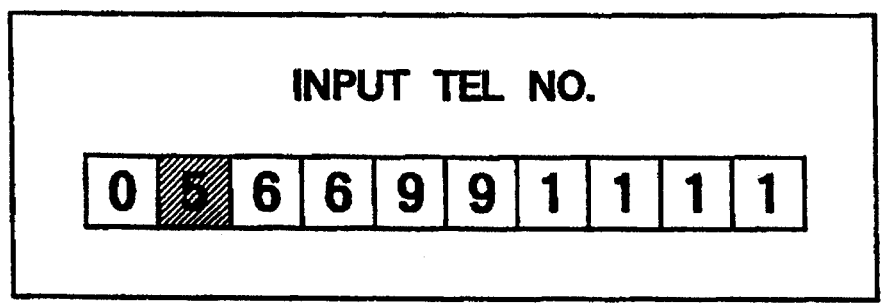
FIGS. 7(a) and 7(b) are diagrams showing an example of a screen and switches to be used in the telephone number inputting.
Figure 7:
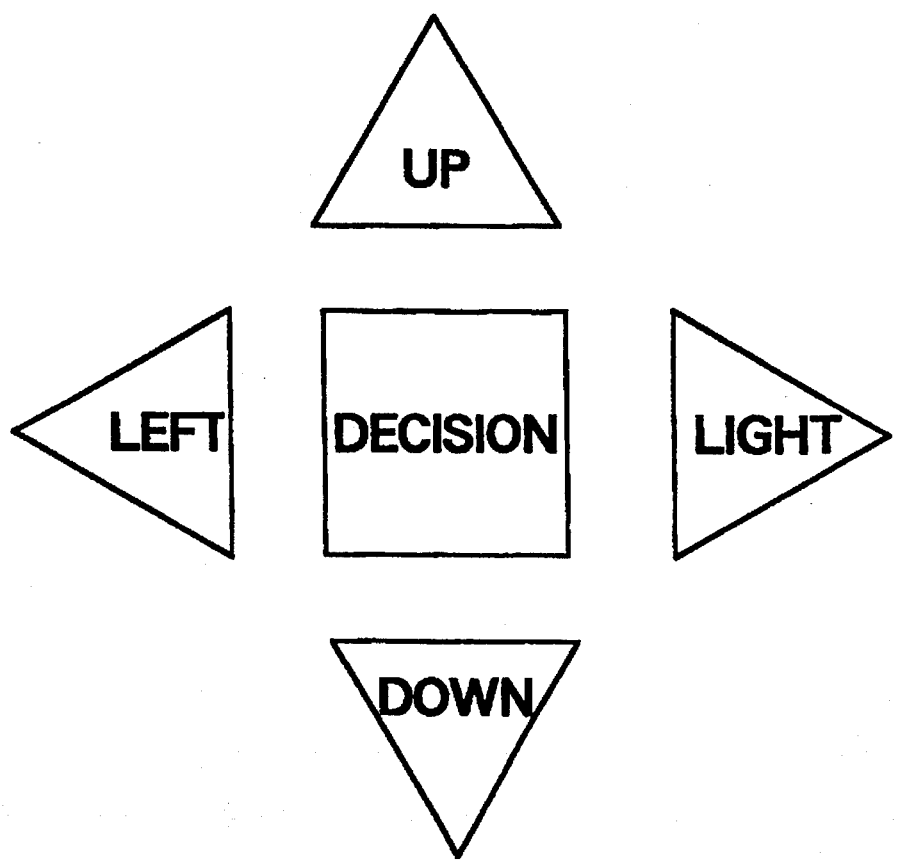
Figure 8:
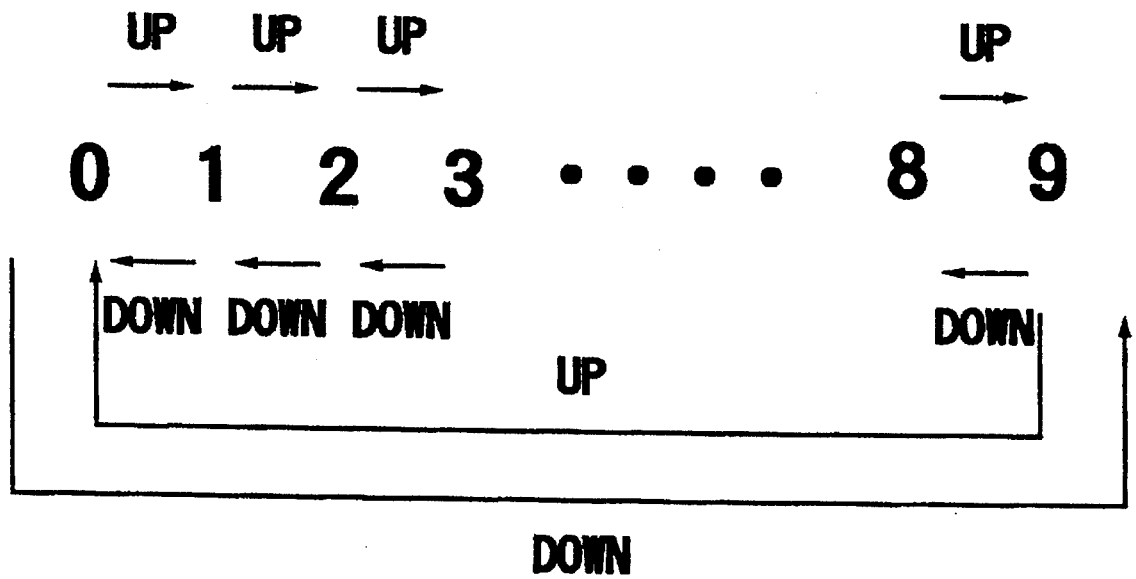
FIGS. 8(a) and 8(b) are diagrams explaining selection of numerals by upward/downward switches.
Figure 8:
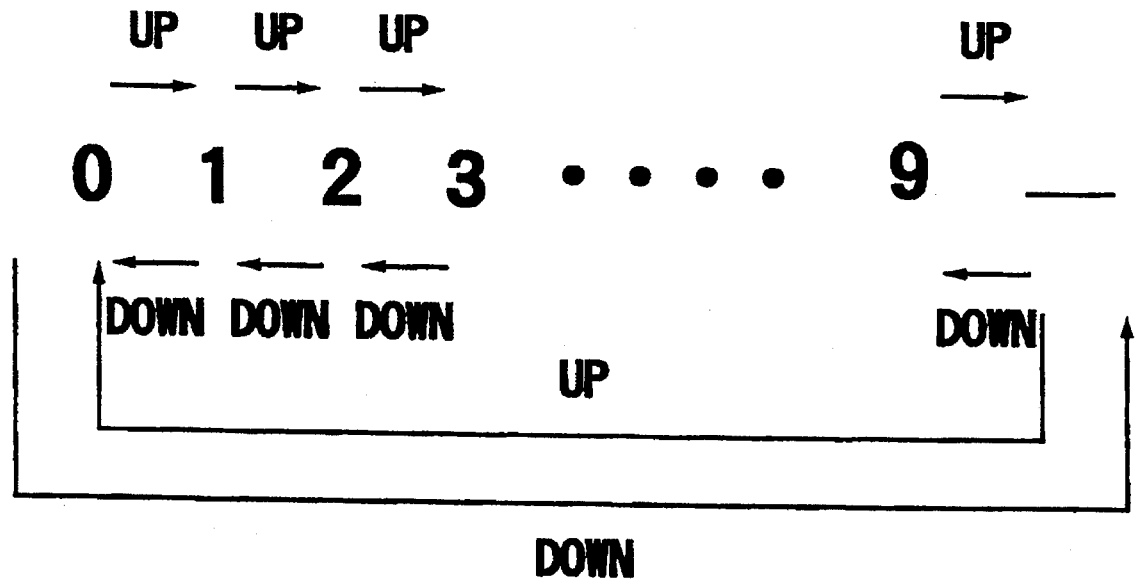

FIGS. 7(a) and 7(b) are diagrams respectively showing examples of a screen and switches to be used in the telephone number inputting, and FIG. 8 presents diagrams explaining a method of selecting numerals by upward/downward switches.

The screen for inputting a telephone number is provided as shown in FIG. 7(a), with a cursor, as hatched, in any of ten numerals. When the upward and downward switches are pushed, as shown in FIG. 7(b), the numerals are moved up or down, as shown in FIG. 8. Moreover, the shifting is carried out by the leftward and rightward switches, as shown in FIG. 7(b). Specifically, the upward switch increments the number in the cursor, and the numeral next to 9 is 0, as shown in FIG. 8(a), or is returned to 0 through spaces, as shown in FIG. 8(b). The downward switch reduces the numeral. The leftward switch returns the cursor position to the lefthand figure, and the lefthand end figure cancels the telephone number inputting. The rightward switch advances the cursor position to the righthand figures and returns it to the lefthand end when the righthand end is reached. Moreover, the decision switch ends the inputting by setting the displayed number as the telephone number.

Incidentally, the present invention is not limited to the embodiment thus far described but can be modified in various manners. In the aforementioned embodiment, for example, it is decided for the memory point entry whether or not the toll/local exchange number is retrieved. If the answer is NO, the message of the reentry is displayed. However, the telephone number may be registered as a dummy by the confirming operation.

Figure 9:
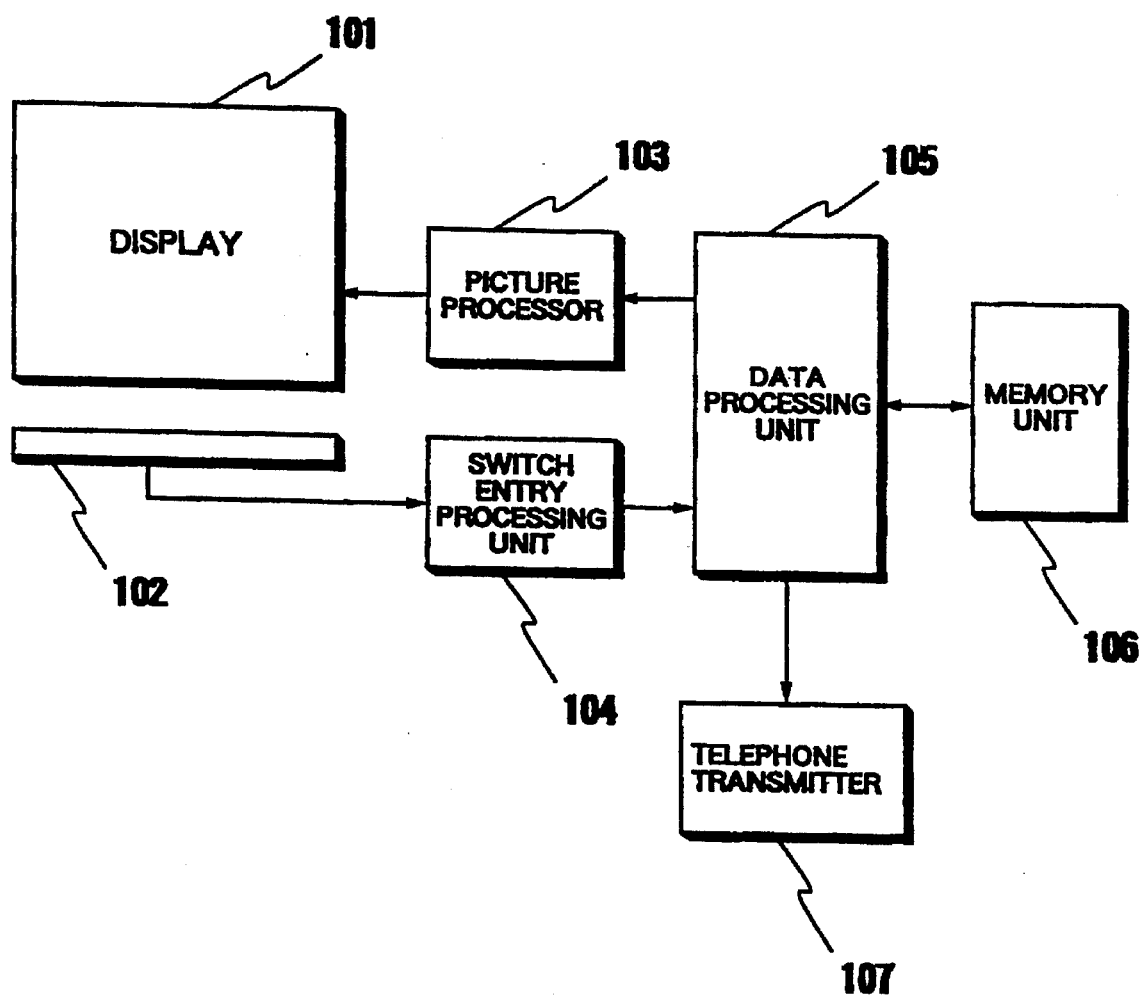
FIG. 9 is a block diagram of one embodiment of a vehicular navigation system having an automatic telephone transmitting function.

Here will be described an embodiment of the navigation system having an automatic telephone transmitting function with reference to FIGS. 9–12. In FIG. 9 reference numeral 101 designates a display; numeral 102 switches; numeral 103 a picture processor; numeral 104 a switch entry processing unit; numeral 105 a data processing unit; 106 a memory section; numeral 107 a telephone transmitter; letter A display input screen; letter B a destination setting switch; letter C a map switch; letter D a display switch; and letter E a letter switch.

The display 101 is a color CRT or a color liquid crystal display and is mounted in the instrument panel near the driver's seat. The display 101 displays, in colors, all the screens necessary for navigation, such as a route setting screen, based upon the map data and guide data processed by the data processing section 105, a section map screen and an intersection map screen, and telephone contact screens. Display 101 also displays buttons in the main screen for setting the route guide, for providing the route guidance and for switching the screens. Especially, information pertaining to a passed intersection, such as the name of the passed intersection, is occasionally popped up and displayed in colors in the section map diagram. As a result, the driver can confirm the present position of the vehicle and acquire information on the route ahead by glancing at the section map. In the contacts-by-telephone screen (FIG. 11), the selection menu items are classified and hierarchically displayed so that the place of telephone contact can be selected by a single action to effect the automatic transmission.

The picture processor 103 outputs a desired picture on the screen of the display 101 by storing in the picture memory the picture data to be used for the display on the screen of the display 101, by retrieving the picture data from the picture memory on the basis of the display control signal coming from the data processor 105 and by processing the picture data graphically.

The switches 102 are shown as touch switches of a touch panel which correspond to the function buttons displayed in the display 101, and the button switches disposed around the display 101, so that the various operations are executed on the basis of the signals inputted by those switches. The touch switches on the touch panel and the button switches constitute the input signal generating means, i.e. the input section, and the switch entry processor 104 acts as an interface for the input section to process the inputs.

The memory section 106 is stored with not only the various data necessary for the route retrieval and guidance but also the telephone numbers of the destinations, the points to be passed and other, ancillary information such as the weather forecast telephone number, the information guide service number, the JAF (i.e., Japan Automobile Federation) and the road traffic information service. The telephone transmitter 107 transmits the telephone number which is read out from the memory section 106 by the data processor 105 and sent as the transmission notice.

The data processor 105 processes the input signals from the switches 102 through the switch entry processor 104 to control the display content of the screen of the display 101 through the picture processor 103 by executing the programs for acquiring the point data of a destination to be set and the data of the present position, thereby retrieving the route. The data processor also executes the programs for the display control necessary for the route guidance and the voice output control necessary for the voice guidance, and the program for the contacts-by-telephone function. The data processor 105 writes and reads the data in and from the memory section 106 and instructs the telephone transmitter 107 for the telephone transmission.

Figure 10:
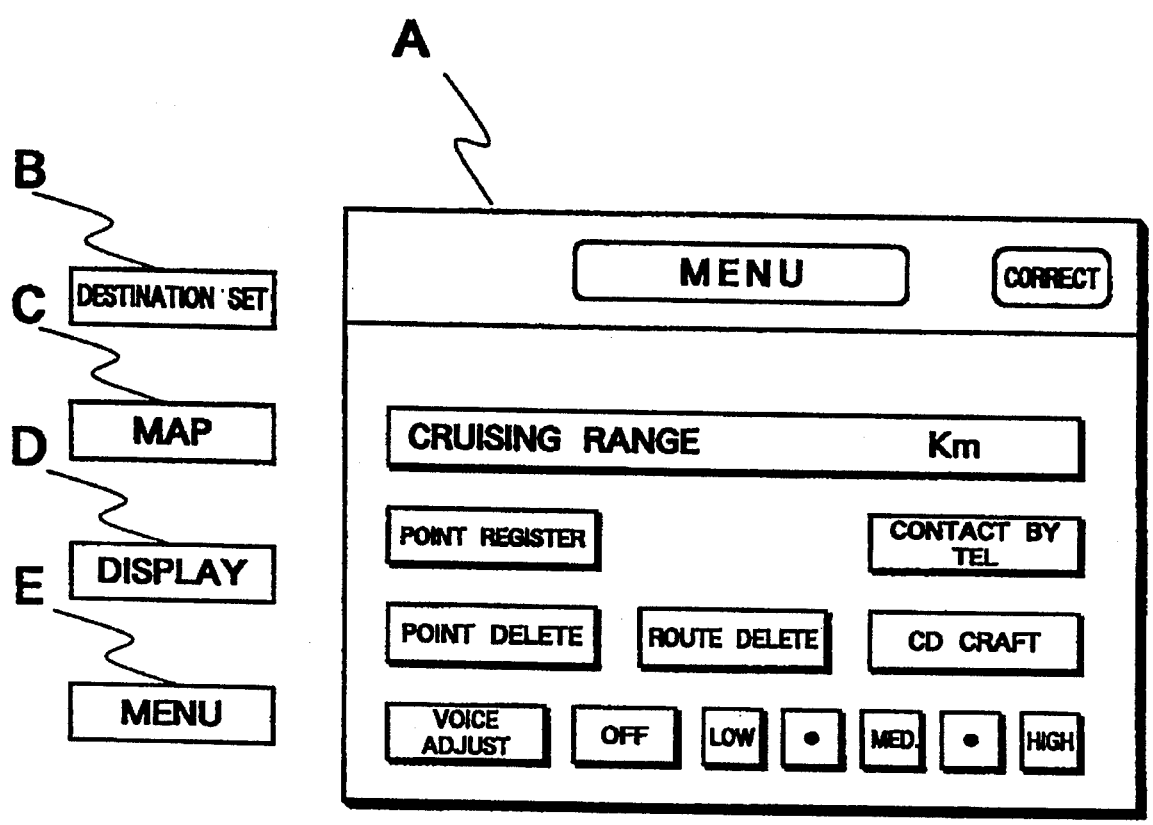
FIG. 10 is a diagram showing an example of the display screen and associated switches.
Figure 11:
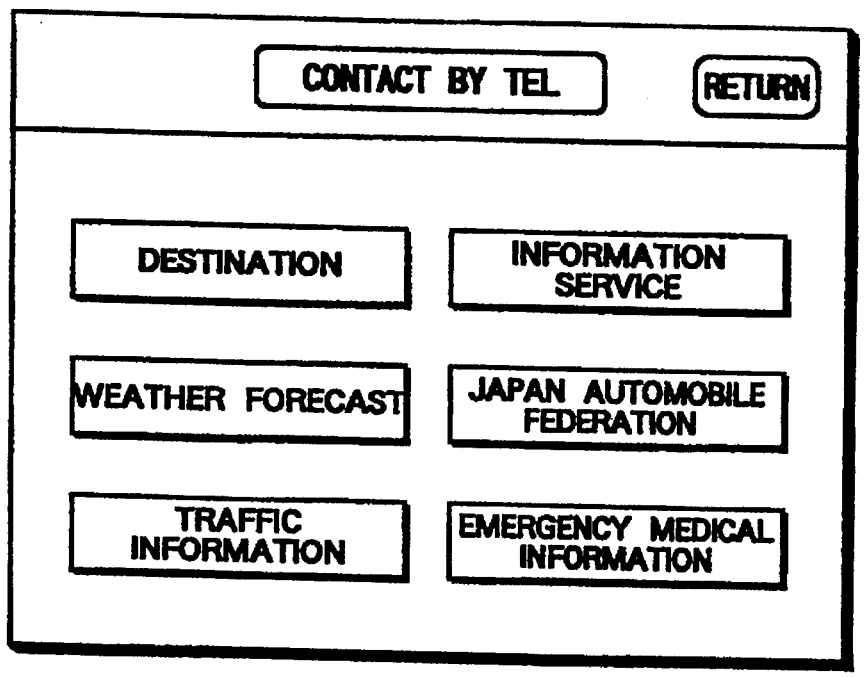
FIG. 11 is a diagram showing an example of a contacts-by-telephone screen.

In the present embodiment, when the screen of the contacts-by-telephone is selected from the aforementioned display 101 (FIG. 10), the telephone transmissions are automatically carried out by selection of an item from the screen of FIG. 11, e.g. the weather forecast, the telephone information service, the JAF, the traffic information, the destination, the transit point or any registered place. The display 101 may also be utilized to specify a location in the vicinity of the destination or the present position as a selection of a point on the map, thereby retrieving the telephone number of the selected item through the toll/local exchange number for that point. Specifically, since the set destination or the present position has coordinates as the positional information, the toll/local exchange number of the point can be retrieved from those coordinates, and the telephone number for the "weather forecast service" of the corresponding district can be acquired from the toll/local exchange number. For the destination, as additional information, the telephone number of the "weather forecast service" of the corresponding district can likewise be acquired from the toll/local exchange portion of the telephone number. For a point other than the destination and the present position, the telephone number of the "weather forecast service" of the corresponding district can be acquired from the toll/local exchange number by retrieving a city from the prefecture to display a map of the desired area, by specifying the point on the map, and by specifying the road name on the screen displaying the route information to retrieve the toll/local exchange number. Moreover, the telephone transmissions can be directed, not only by information regarding the specified point but also the destination, a transit point, a station or a hospital. In this case, the telephone number may be acquired for the telephone transmissions by selecting the touch switch for the destination or by registering the telephone number of the transit point, the station or the hospital as the registered place by genre, by displaying the name of the registered name in a list or mark on the map and by specifying a displayed name.

Figure 12:
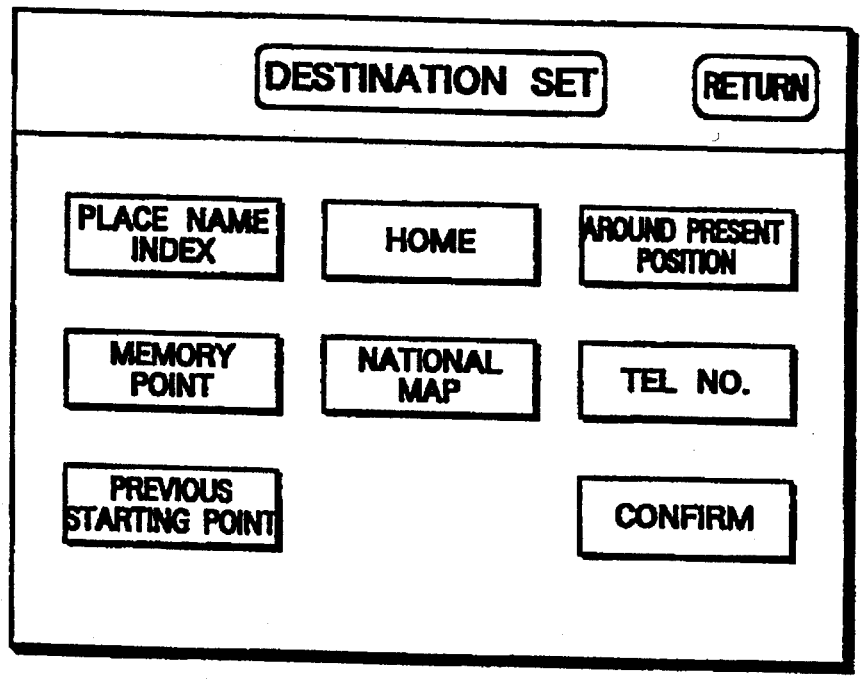
FIG. 12 is a diagram showing an example of a destination setting screen.

Here will be described the operation of the individual switches and the transitions of screens of the display 101 with reference to FIGS. 10 to 12. In FIG. 10, the display input screen A is a combination of the touch panel with the screen of the display 101 and displays the menu screen responsive to operation of a menu switch E. This menu screen displays the cruising range which is calculated on the basis of the remainder of gasoline and the mileage, and regions for other correction, point setting and contacts-by-telephone are displayed as the touch switches for selecting the functions to be described in the following.

The "CORRECT" is a key for corrections in case the magnetic sensor provided as the point detecting means is influenced by noises. The "POINT REGISTER" is a key to be used when the driver registers an arbitrary point as the point data from the map data. In the navigation system, generally speaking, as the information for setting the destination, the destinations classified and registered, for example, are recorded in advance so that they are retrieved to set a destination. The "POINT REGISTER" key is an additional one for the driver to register a special point such as his own house, the houses of his acquaintances, several facilities or accommodations. This point information includes the number, the name, the coordinates and telephone number of the point, which are registered on the basis of the coordinates set on the map. The "CONTACT BY TEL" is a key to be selected in the case of a telephone call by the automatic transmission. An example of the display to be switched and displayed by selecting the "CONTACT BY TEL" key is shown in FIG. 11. The "POINT DELETE" is a key to be selected in case the point registered in the "POINT REGISTER" mode is to be deleted and the "ROUTE DELETE" is a key to be selected in case the route registered by the route retrieval by another destination setting is to be deleted. "CD CRAFT" is to be selected when compact disc is inserted for utilization in the displayed input screen. The "VOLUME ADJUST" is for adjusting the volume of the voice output system (not shown). "OFF" is a key for stopping the voice output and "LOW", "MEDIUM" and "HIGH" are keys to be used for increasing or decreasing the volume.

A destination setting switch B is used to set a destination in the navigation system. When this destination setting switch B is operated, the screen for setting the destination, as shown in FIG. 12, is displayed as the display input screen A. After this destination setting, the route retrieval is carried out to effect the guidance along the route from the present position to the destination by displaying the map or characteristic objects and/or by voice. A map switch C is operated when the map for the route guide is displayed for the intrinsic navigation system, and a display switch D is used to display a screen for information on the operation of an air conditioner and other equipment and for controlling the display of the screen such as the brightness.

In the "CONTACT BY TEL" appearing in FIG. 11, the "DESTINATION" is a key for automatic telephone transmissions to the destination already set. On the other hand, the telephone transmissions may be carried out by selecting the place which has been registered by the "POINT REGISTER" in the menu screen shown in FIG. 10. In this modification, after this key is selected to select the "specified point", the select screen is switched from the "destination" to the "registered point". Moreover, the registered point, e.g., the list of the registered points displayed and retrieved by genre, or the map having the registered point marked is displayed so that a telephone transmission is directed to the point specified on the map. "INFORMATION SERVICE", "WEATHER FORECAST", "JAF", "TRAFFIC INFORMATION" and "EMERGENCY MEDIAL INFORMATION" are keys for retrieving the telephone numbers of the "information service", "weather forecast", "JAF", "traffic information center" and "emergency medical center" for telephone transmissions and for acquiring information for the vicinity around the selected point.

Figure 13:
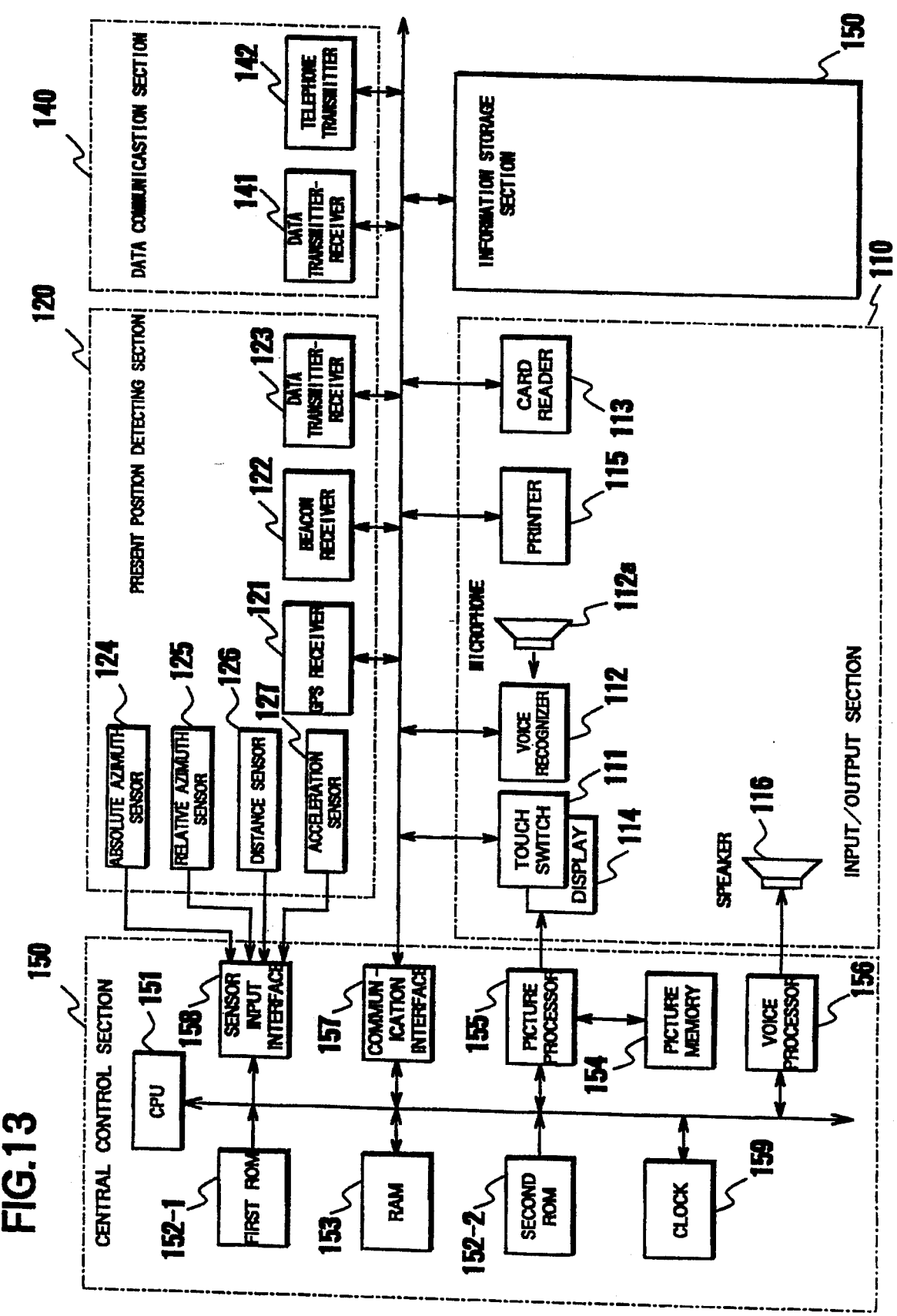
FIG. 13 is a block diagram of the overall construction of a navigation system having the automatic telephone transmitting function.

The navigation system of the embodiment described above has the overall construction, for example, as shown in FIG. 13. FIG. 13 shows the navigation system as including: an input/output section 110 for inputting/outputting information for route guidance. A present position detecting section 120 detects information on the present position of the user's vehicle and information storage section 130 stores the navigation data necessary for calculating the route and display of guide data necessary for the guidance. A data communication section 140 transmits and receives navigation data by communication with an information source such as an information center or an electronic note and provides a contacts-by-telephone option. A central control section executes the route retrieval and guidance and controls the entire system.

The input/output section 110 functions to input a destination, to instruct the central control section 150 as to the navigation desired by the user, so that guide information may be given by voice and/or by screen display when the driver so desires, and to output the processed data and the communication data by printing. As the means for realizing these functions, the input section includes: touch switches 111 for inputting and setting a destination in terms of a telephone number or coordinates, for requesting the route guide and for switching the modes; a voice recognizer 112; and a car reader 113 for reading out the data stored in an IC card or a magnetic card. On the other hand, the output section includes: a display 114 for displaying the input data on the screen or the route guide, automatically in response to the request of the driver; a printer 115 for printing the data processed by the central control section 150, the data stored in the information storage section 130, and the transmitted data received from the information center. A speaker 116 outputs the route guidance by voice.

The display 114 is a color CRT or a color liquid crystal display and displays in colors all the screens necessary for the navigation, such as a route setting screen, based upon the map data and guide data processed by the central control section 150, a section map screen and an intersection map screen. The display 114 also provides the main screen with switches for setting the route guide, for selecting the route guidance and for switching the screens. Especially, information on a passed intersection such as the name of the passed intersection is occasionally popped up and displayed in colors in the section map diagram.

This display is so mounted in the instrument panel near the driver's seat that the driver can confirm the present position of the vehicle and acquire the information on the route ahead by glancing at the section map. Moreover, the display 114 provides a touch panel 111 with display of the function buttons for execution of the aforementioned operations on the basis of input signals generated by touching the buttons. The input signal generating means consists of those buttons and touch panels and constitutes an input section, although its detailed description is omitted here.

The voice recognizer 112 also constitutes an input signal generating means and produces signals to be processed by the central control section 150, after the user has obtained the coordinate information and has input same by voice through microphone 112a.

The present position detecting section 120 is composed of: a GPS receiver 121 making use of the global positioning system (i.e., GPS); a beacon receiver 122; a data transmitter-receiver 123 for receiving the corrected signals of the GPS by using the cellular phone or FM multiplex signals; an absolute azimuth sensor 124 exemplified by a magnetic sensor; a relative azimuth sensor 125 exemplified by a wheel sensor or a steering sensor; a distance sensor 126 for detecting the covered distance in terms of the R.P.M. of the wheels; and an acceleration sensor 127.

The information memory section 130 is a data base which is stored with all the data necessary for the route guidance, including map data, intersection data, node data, road data, photographic data, destination data, guide point data, detailed destination data, road name data, branching point data, address data, display guide data, voice guide data and telephone number data.

The data communication section 140 is composed of: a data transmitter-receiver 141 for transmitting/receiving data to/from an external information source, which stores mass route guide information and offers it upon request of a user, and for transmitting/receiving data to input the point coordinates by using the destination information which is stored in advance by the user in the information storage media (i.e., digital data storage means) such as an electronic note or IC card; and a telephone transmitter 142 for automatic telephone transmissions, both to specify a point to thereby acquire the information regarding the vicinity of the point and to communicate with a destination by telephone after the destination has been set.

The central control section 150 is composed of: a CPU 151 for executing arithmetic operations; a first ROM 152-1 stored, not only with programs for route retrieval, display control necessary for the route guidance and for voice output control for voice guidance, but also with data necessary for executing these programs; a RAM 153 for temporarily storing the route guide information retrieved, such as the point coordinates of the destination or the road code No. and the data being arithmetically processed; a second ROM 152-2 stored with display information data necessary for the route guide and the map display; a picture memory 154 stored with picture data to be used for the screen display; a picture processor 155 for retrieving the picture data from the picture memory on the basis of a display control signal coming from the CPU 151 to process the picture data and output the processed data to the display; a voice processor 156 for synthesizing and converting the voice, phrase, one sentence and/or sounds, read out of the information memory section 130 on the basis of a voice output control signal coming from the CPU, into analog signals for output these signals to the speaker; a communication interface 157 for transferring the input/output data through communications; a sensor input interface 158 for receiving the sensor signal of the present position detecting section; and a clock 159 for correlating data and time in the internal diagnosis information. In this embodiment, the driver can select either the screen display or the voice output.

Figure 14:
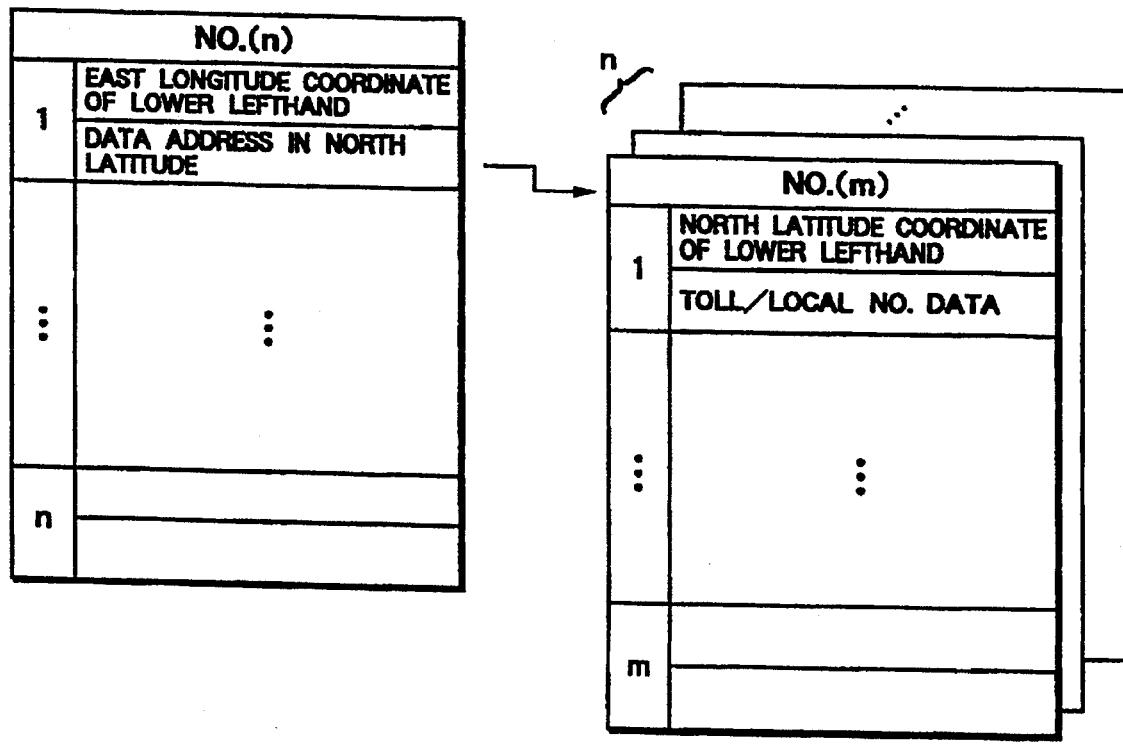
FIGS. 14(a) to 14(d) are diagrams showing an example of the structure of data to be used for the contacts-by-telephone function for obtaining a weather forecast.
Figure 14:
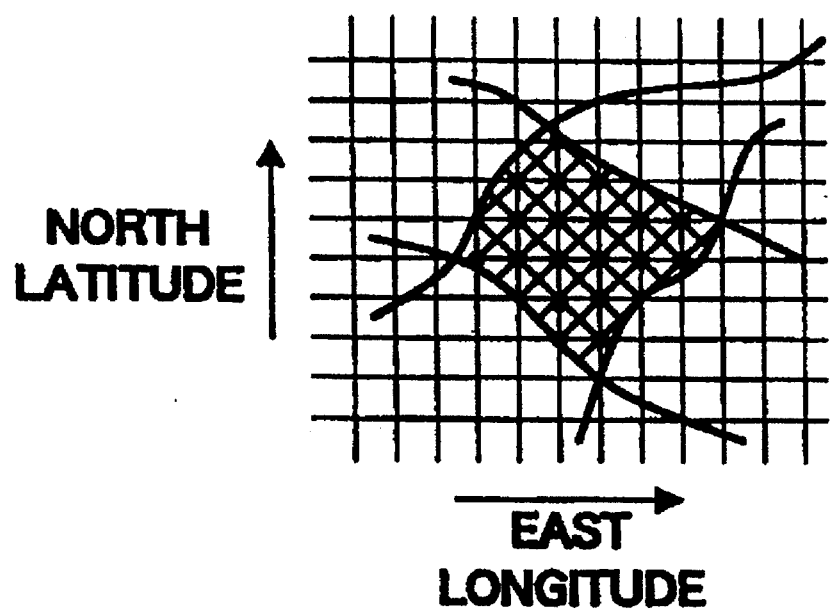
Figure 14:
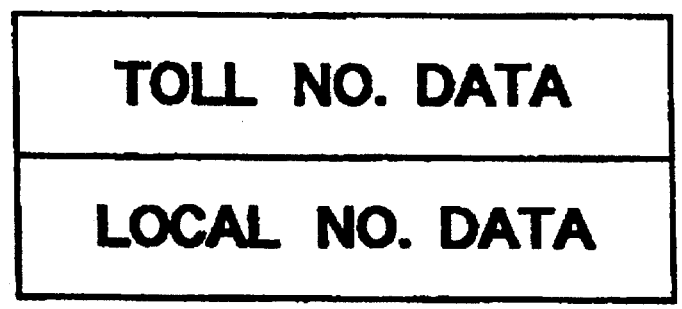

FIGS. 14(a) to 14(d) are diagrams showing an example of the structure of data to be used for the contacts-by-telephone function for obtaining a weather forecast. The toll number data for the "WEATHER FORECAST SERVICE" is retrieved by keying the toll/local number and the coordinates. The data so retrieved by input of the toll/local number has a starting toll/local number, the ending toll/local number and the toll number of the "WEATHER FORECAST SERVICE" as shown in FIG. 4(a). If any relevant number is retrieved, the toll number column of the "WEATHER FORECAST SERVICE" is blanked. On the other hand, the retrieved coordinates data includes a file of the north latitude data addresses with respect to the lower lefthand east longitude coordinates and the file of the toll/local number data with respect to the lower lefthand north latitude, as shown in FIG. 14(b). These data are meshed at a constant interval, as shown in FIG. 14(c), to convert the toll/local number of each mesh into data.

Figure 15:
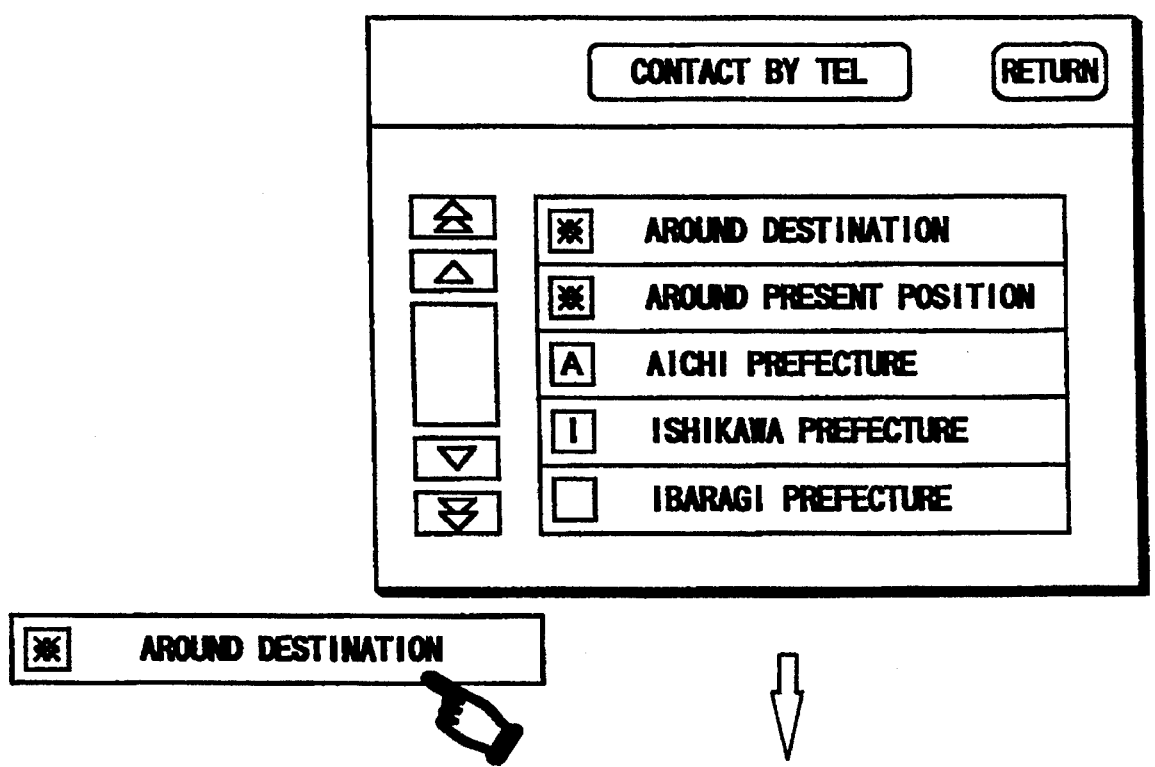
FIGS. 15(a) to 15(c) are diagrams showing an example of transition of screens in the automatic transmission of the weather forecast.
Figure 16:
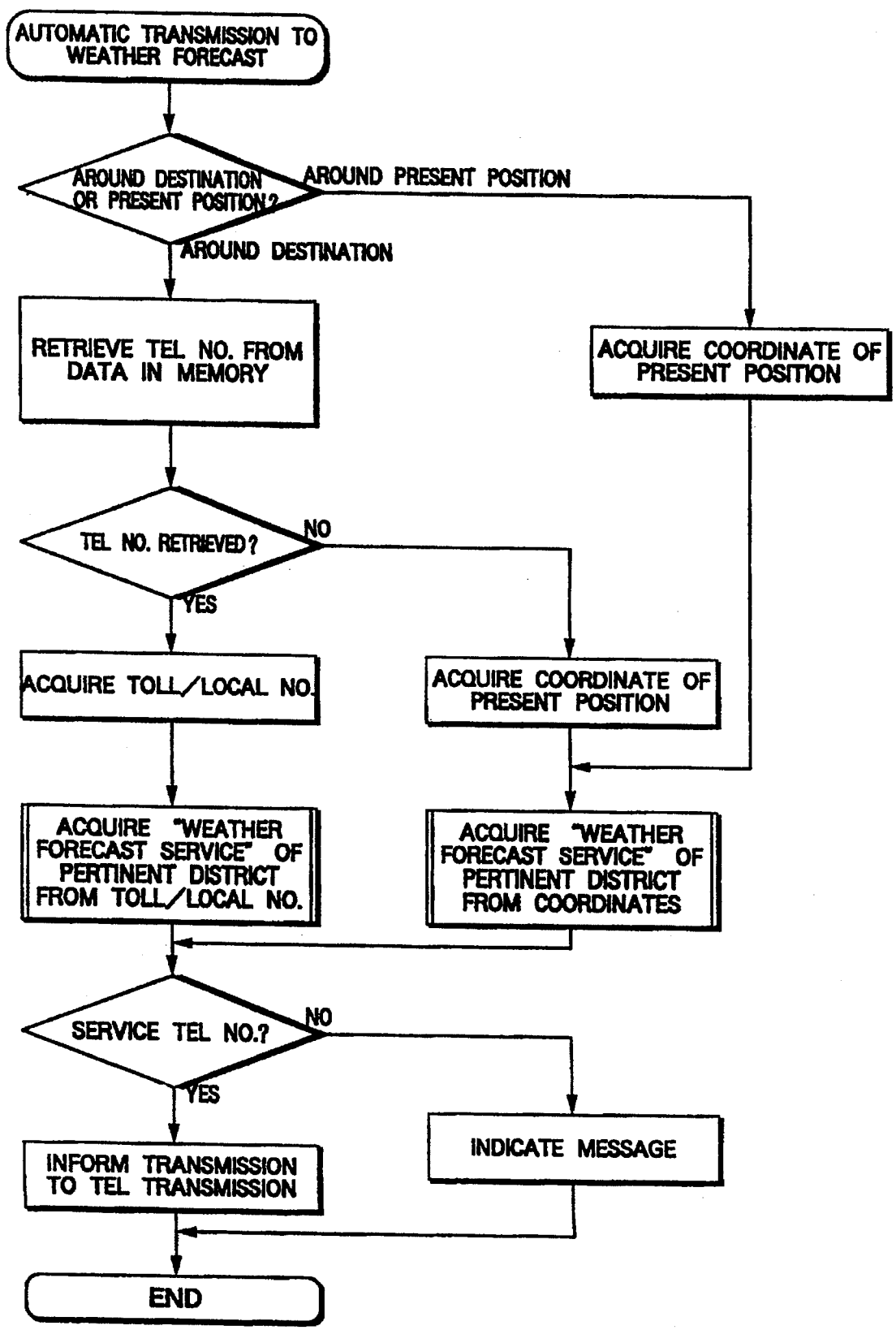
FIG. 16 is a flow chart of the automatic transmission routine for a weather forecast.

For automatic transmissions to the weather forecast station, the "CONTACT-BY-TELEPHONE" is selected in the menu screen shown in FIG. 15(a) and, for example, the contacts-by-telephone screen shown in FIG. 15(b) is displayed. If the "WEATHER FORECAST SERVICE" of this menu is selected, the individual selection options for specifying the vicinity of the destination, the vicinity of the present position, and the vicinity of other areas, are displayed as shown in FIG. 15(c). When the vicinity of the destination or the present position is selected, therefore, first a determination is made as to which area is to be examined, as shown in FIG. 16. In the case of the destination, the telephone number is retrieved from the data file, as in the process for automatic transmission to the destination, so that the toll/local number or the coordinates are acquired depending upon whether or not the telephone number is retrieved. From the toll/local number or the coordinates, the "WEATHER FORECAST SERVICE" of the corresponding area is acquired, the telephone number is sent as the notice of transmission, independently of whether or not the telephone number is retrieved, or the message of "No telephone number can be retrieved" is displayed at the center of the screen. In the case of the present position, on the other hand, the point information for the present position is acquired from the present position detecting section 120, as shown in FIG. 13, by the sensor input interface 58 so that it is arithmetically processed by the CPU. Then, the positional coordinates are written in the RAM 153 to acquire the coordinates of the present position, and processing similar to the aforementioned is executed based on the coordinates. When an area, a city name or the like is specified in sequence from a prefecture name such as Aichi Prefecture, and the map of the desired area is displayed on the screen so that a point on the map may be selected.

Figure 17:
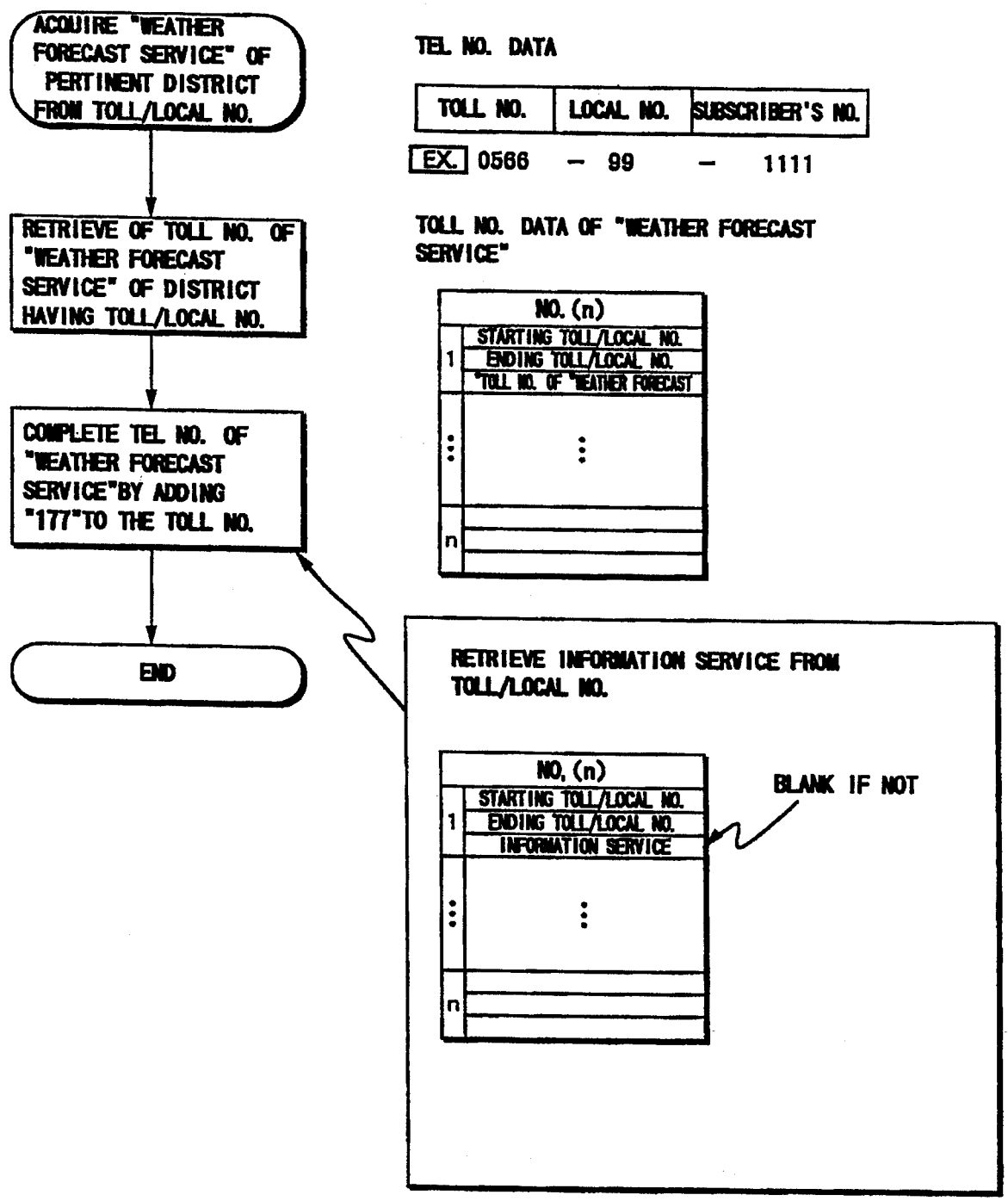
FIG. 17 is a flow chart for acquisition of the "weather forecast service" from toll/local telephone numbers.
Figure 18:
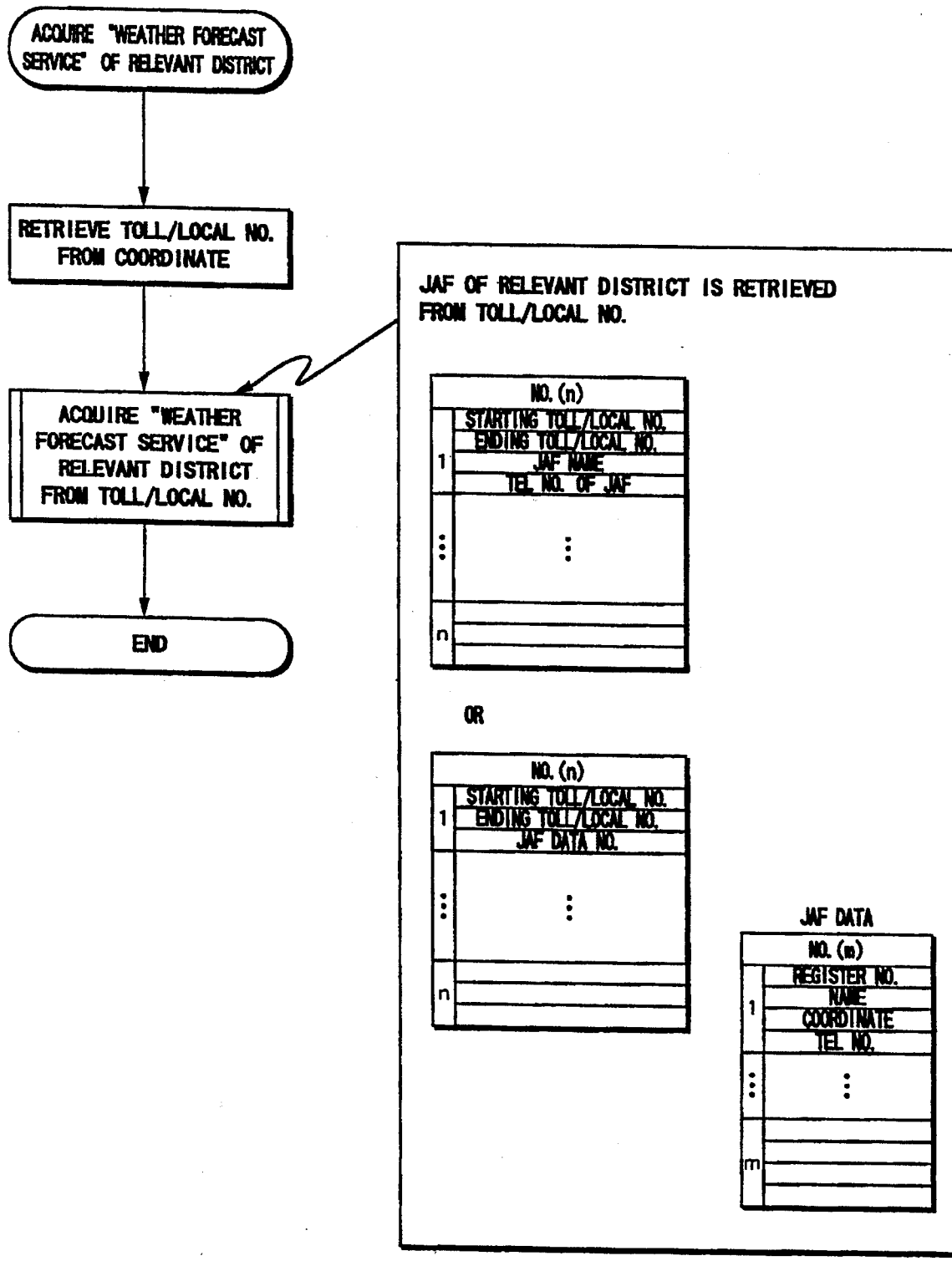
FIG. 18 is a flow chart for the acquisition of the "weather forecast service" from coordinates.

When the "WEATHER FORECAST SERVICE" number of a relevant district is to be acquired from the toll/local number, the number "177" is added to the toll/local number of the "WEATHER FORECAST SERVICE", as retrieved in FIG. 17, to obtain the telephone number of the "WEATHER FORECAST SERVICE". On the other hand, when the "WEATHER FORECAST SERVICE" number of the corresponding district is to be acquired from the coordinates, the toll/local number is retrieved from the coordinates, as shown in FIG. 18, to provide the "WEATHER FORECAST SERVICE" number of the district. The retrieval of the information service or the JAF number can be executed as in the acquisition of the "WEATHER FORECAST SERVICE" number.

Figure 21:
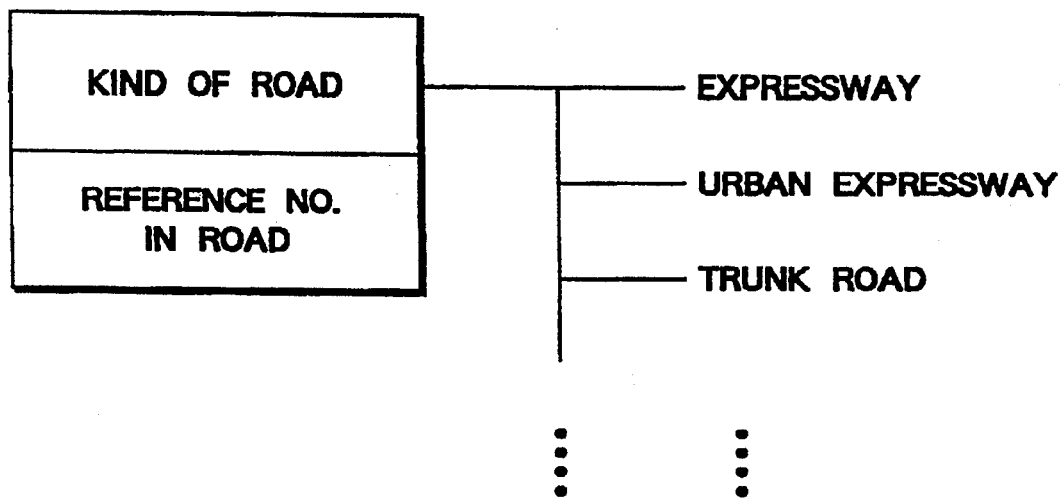
FIG. 21 is a diagram showing an example of the structure of road name code number data.
Figure 22:
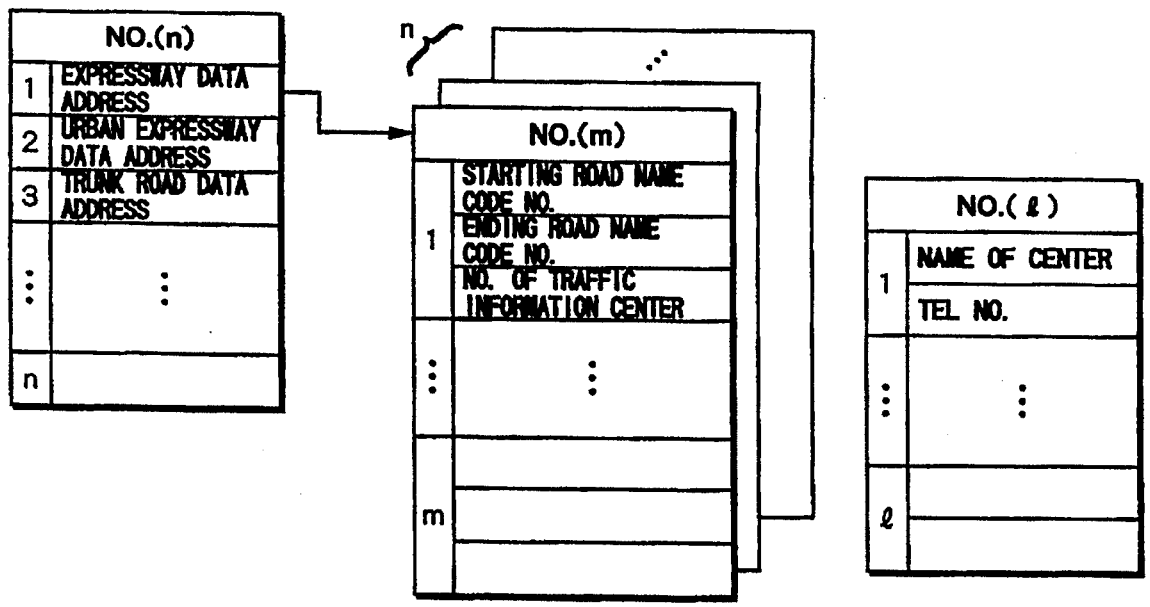
FIGS. 22 (a) and 22 (b) are diagrams showing an example of the structure of data to be used for retrieving the traffic information center from the road name code number.
Figure 22:
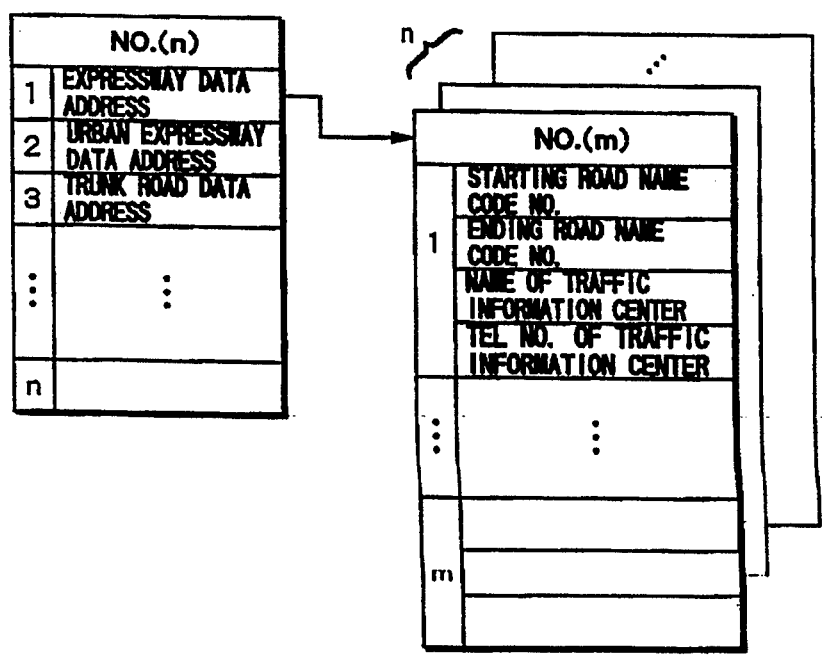
Figure 23:
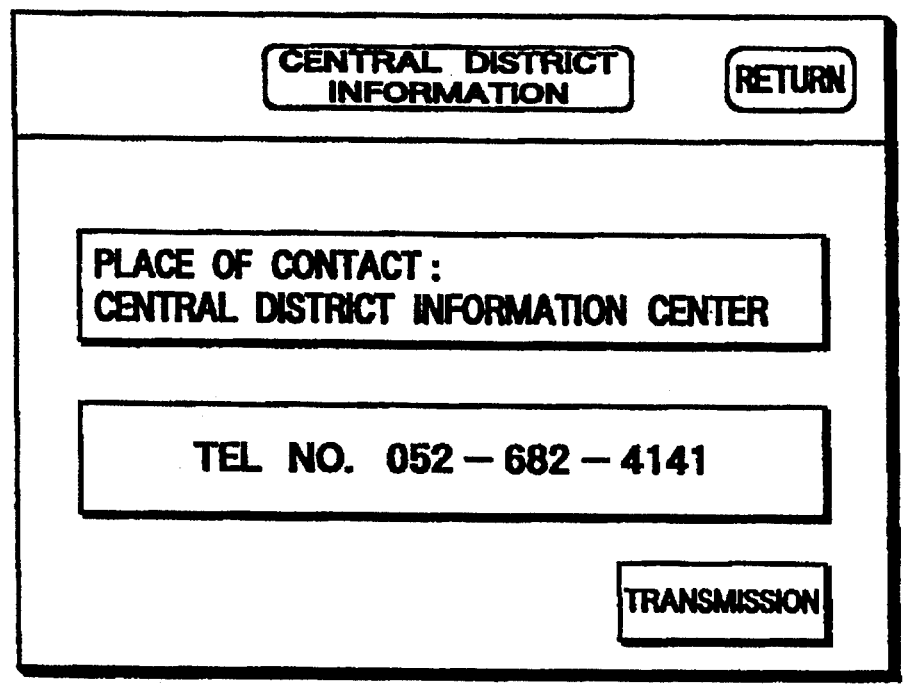
FIGS. 23 (a) to 23 (c) are diagrams showing transitions of screens for transmitting traffic information automatically.

The data stored in the information memory section 130 shown in FIG. 13 includes: that shown in FIGS. 19(a) and 19(b) which are diagrams showing an example of the structure of data to be used for retrieving a traffic information center from coordinates; that of FIG. 20 which is a diagram showing an example of the structure of data to be used for retrieving the traffic information center from a toll/local telephone number; that of FIG. 21 which is a diagram showing an example of the structure of road name code number data; that of FIGS. 22(a) and 22(b) which are diagrams showing an example of the structure of data to be used for retrieving the traffic information center from the road name code number; the routing illustrated in FIGS. 23(a) to 23(c) which are diagrams showing transitions of screens for transmitting traffic information automatically; and the flow chart of the automatic transmission routine for providing traffic information as shown.

Figure 19:
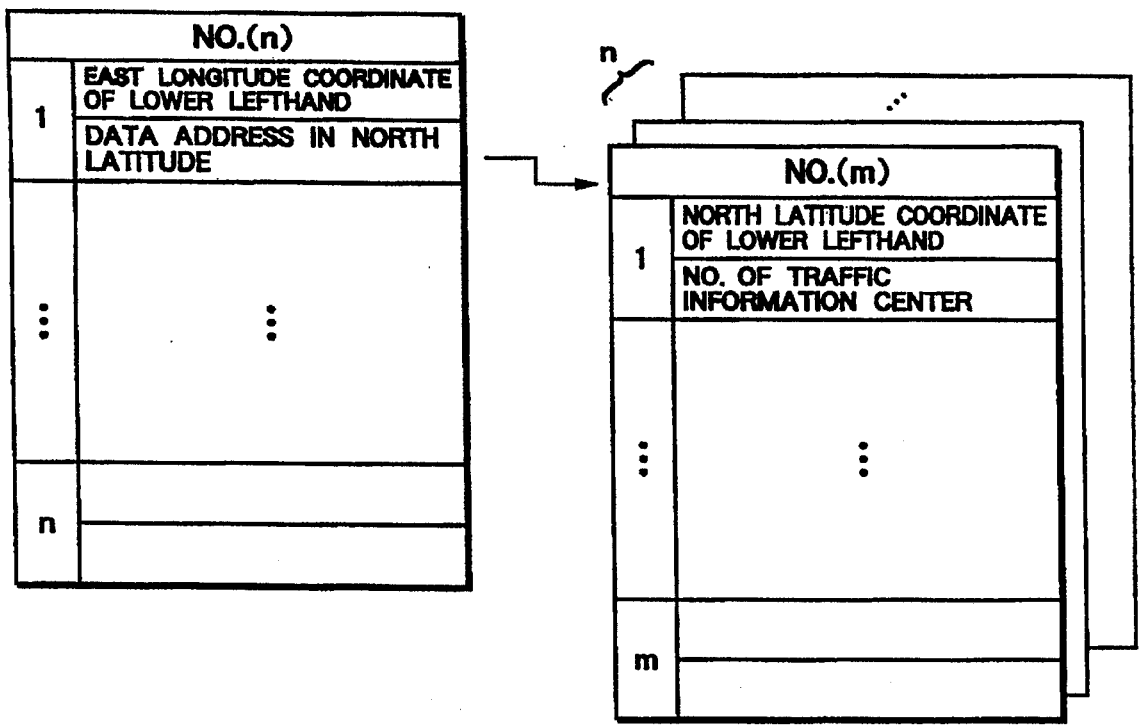
FIGS. 19(a) and 19(b) are diagrams showing an example of the structure of data to be used for retrieving a traffic information center from coordinates.
Figure 19:
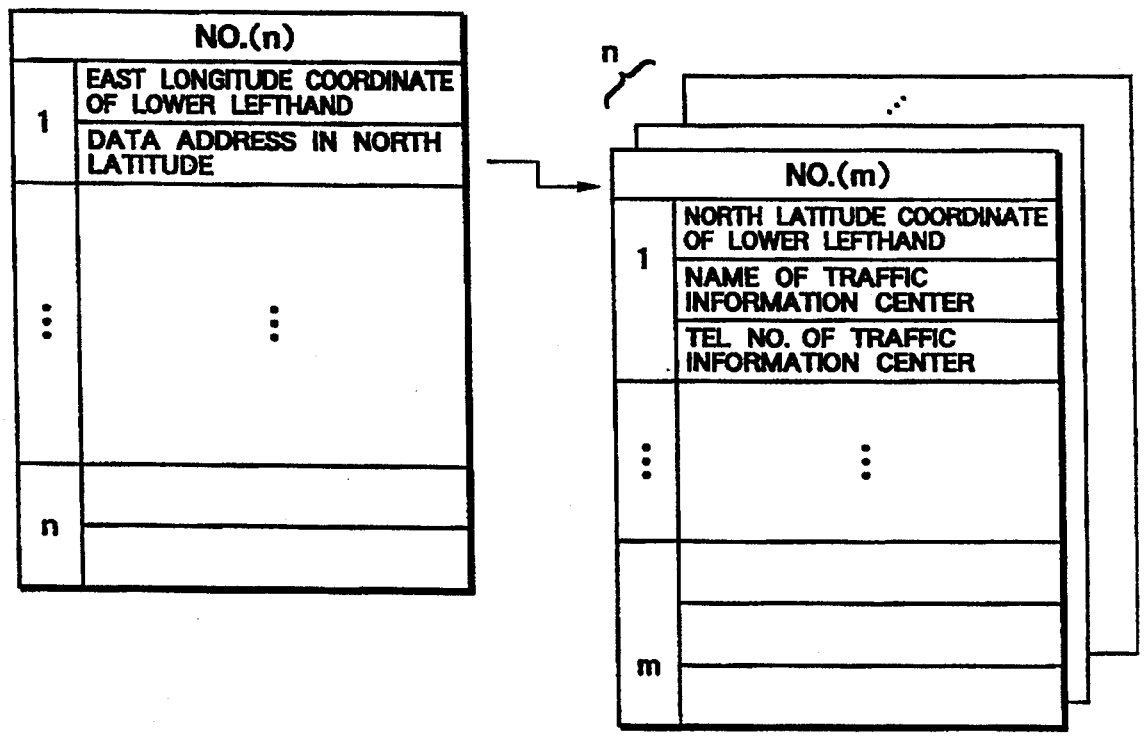

The data to be used for the contacts by telephone function for obtaining traffic information is of a structure exemplified by that used for retrieving the traffic information center from the coordinates (of the present position), as shown in FIG. 19, that for retrieving the traffic information center from the toll/local number, as shown in FIG. 20, and that for retrieving the traffic information center based on type of road and the road name code No., as shown in FIGS. 21 and 22. The data for retrieving the traffic information center from the coordinates is structured like the retrieval data of the "WEATHER FORECAST SERVICE" previously described with reference to FIG. 14(c), in that it includes the No., name and telephone number of the traffic information center in terms of the north latitude coordinates of the lower lefthand from the east longitude coordinate of the lower lefthand through the north latitude data address. On the other hand, the data for retrieving the traffic information center from the toll/local number is structured for retrieval of the No., name and the telephone number of the traffic information center in terms of the starting toll/local number to the ending toll/local number. The data for retrieving the traffic information center from the road name code No. is structured for retrieval of the name and telephone number of the center through the traffic information center No. based on information identifying the roads as expressways, urban expressways or trunk roads and the road name code No. in terms of the starting road name code No. to the ending road name code No.

Figure 24:
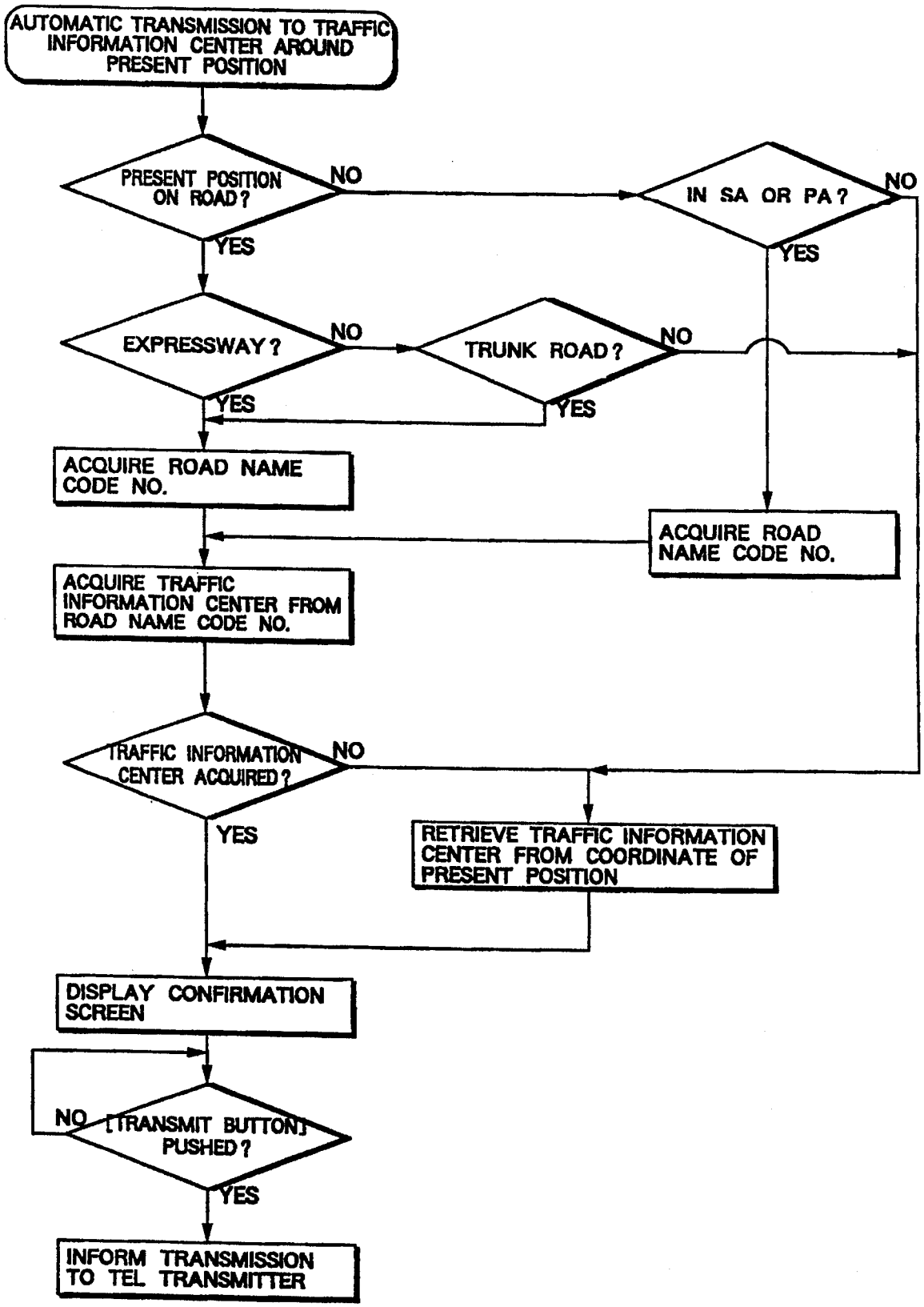
FIG. 24 is a flow chart of a routine for automatic transmission of traffic information.

In the automatic transmissions to the traffic information center, provision is made for the individual selection of the area of the destination, the area of the present position and other specified areas by input through the screen, as shown in FIG. 23(b). In the case of selection of the present position, it is at first decided, in terms of the coordinates obtained from the detection of the present position, whether the present position is on the road, as shown in FIG. 24. If the answer is YES, it is decided if the present position is on an expressway, trunk way or other ordinary road and then the road name code No. or the coordinates are acquired. If the present position is not on a road, a road name code No. is nevertheless acquired if the present position is in a service area (i.e., SA) or parking area (i.e., PA), or otherwise, the coordinates are acquired.

If the road name code No. is acquired, the traffic information center is acquired from the road name code No., and a confirmation screen is then displayed. If not, the coordinates are acquired and the information center is retrieved from the coordinates of the present position so that the confirmation screen is displayed, as shown in FIG. 23(c). The transmission key and the decision key are displayed in the confirmation screen. When the transmission key is touched, the telephone number is sent as the transmission notice to the telephone transmitter. When the decision key is touched, the previous screen is restored.

Figure 25:
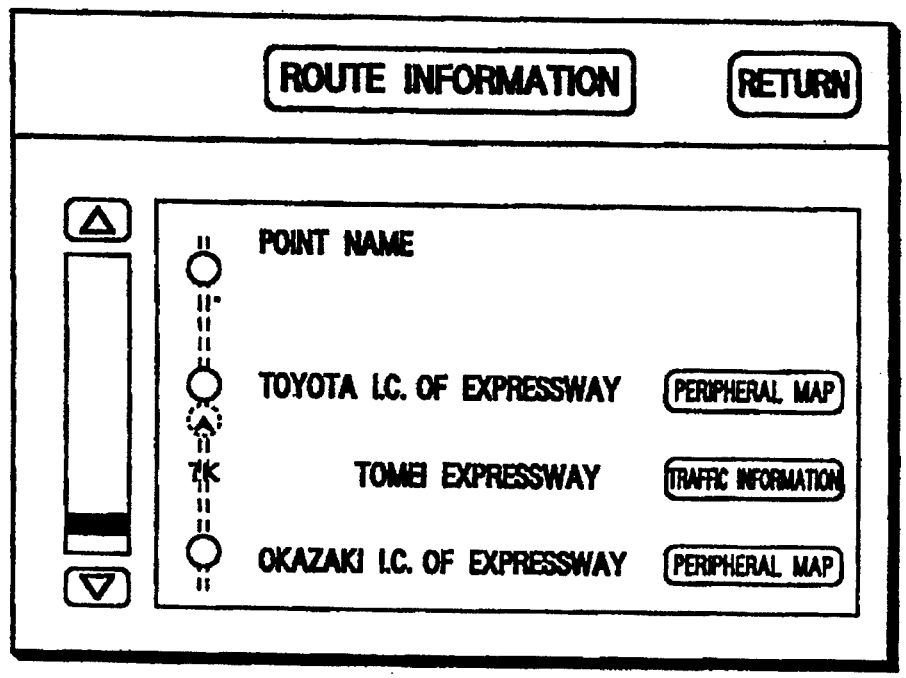
FIGS. 25 (a) and 25 (b) are diagrams of examples of screens used in the automatic transmission of traffic information, for a route scheduled to be travelled, by a route information display.
Figure 25:
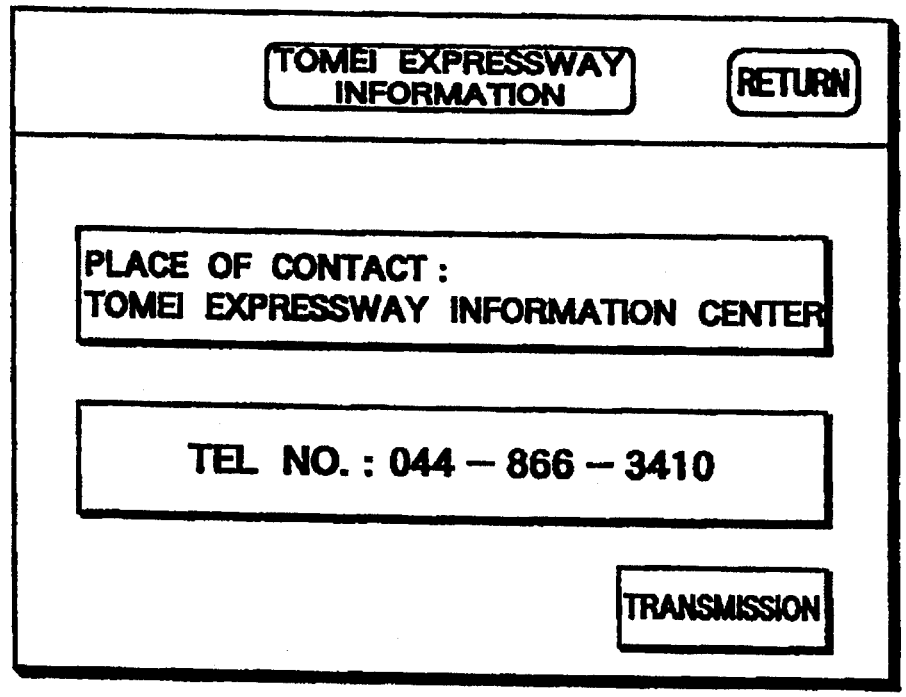

FIGS. 25(a) and 25(b) are diagrams showing an example of screens for automatic transmissions of the traffic information for the route scheduled to be passed during a route information display. Circles designate points which have names to their sides, and type of road is indicated between the points. To the side of these, are displayed keys for selecting area maps corresponding to the points. To the side of the name identifying the type of road, there is displayed a key for acquiring the traffic information. Arrows are keys for scrolling the list line by line. FIG. 25(a) also displays a "TRAFFIC INFORMATION" key to the right of the name of the route to be travelled, which key is touched to display the contacts-by-telephone screen of FIG. 25(b). If the transmission key of FIG. 25(b) is touched, the telephone number is sent as the transmission notice to the telephone transmitter.

Figure 26:
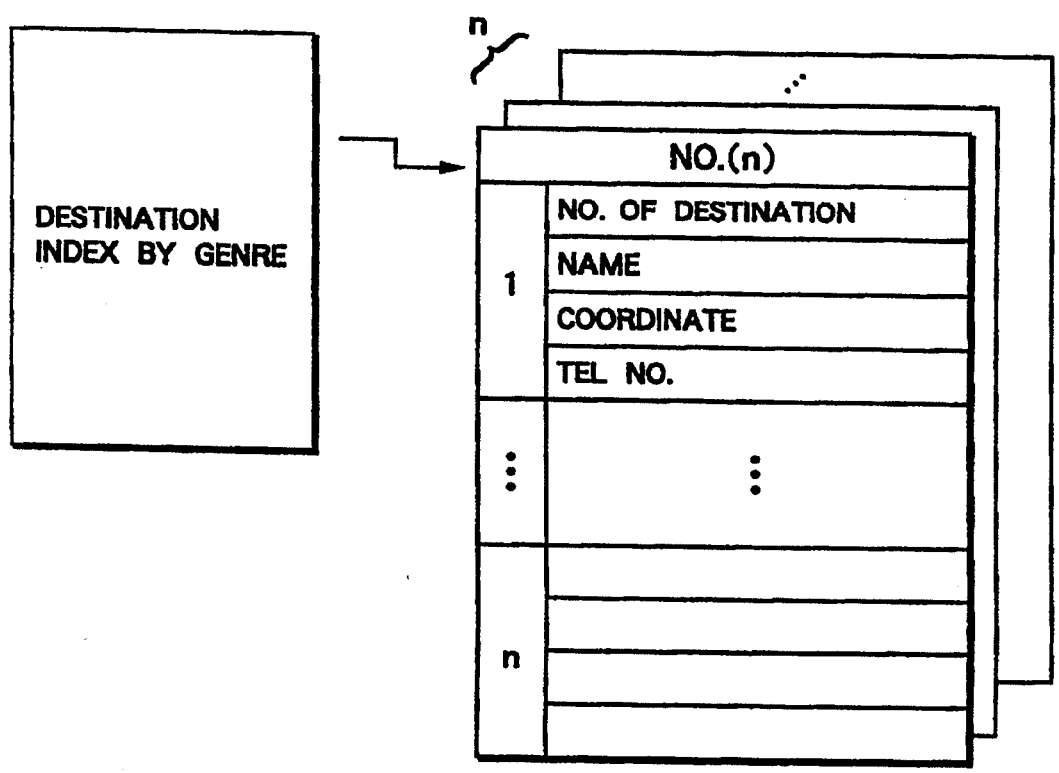
FIGS. 26 (a) to 26 (e) are diagrams showing examples of the structure of data to be used for contacts-by-telephone of a destination.

The setting of the destination is by one of two possible routines. In one routine a so-called "registered destination" registered in advance in the recording medium is retrieved and set. In the other routine the point is set by inputting the telephone number and by reading the map with setting the point by specifying the area or the like. For these operations, all the destinations to be selected and specified are recorded as the registered destinations in the recording medium such as the CD. This registered destination data has its data structure arranged in a destination index by genre, as shown in FIG. 26(a), so that the desired destination may be easily retrieved by accessing it through the index. Moreover, the data for each registered destination includes the number, name, coordinates and telephone number of the destination.

The destination data stored in the memory by setting the destination is: that extracted as is from the registered destination data, as shown in FIG. 26(b), if set from the registered destination; that having no destination number but composed of the address or name of the area, the coordinates and the inputted telephone number, as shown in FIG. 26(c), if the destination is set by input of a telephone number; and that composed of the address name and the coordinates, as shown in FIG. 26(d), if the destination is set by another method. The telephone number data so stored is composed of the toll number, the local (exchange) number and the subscriber's number, as shown in FIG. 26(e).

Figure 27:
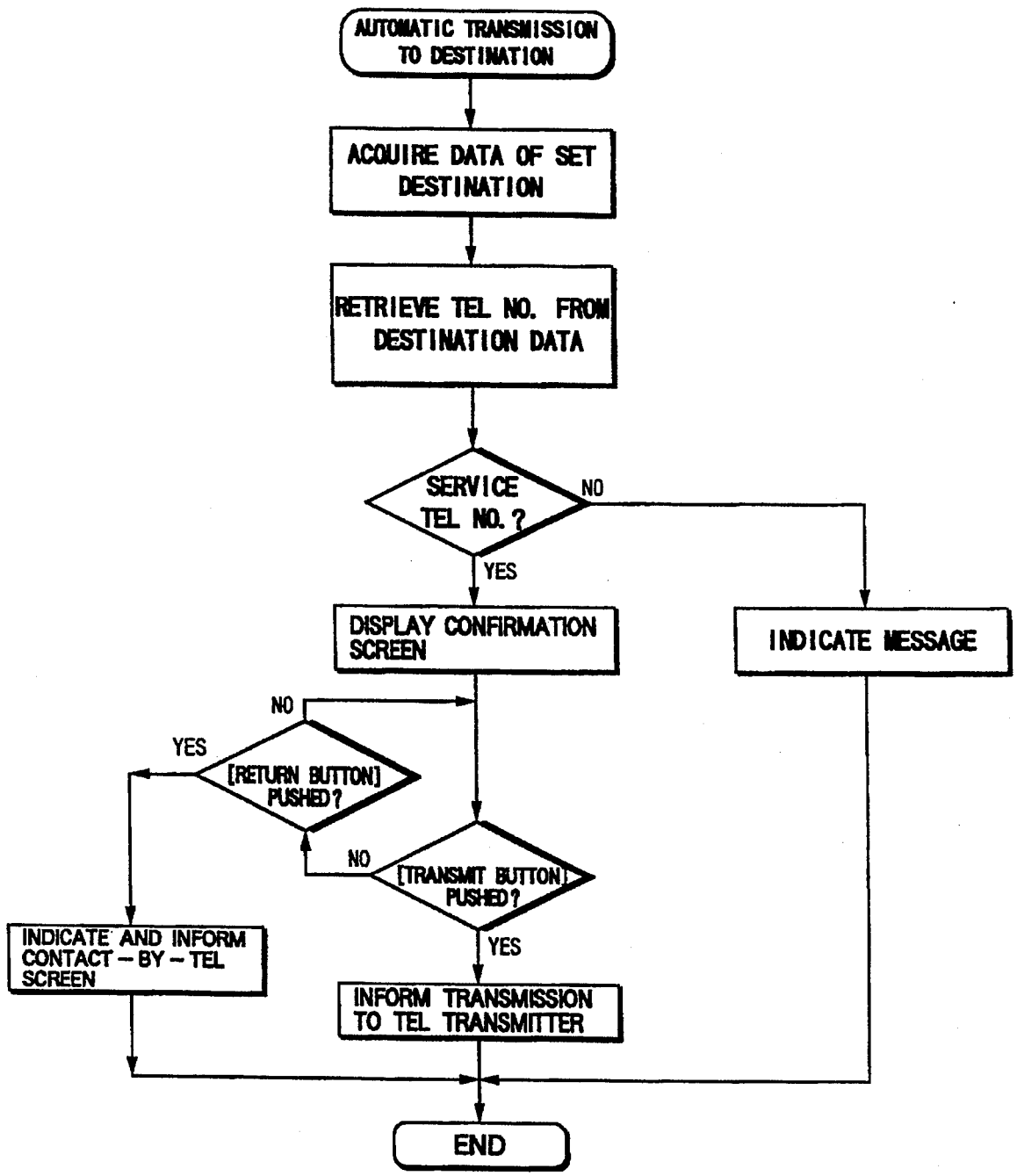
FIG. 27 is a flow chart for transition of screens for the automatic transmission to the destination.
Figure 28:
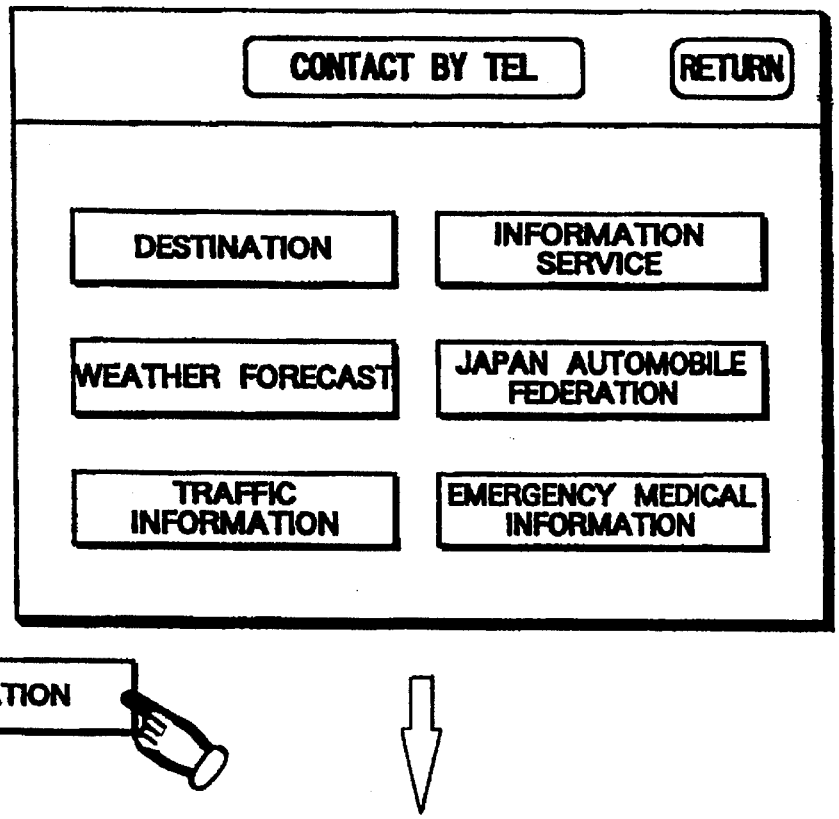
FIGS. 28 (a) to 28 (d) are diagrams illustrating screen transitions in the automatic transmission to the destination.
Figure 28:
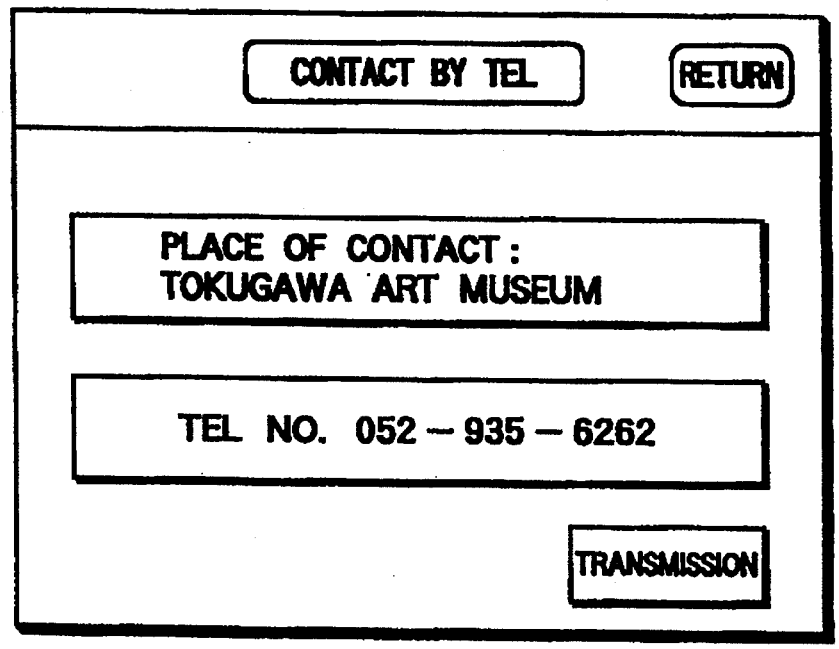

In the case of the automatic transmissions to the destination, therefore, the destination data, as set in FIGS. 26(b) to 26(d), is acquired, as shown in FIG. 27, and the telephone number is retrieved from the destination data. As a result, in the case of FIG. 26(b) or 26(c) having the telephone number, there is displayed a confirmation screen having the place of contact (i.e., address name) and the telephone number, as shown in FIG. 28(b) or 28(c). In the case of FIG. 26(d), having no telephone number, the message "TEL No. couldn't be retrieved" is displayed at the center of the screen, as shown in FIG. 28 (d). In the confirmation screen, the transmission key and the decision key are displayed. The telephone number is sent as the transmission notice to the telephone transmitter, if the transmission key is touched, but the previous screen is restored if the decision key is touched.

Here will be described an example in which the "around to City of Shizuoka Prefecture" is to be set as the destination. When the destination setting switch B is pushed, as shown in FIG. 10, the screen of the display is changed to the destination setting screen shown in FIG. 12. One of the individual buttons is touched on this screen to set the desired point and, as a result, there is displayed a map which is more detailed than a scale of 1/80,000. Incidentally, the home and the memory point are registered in advance, and the vicinity of the present position and the previous starting point can be respectively selected if the present position has been set and if the destination guide has been used.

Figure 29:
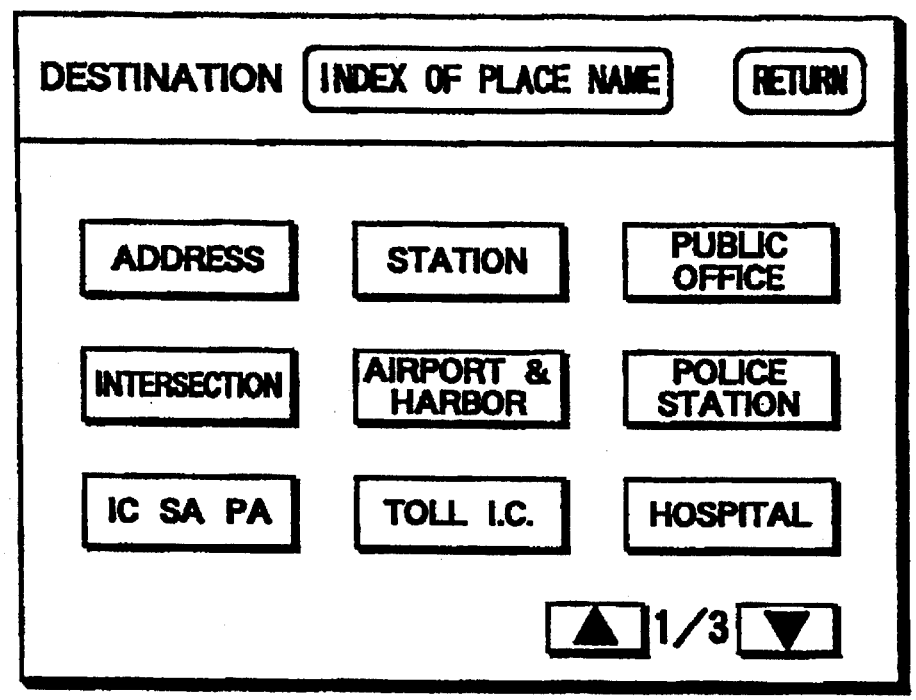
FIGS. 29 (a) to 29 (c) are diagrams showing an example of transition of destination setting screens by indexing the place name.
Figure 30:
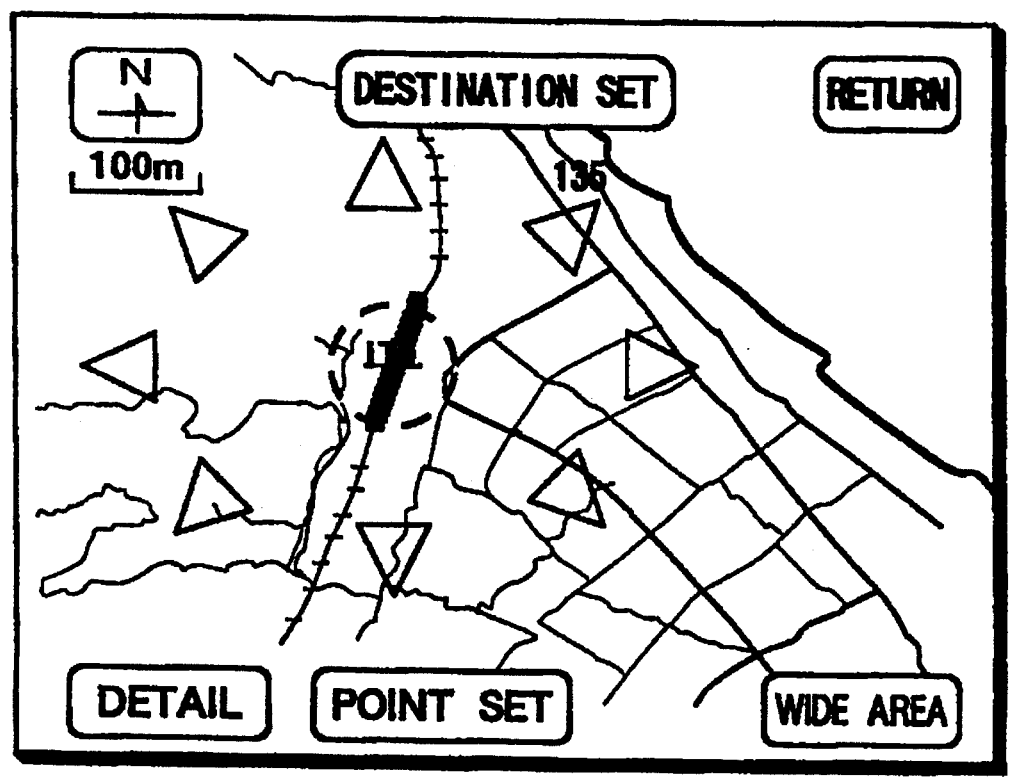
FIG. 30 is a diagram showing an example of transition of screens in setting the destination.
Figure 31:
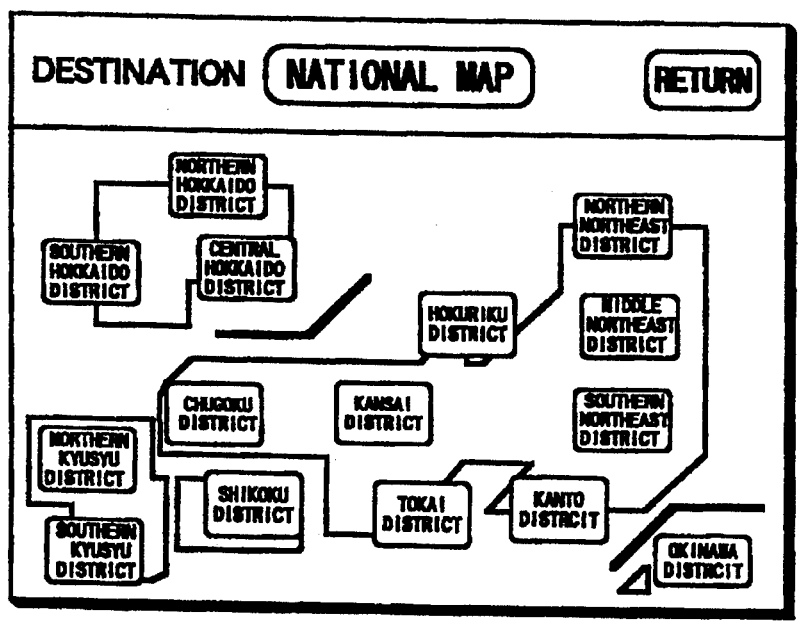
FIGS. 31(a) to 31(d) are diagrams showing an example of transition of destination setting screens utilizing a national map.
Figure 31:
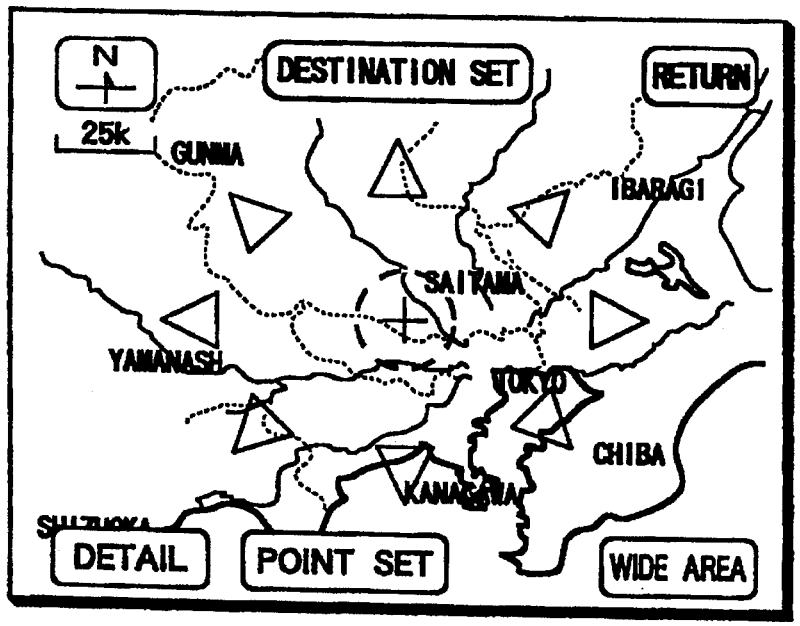
Figure 31:
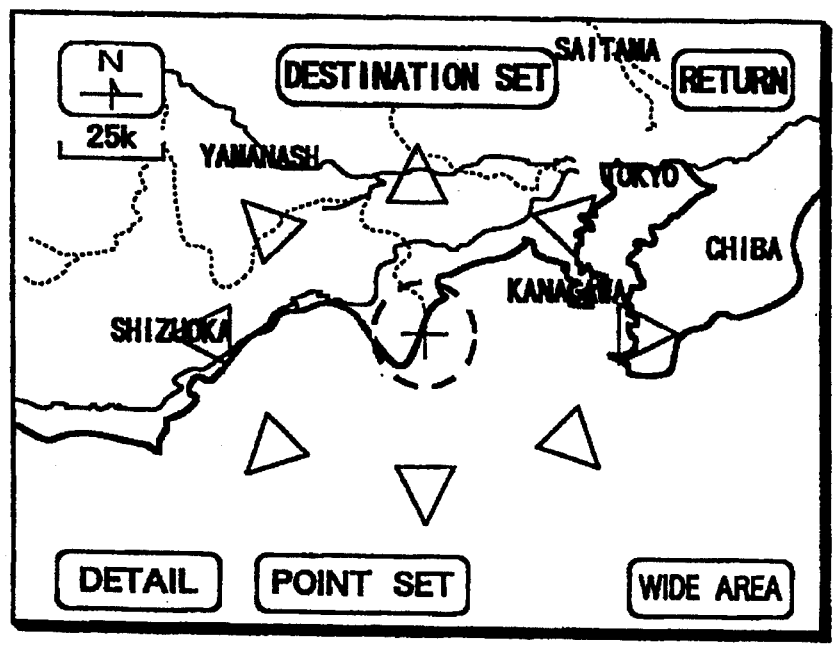
Figure 31:
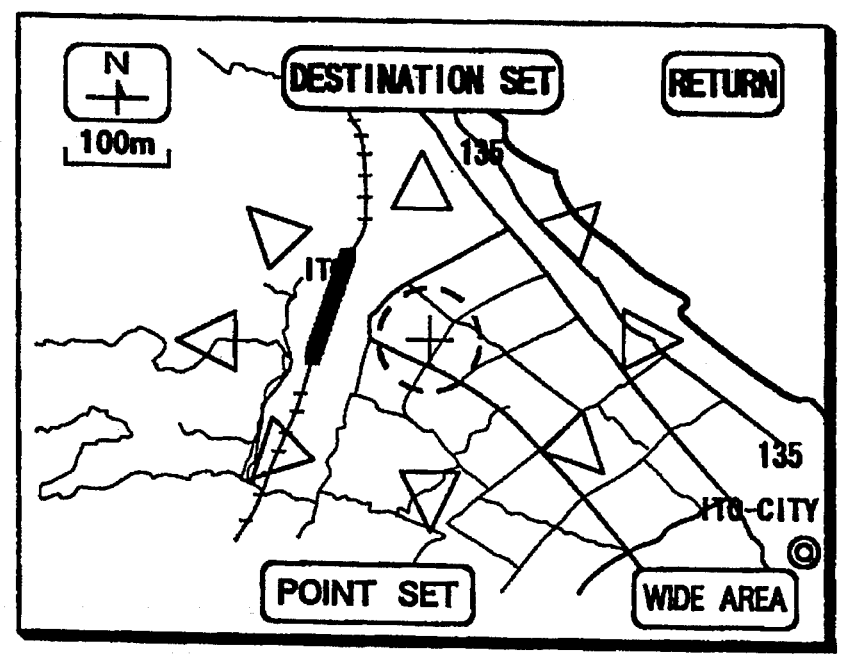
Figure 32:
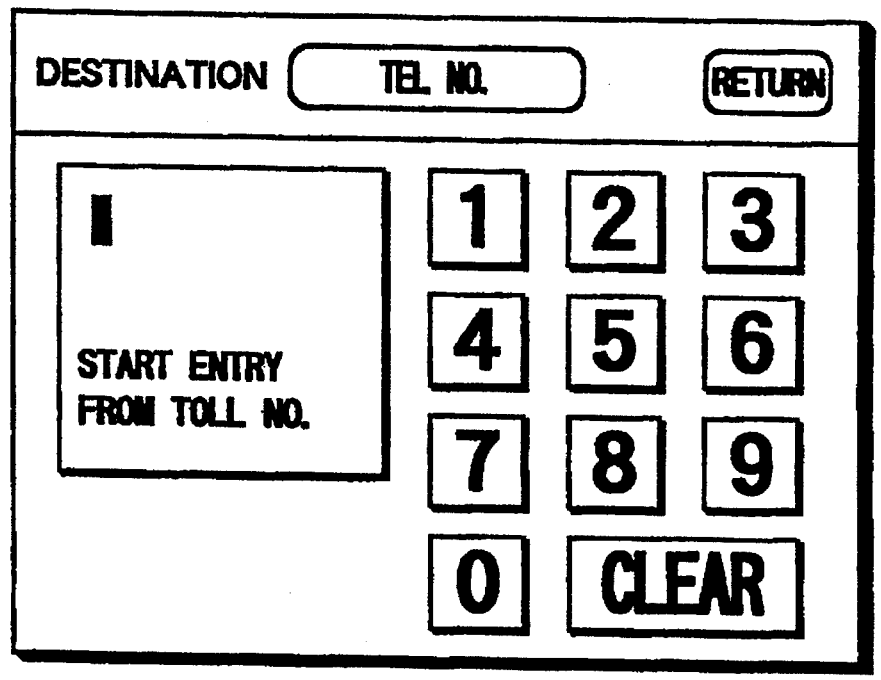
FIGS. 32 (a) to 32 (d) are diagrams showing an example of transition of the destination setting screens using a telephone number as an input.
Figure 32:
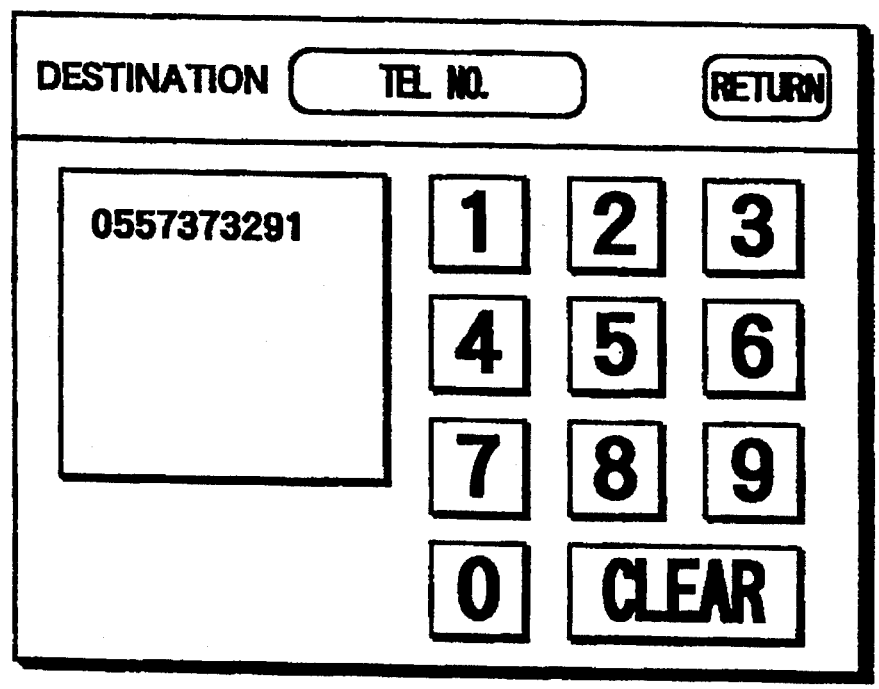
Figure 32:
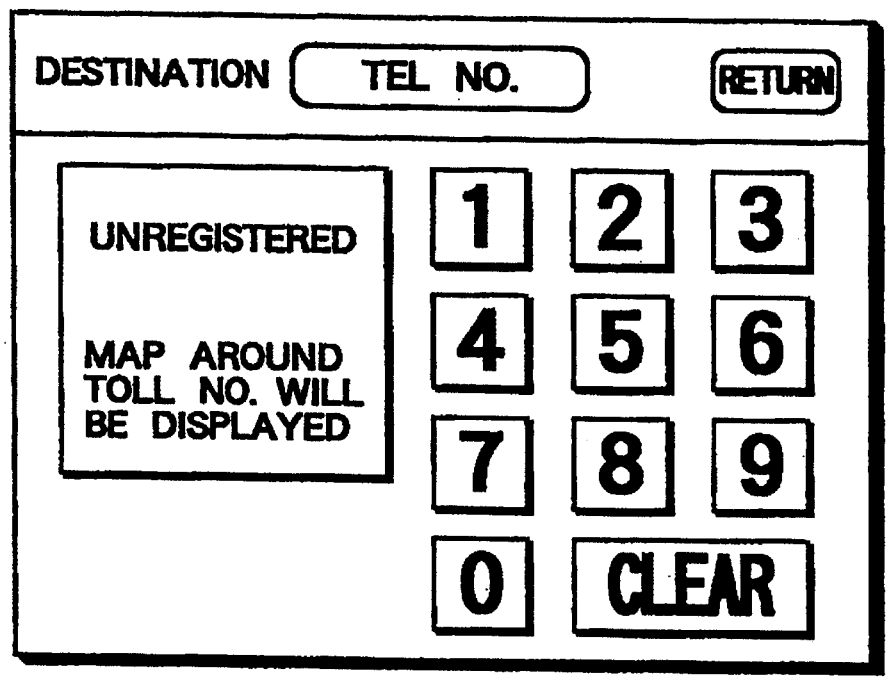
Figure 32:
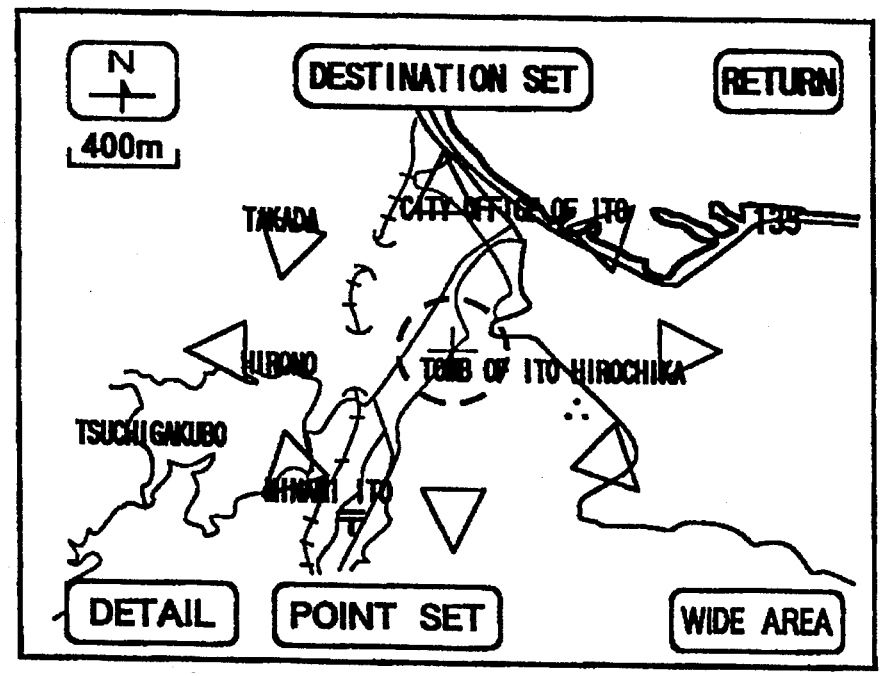

When the place name index is selected (or touched) on the screen, the screen is changed to the place name retrieval screen, as shown in FIG. 29 (a). Triangles on the screen designate keys for switching the lists, and "1/3" between the triangles indicates that the list is the first of three. FIGS. 29(b) and 29(c) show an example of screen transition in which, after the station is selected, the desired name list for Shizuoka Prefecture and the desired railway list for the JR Line are sequentially set in the central frame. The screen is so controlled by these operations that when the station name list is displayed to set Ito Station, as shown in FIG. 30, the map for the area of Ito City is displayed. In case the national map is selected, the screen is changed to the national map, as shown in FIG. 31(a). If Kanto Shizuoka near Ito City is selected from the national map, the screens are changed from FIG. 31(b) to 31(d), and the map of a scale of 1/10,000 can be selected by pushing the "DETAIL" key. If the "TEL No." key is selected, the screen is changed to the telephone number screen, as shown in FIG. 32(a). If the telephone number is then input from the toll number, as shown in FIG. 32(b), the map for the vicinity of the local number is displayed, as shown in FIG. 32(d). The destination is set on the map of the area of the Ito City thus displayed.

As has been described hereinbefore, the navigation system having the automatic telephone transmitting function according to the present embodiment includes memory means having divided areas for individually storing telephone numbers as retrieving data; telephone transmission means for transmitting the telephone number specified by the transmission notice; specification input means for specific input through a key or a point on the screen of a display; and retrieval processing means for retrieving information from said memory means on the basis of the input from said specification input means and for a transmission notice to said telephone transmission means by the telephone number for the area containing said specification information, whereby area information is acquired in accordance with said specification information selected from the screen of the display. As a result, the driver acquires information on the vicinity of a desired point merely by touching the screen of the display with neither searching nor dialing the telephone number. Since, moreover, the telephone transmissions are carried out on the basis of the information stored in the memory, it is possible to accomplish the telephone transmissions to the weather forecast service, the JAF, the information service and the traffic information without fail. As a result, the dialing operations during the drive can be automated to allow the driver to concentrate on driving, thus improving driving safety.

The navigation system further includes: memory means for storing the data by which telephone numbers are added to the register of places of destination; telephone transmission means for transmitting the telephone number specified by the transmission notice; and retrieval processing means for displaying on a specification screen the registered places and for issuing the transmission notice to said telephone transmission means in terms of the telephone number of registered place stored in said memory means, responsive to operation of a touch panel, whereby the telephone transmission is made to the selected registered place. Thus, the telephone transmission can be accomplished merely by touch selection of the destination, a point in transit or a registered facility. Even in case contact is desired with the destination or a point in transit while the vehicle is running, a telephone call can be conveniently made.

Incidentally, the present embodiment is not limited to the foregoing example but can be modified in various respects. Although the automatic transmission to the destination in the example is by selecting the key for the destination, for instance, the user may register not only the destination but also a telephone number in the existing data base so that the user may be able to make an automatic transmission to that registered place. In this modification, the "DESTINATION" key on the contacts-by-telephone screen may be changed to the "POINT SPECIFICATION" which can be selected to choose either the "DESTINATION" or the "REGISTERED PLACE", for retrieval by genre or in alphabetical order. Alternatively, the registered point may be indicated on the map, or the registered place list may be displayed and touched for input. Moreover, an intermediate point on the displayed route or the route area may be specified. In the Information Guide Service or the Weather Forecast Service, furthermore, the coordinates may be input to retrieve the representative point of the area including the coordinate input point, to thereby effect the automatic transmission.

Although the transmission is instructed through the touch panel on the screen of the display, the screen may indicate an arrow cursor or the like, which may be operated or instructed by using a joy stick or a wireless controller or by voice input through the voice recognizer 112.

Moreover, the present invention is not limited to a navigation system equipped with a telephone but may be modified to display only the information on the vicinity of the point. In this modification, the driver can easily access the information on the vicinity by a portable telephone or a pay telephone utilizing the displayed telephone number.

Moreover, the present invention has been described as a vehicular navigation system in the foregoing embodiments but can be likewise applied to a portable pocket type or note type navigation system for route guidance utilizing different means of transportation or for sight-seeing guidance. This navigation system covers not only public roads but also the means of transportation such as streetcars, subways or buses in its route guidance so that such stations are treated like the intersections of the roads. Such an application guides the setting of the destination as to what means of transportation the user should take, the station where the user should board and get off, and the direction the user should walk. Moreover, the navigation system may be disposed at the center of a station or the like so that it may be used for sight-seeing guidance. In this latter application, the navigation system can be used for reserving or confirming the hotel by telephone or for setting a sight-seeing facility as a transit point. Especially in a large city or sight-seeing resort having complicated means of transportation, the navigation system is useful for a foreigner and can be conveniently utilized for contacts with the destination.

As is apparent from the description thus far made, according to the present invention, the telephone number of the destination, a transit point or a registered facility can be retrieved and automatically called, not by input, but merely by selection of a retrieval key, an automatic telephone transmission can be accomplished. Moreover, the telephone number transmitted is retrieved from the data base so that there is little chance of error. The telephone transmission to a destination such as the Weather Forecast Service, the Traffic Information Service or the JAF involves access to the correct telephone number without opportunity for mistake.

Figure 33:
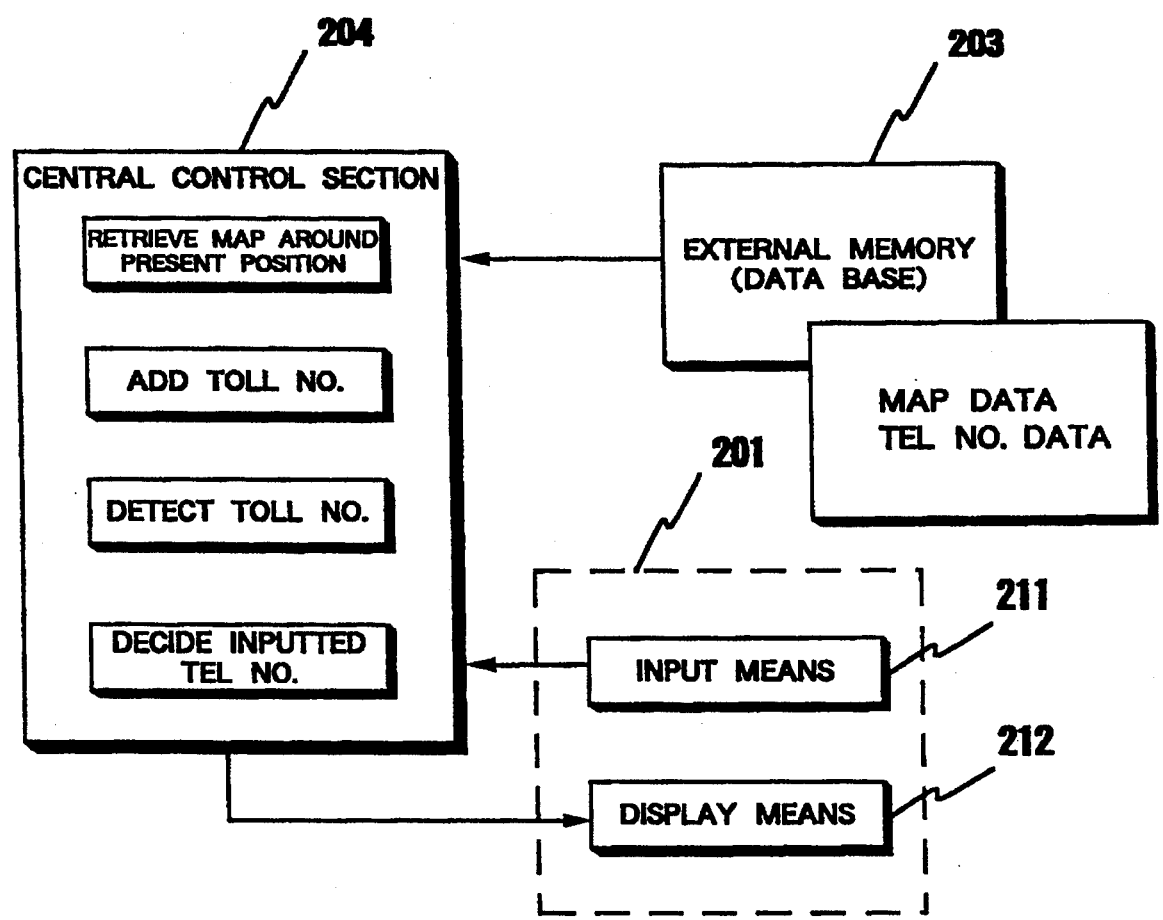
FIG. 33 is a block diagram of hardware for realizing the function of display of a map for the vicinity of a point by inputting a telephone number.
Figure 34:
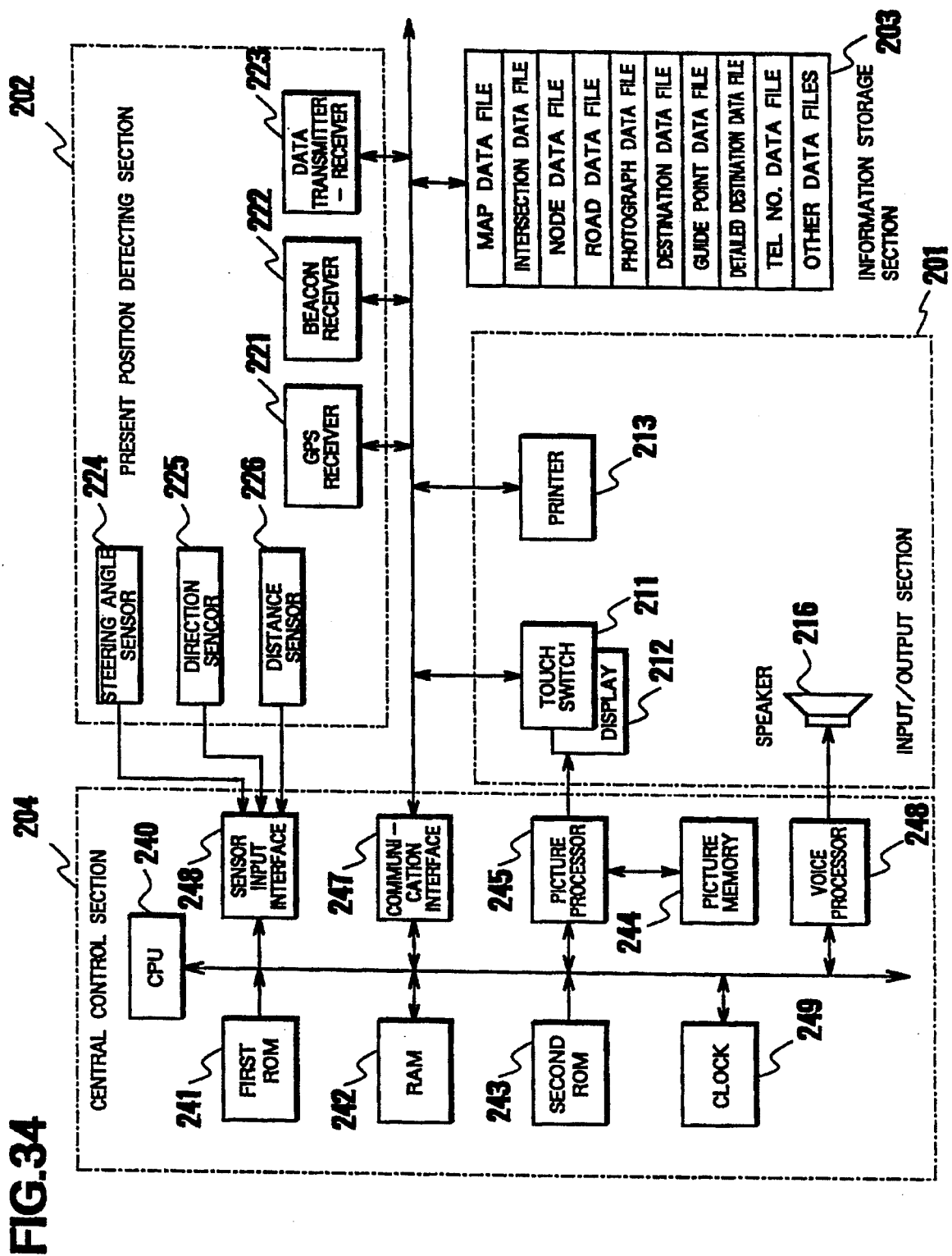
FIG. 34 is a block diagram showing one example of the construction of a navigation system having the function of displaying a map for the vicinity of a point by inputting the telephone number.

Here will be described with reference to the accompanying drawings an embodiment of the navigation system which functions to display the map of the vicinity of a point by inputting the telephone number from a local number. FIG. 33 shows a hardware construction for providing a display of a local number inputting map covering the area having the common local exchange number. FIG. 34 shows construction of the navigation system which functions to display a map by inputting a local exchange number after the toll number has been automatically retrieved on the basis of the present position.

The navigation system includes: an input/output section 201 for inputting/outputting information pertaining to route guidance; a present position detecting section 202 for detecting information as to the present position of the vehicle of the user; an external memory section 203 recorded with navigation data necessary for calculating the route and the display of guide data necessary for guidance; a central control section 204 for executing the route retrieval processing and the display guide processing necessary for the route guidance and for controlling the entire system.

The input/output section 201 functions to input a destination, to instruct the central control section 204 to execute the navigation processing according to the will of the user, so that the guide information can be displayed by voice and/or on the screen as the driver desires, to output the processed data or the communication data to a printer or by voice via a speaker, and to output and display the same in the display. The input means for realizing these functions is composed of a touch panel 211 which displays touch switches for inputting the destination by the address, telephone number and coordinates and for requesting the route guidance. On the other hand, the output means is composed of: the display 212 for displaying the input data on the screen and for displaying the route guide, either upon a request of the driver or automatically; a printer 213 for printing the data processed by the central control section 204 or the data stored in the external storage section 203; and a speaker 214 for outputting the route guidance by voice.

A voice recognizer can be added to provide for voice input or a card reader for reading out the data recorded in the IC card or the magnetic card. A data communication system can also be added for transfer of data with an information source such as the information center, which stores the data necessary for navigation and offers the data through communication lines upon a request of the user, or with an electronic note which is prestored with data specific to the user such as map data or destination data.

The display 212 is a color CRT or a color liquid crystal display, and displays in colors, not only all the screens necessary for the navigation such as the destination setting screen, the route guide screen, the section map screen, the intersection map screen and the retrieved point vicinity map screen based on the map data and guide data processed by the central control section 214, but also button switches in the screen for setting the route guide, for selecting the route guidance and for switching the screens. The route guide screen includes at least the screens for displaying the whole route map, the route information and the vicinity map. The display 212 is a touch panel 211 with display of the function buttons, so that the aforementioned operations may be executed on the basis of signals inputted by touching the buttons. These buttons and touch panel 211 constitute the input means, the detailed description of which is omitted here.

The present position detecting section 202 is composed of: a GPS receiver 221 making use of the global positioning system (i.e., GPS); a beacon receiver 222; a data transmitter-receiver 223 for receiving the corrected signals of the GPS by using the cellular phone or FM multiplex signals; a steering angle sensor 224 exemplified by a wheel sensor or a steering sensor; an azimuth sensor 225 exemplified by a magnetic sensor; and a distance sensor 226 for detecting the distance travelled in terms of the R.P.M. of the wheels.

The external storage section 203 is a data base which is stored with all the data necessary for the route guide, such as maps, intersections, nodes, roads, photographs, destinations, guide points, detailed destinations, telephone numbers, branching points, display guides and voice guides. The telephone number data file related to the map data file is also stored as the map information for the point vicinity to be retrieved by inputting the local exchange numbers, as is necessary for practicing the present invention.

The central control section 204 is composed of; a CPU 240 for executing arithmetic operations; a first ROM 241 stored with not only programs for processing a route retrieval, for a display control necessary for the route guide and for a voice output control for a voice guide but also data necessary for executing these programs; a RAM 242 for temporarily storing the retrieved route guide information and the data being arithmetically processed; a second ROM 243 stored with display information data necessary for the route guide and the map display; a picture memory 244 stored with picture data to be used for the screen display; a picture processor 245 for retrieving the picture data from the picture memory on the basis of a display control signal coming from the CPU to process the picture data and output the processed data to the display; a voice processor 246 for synthesizing and converting the voice, phrase, sentence and/or sounds read out of the information storage section 203, on the basis of a voice output control signal coming from the CPU, into analog signals and for outputting these signals to the speaker; a communication interface 247 for transferring the input/output data through communications; a sensor input interface 248 for receiving the sensor signal of the present position detecting section; and a clock 249 for connecting data with times in the internal diagnosis information.

The present system is constructed so that the driver can select the route guide from the screen display or the voice output.

In the present system, moreover, the present position is determined by calculating an estimated position on the basis of the various sensor signals coming from the present position detecting section and the GPS data, by determining the position on the road from the correlations among the estimated position, the road on the map and the GPS data.

Furthermore, the present system functions to decide whether or not the present position is approaching a guide point predetermined with respect to the position of the line of the vehicle, in view of the route to the destination. Specifically, thanks to the aforementioned function, the timings are decided for automatically outputting voice instruction at a predetermined distance from an intersection on the guide route or upon transit of the intersection and for outputting the display of the intersection information such as the name of the intersection. On the basis of this decision, instructions are issued to the picture processor and the voice processor. When the request signal is inputted, the voice processor is instructed to provide voice guidance.

Figure 35:
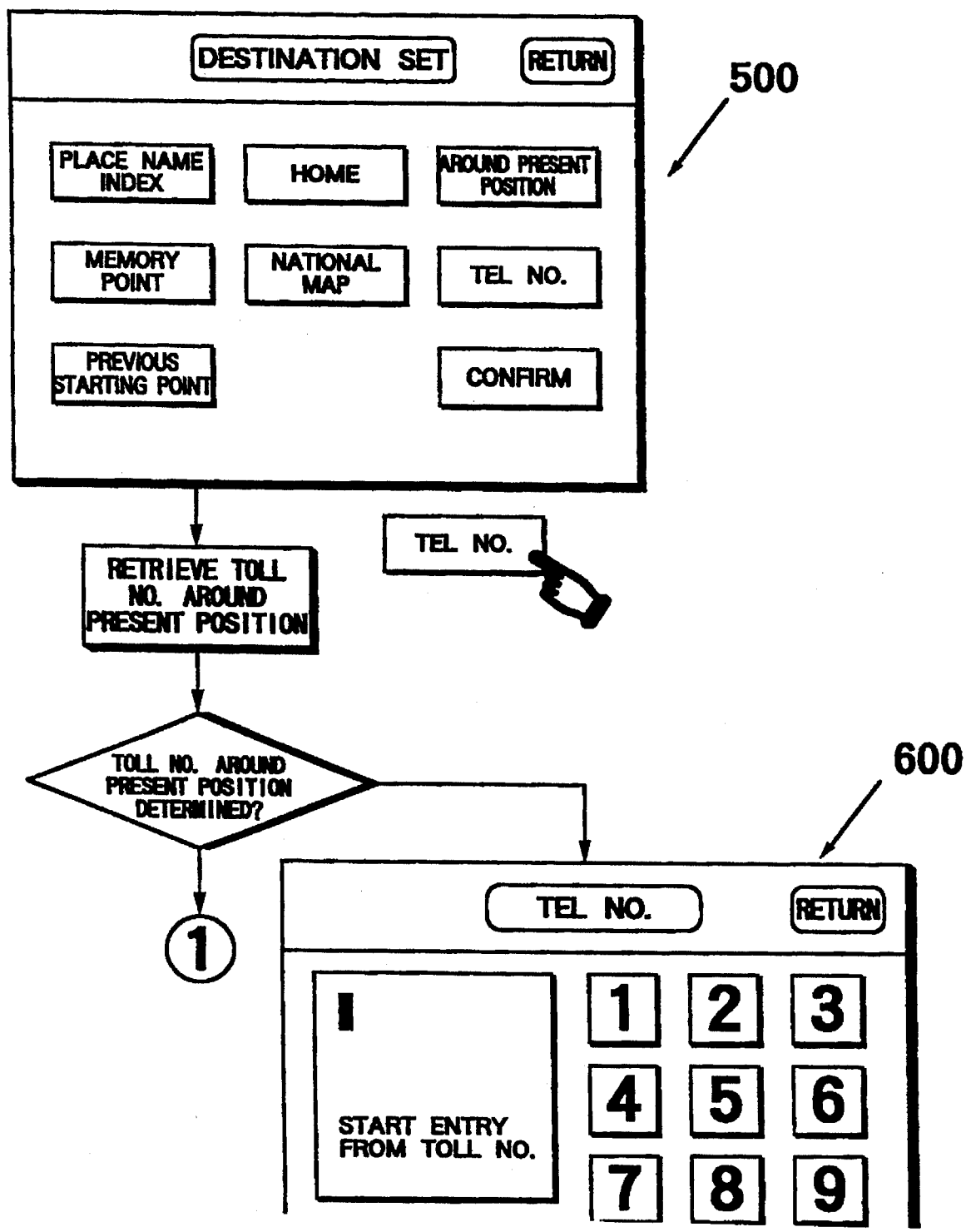
FIG. 35 is a block diagram of a routine for displaying a map of the vicinity around the present position by inputting a local telephone number.

FIG. 35 is a block diagram for a routine of displaying a map of the vicinity around the present position by inputting a local telephone number in accordance with an embodiment of the navigation system of the present invention. In the present embodiment, a relevant local telephone number is acquired by dividing telephone numbers into blocks by toll numbers, on the basis of the map data, and by retrieving the block containing the present position from the east longitude and north latitude of the present position acquired as the present position information.

When the map data for a point such as the present position is to be retrieved by input of telephone number, the "TEL No." key is selected in a destination selecting screen 500.

Then, the map data and the telephone number data are retrieved from the external storage section on the basis of the present position information for the vehicle sent from the present position detecting section, and the toll number of the present position is retrieved. When the toll number for the present position is determined, a telephone number input screen 700 displaying a toll number is opened. If, on the other hand, the toll number is not fixed, a telephone number input screen 600 having no toll number displayed is opened.

Figure 36:
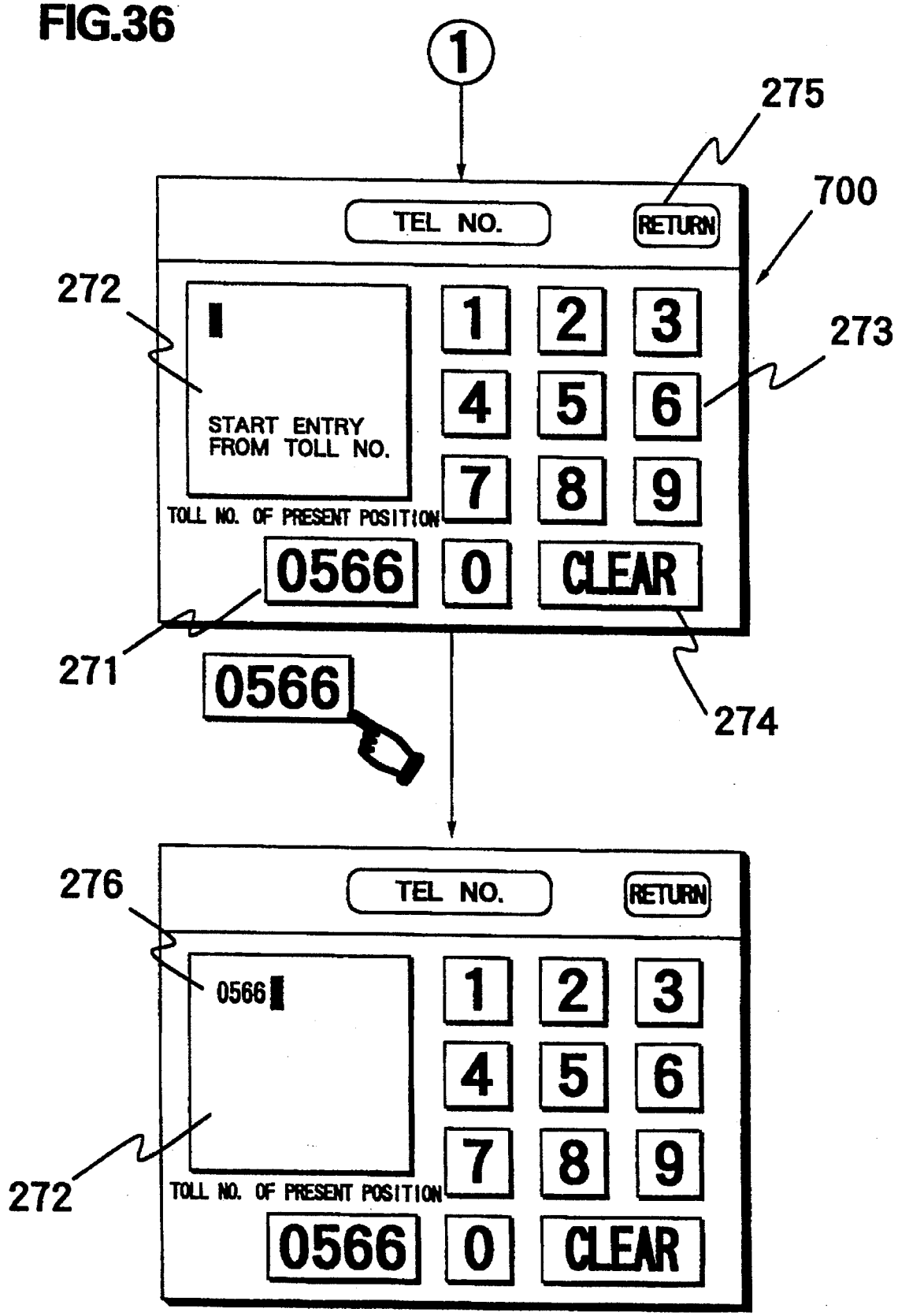
FIG. 36 is a diagram showing one example of layout of the telephone number inputting screen and transition of the screens.

When a toll number can not be fixed, the telephone number input number 600, without a toll number, display is opened, and the telephone number is input therein from the toll number. If the toll number can be fixed, the telephone number is input through the telephone number input screens of FIGS. 36 to 38. When the telephone number is to be input as the local exchange number, the local exchange number for the vicinity of the present position is displayed as a touch switch and may be inputted by a single action. Specifically, the telephone number input screen 700 having the toll number display has, as shown in FIG. 36: a toll number display switch 271 for displaying the retrieved toll number and for input of the toll number by touch; a telephone number display portion 272 for displaying a message instructing entry of the toll number and the telephone number in the cursor position; ten keys 273 for inputting the telephone number; a clear button 274 for cancelling the input telephone number; and a return button for returning the screen to the destination setting screen. If the toll number displayed in this screen is correct, the toll number 276 is displayed in the telephone number display portion 272 by touching the toll number display switch 271, and the cursor is moved to the input position of a subsequent local number. In the present embodiment, the toll number "0566" is displayed, and this telephone number is displayed in the telephone number display portion 272 after the display switch has been touched.

After the telephone number has been inputted, the name of the destination is displayed, if the inputted number is found in the destination data, and the map of the vicinity of the destination is displayed. If, on the other hand, the inputted number is not found in the destination data, a map of the vicinity of the point representing the input toll/local exchange number is displayed.

Figure 37:
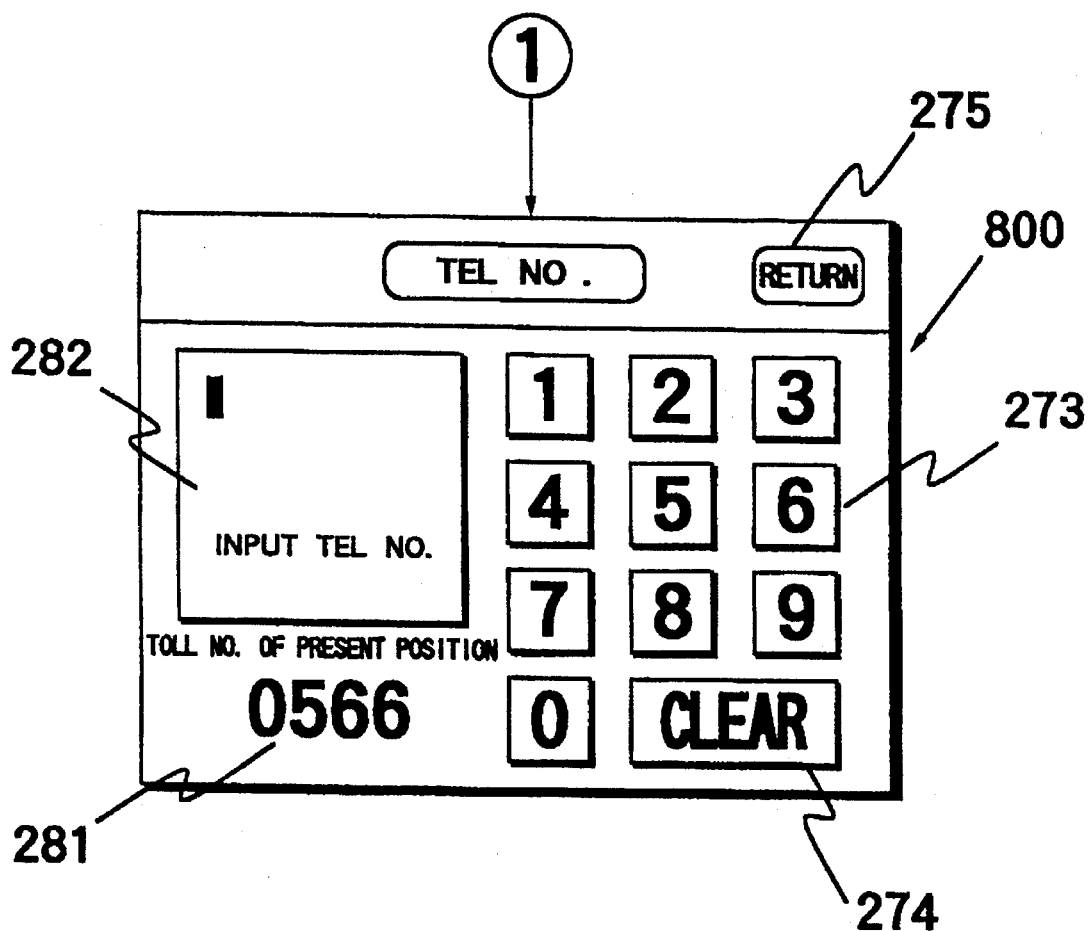
FIG. 37 is a diagram showing one example of the layout of a telephone number inputting screen for inputting a toll number while observing the toll number displayed.

FIG. 37 shows a telephone number input screen for inputting the telephone number from the toll number. The present embodiment is constructed such that the telephone number is inputted from the toll number after the toll number retrieved has been confirmed by the display. The telephone number input screen is basically identical to that shown in FIG. 36 so that its description is omitted with the components having identical functions being designated by common reference numerals.

A telephone number input screen 800 is equipped with a toll number display switch 281 for displaying the toll number of the determined present position. When the toll number is inputted by the ten keys after it has been confirmed from the display of the toll number display switch 281, the telephone number is shown in a telephone number display 282.

Figure 38:
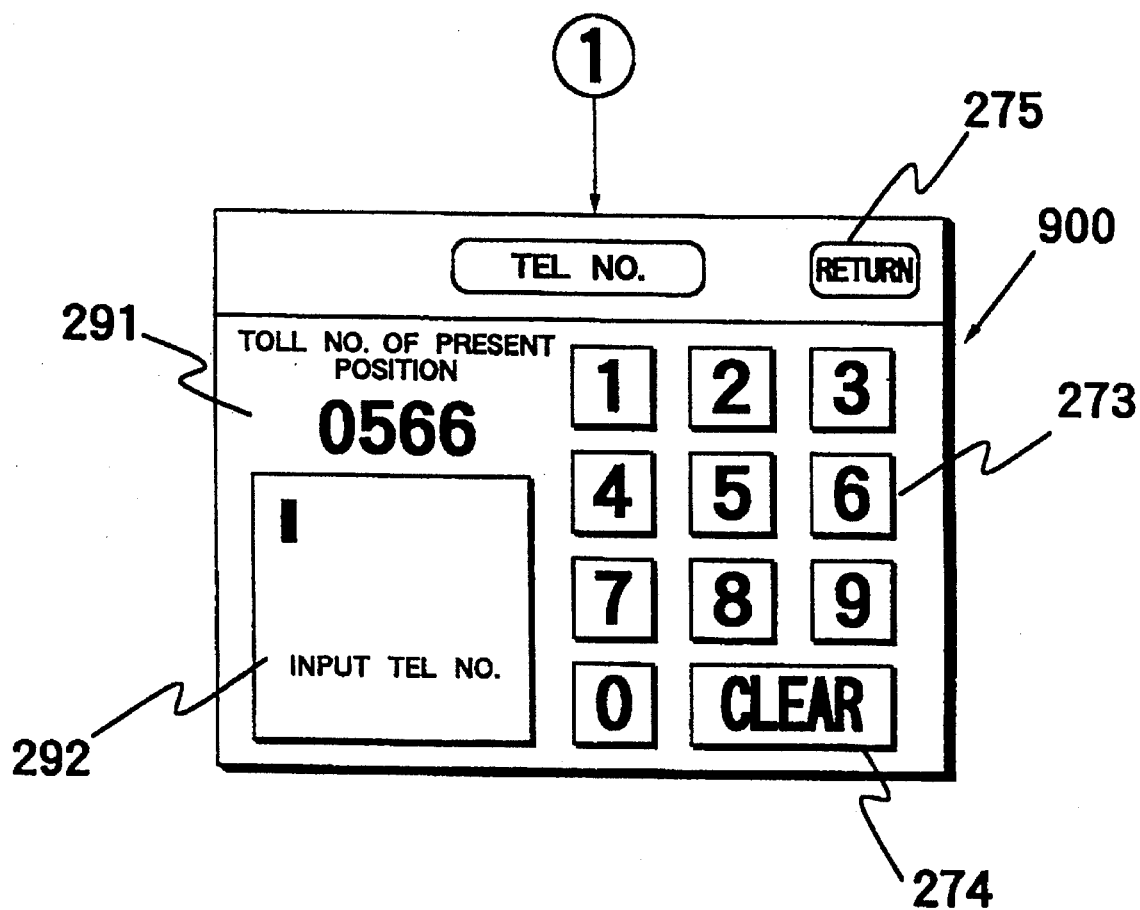
FIG. 38 is a diagram showing one example of the layout of a telephone number inputting screen for inputting a local number in case the displayed toll number is correct.

FIG. 38 shows a telephone number input screen for inputting a telephone number based on the local exchange number. In the embodiment of FIG. 38 the telephone number is inputted from its local number after its retrieved toll number has been confirmed in the display. This telephone number input screen is basically identical to that shown in FIG. 36 so that its description is also omitted and the components having identical functions have been designated by common reference numerals.

A telephone number input screen 900 is equipped with a toll number display switch 291 for displaying the toll number of the determined present position. When the toll number is inputted by operation of the ten keys after it has been confirmed from the display of the toll number display portion 291, the telephone number is displayed in a telephone number display 292.

Figure 39:
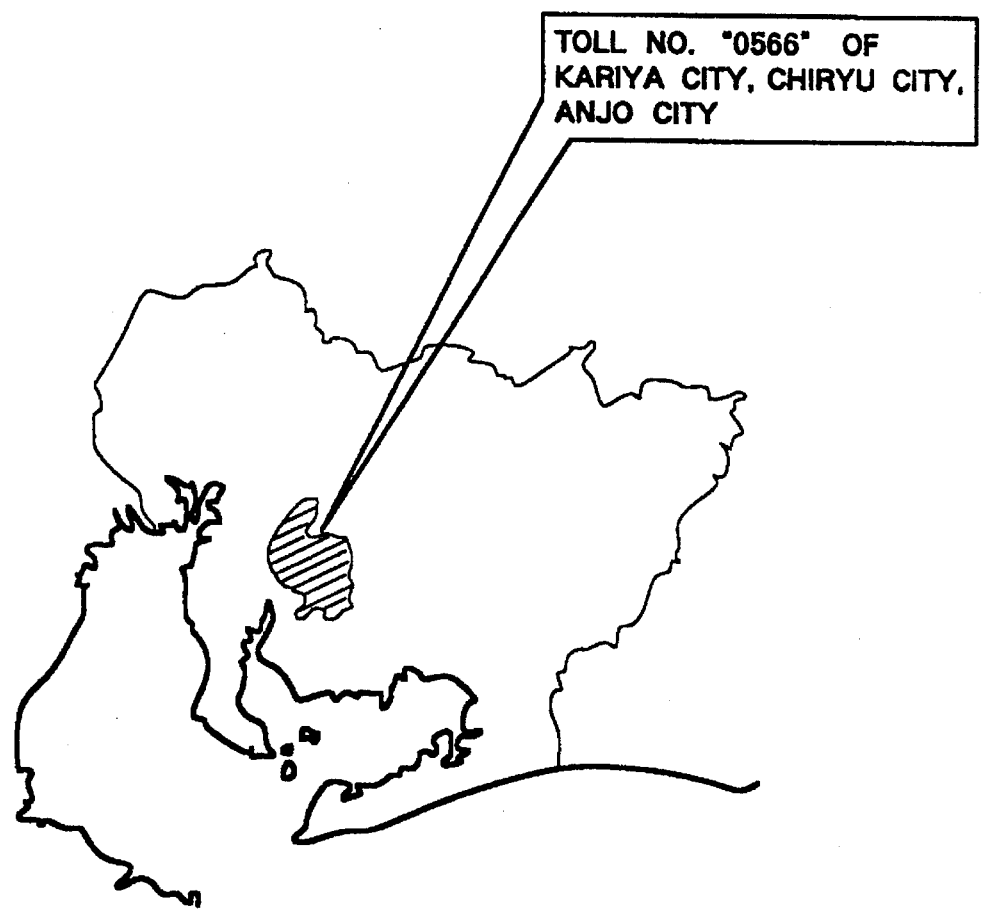
FIG. 39 is a diagram showing a map showing the area for a specific toll number.
Figure 40:
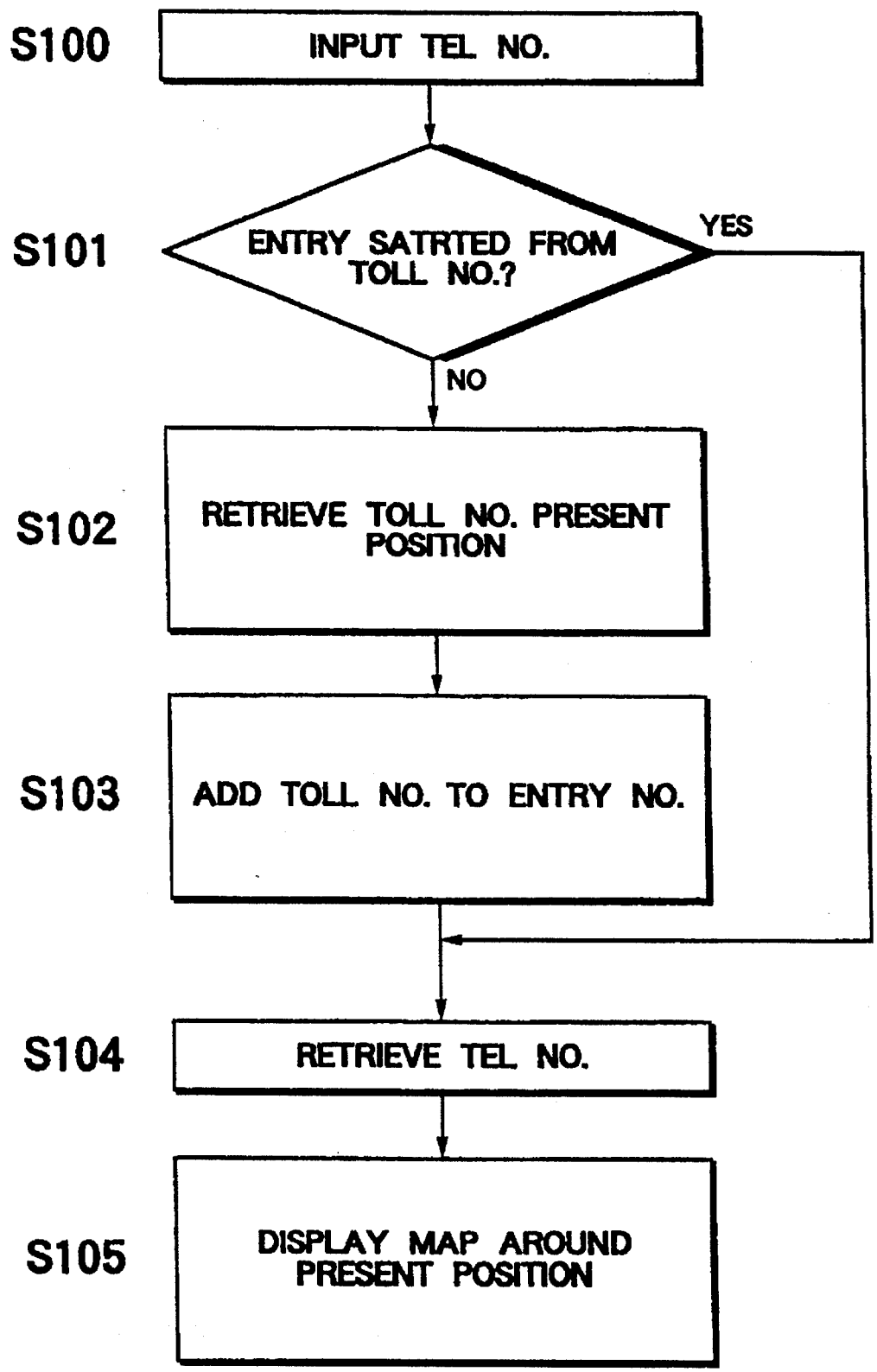
FIG. 40 is a flow chart of a routine for displaying a map of the vicinity around the present position.

A specific example of the display processing for a map of the vicinity of the present position according to the present embodiment will now be described with reference to FIG. 39 which shows a map displaying an area having a toll number of "0566" (which covers Kariya City, Chiryu City and Anjo City). FIG. 40 is a flow chart showing a routine for displaying a map for the vicinity around the present position.

If the "TEL NO. INPUT" key is selected in the destination setting screen, the telephone number inputting screen is opened, and the telephone number is inputted (at S100) according to the instruction of the message on the screen. It is decided (at S101) on the basis of the telephone number inputted whether or not the input is from the toll number. If the answer is YES, the map is retrieved by the telephone number. If, on the other hand, the input is from the local number, the toll number is retrieved from the present position (at S102). The input telephone number is added to the retrieved toll number (at S103), and the map is retrieved on the basis of the total telephone number (at S104). Then, the picture of the vicinity map of the retrieved point is processed and displayed on the display (at S105). In case the present position is located at Anjo City, for example, the telephone number "761111" is inputted. Then, after the toll number has been retrieved, the toll number "0566" for Anjo City is added so that the telephone number "0566761111" of the retrieved point is fixed. The map is retrieved on the basis of the telephone number. If this telephone number is registered, the map of the vicinity of the point is displayed.

As has been described hereinbefore, according to the present embodiment, the telephone number decision means decides whether or not the telephone number inputted by the telephone number inputting means includes a toll number. If the answer is NO, that is, if the telephone number is input as the local number, the toll number detecting means detects the toll number on the basis of the detected present position. Then, the total number adding means adds the toll number detected by the toll number detecting means to the telephone number inputted by the telephone number inputting means. The point vicinity map processing means retrieves the map on the basis of either the telephone number inputted or the toll number of the telephone number having the toll number added thereto and displays the retrieved map in the map display means. As a result, the map can be displayed by inputting the number from the local number to reduce the number of figures to be input and to widen the range for using the function of displaying a map from an input telephone number. When it is known that the toll number of the telephone number to be input is identical to the toll number of the present position, what is inputted is only the local number so that the number of inputting operations can be reduced. Moreover, since the toll number of the present position is displayed, it is known at the time of input. In case, on the other hand, the present position is in the vicinity of the boundary of the block of the toll number, a number different from the toll number to be input may possibly be added. However, the toll number obtained from the present position information is displayed in advance so that it can be known and easily input. Moreover, since the toll number obtained from the present position information is clearly displayed in the form of the toll number switch, it can be input by a single action, if it is identical to the toll number to be inputted, so that the number of inputting operations can be reduced.

What is claimed is:

1. A navigation system, comprising:

information storage means containing map data and telephone numbers and coordinates correlated with said telephone numbers in a listing;

telephone number input means for inputting a telephone number;

retrieval means for retrieving the coordinates from said listing in accordance with the telephone number inputted;

display means for displaying a map by reading the map data in accordance with the retrieved coordinates;

point setting means for manually setting a point, defined by positional coordinates, on the map displayed by said display means;

storage means for registering the telephone number inputted by said telephone number input means in correlation with the positional coordinates of the point set by said point setting means, in case it is decided by said retrieval means that said inputted telephone number is not in said information storage means, for future retrieval of said positional coordinates by said retrieval means upon subsequent input of the telephone number correlated with said positional coordinated; and point coordinate setting means for setting the positional coordinates set by said point setting means, as coordinates correlated with the input telephone number.

2. A navigation system comprising:

information storage means containing map data telephone numbers and coordinates correlated with said telephone numbers in a listing;

telephone number input means for inputting a telephone number inclusive of a toll number;

retrieval means for deciding if the input telephone number is stored in said information storage means and for retrieving the coordinates from said listing in accordance with the telephone number inputted, when said input telephone number is determined to be stored in said information storage means;

display means for displaying a map by reading the map data in accordance with the coordinates of a point predetermined to be representative of the toll number of said input telephone number, when it is decided by said retrieval means that said inputted telephone number is not in said information storage means;

point setting means for manually setting a point, defined by positional coordinates, on the map displayed by said display means;

storage means for registering the telephone number inputted by said telephone number input means in correlation with the positional coordinates of the point set by said point setting means for future retrieval of said positional coordinates by said retrieval means upon subsequent input of the telephone number correlated with said positional coordinates; and point coordinate setting means for setting the coordinates retrieved from said information storage means, when it is decided by said retrieval means that said inputted telephone number is in said information storage means, and for setting the positional coordinates set by said point setting means, as coordinates in correlation with the inputted telephone number when it is decided by said retrieval means that said inputted telephone number is not in said information storage means.

3. A navigation system comprising:

first information storage means containing stored map data for generating a map and telephone number data including telephone numbers and local exchange numbers, each telephone number being correlated with point data identifying a point on the map and each local exchange number being correlated with point data identifying a point representative of an area covered by said local exchange number;

telephone number input means for inputting a telephone number inclusive of a local exchange number;

point retrieval means for determining if an input telephone number is stored in said first information storage means, for retrieving point data correlated in storage with the input telephone number when said input telephone number is determined to be stored in said first information storage means and for retrieving point data for the point predetermined to be representative for the local exchange number when said input telephone number is determined not to be stored in said first information storage means;

display means for reading map data for an area around the point identified by the retrieved point data and for generating display of a map from the read map data;

point setting means for setting a point on the displayed map corresponding to an input telephone number; and second information storage means for registering the set point in correlation with the corresponding input telephone number, for future retrieval as said point data by said point retrieval means upon subsequent input of said corresponding input telephone number.

4. A navigation system according to claim 3, wherein said second information storage means includes: a prestored list of telephone numbers and positional coordinates corresponding to said telephone numbers; and a prestored list of positional coordinates to be correlated with the telephone numbers registered in said second information storage means.

5. A navigation system according to claims 4, wherein said second information storage means registers the telephone number inputted by said telephone number input means in correlation with the corresponding positional coordinates of the point set by said point setting means when it is decided by said retrieval means that said inputted telephone number is not in said list.

6. A navigation system according to claim 3 wherein said first information storage means is a non-programmable memory and said second information storage means is a programmable memory.

7. A navigation system according to claim 6 wherein said first information storage means is a CD-ROM.

8. A navigation system according to claim 6 wherein said programmable memory is a RAM.

9. A navigation system in accordance with claim 3 wherein said point retrieval means searches said first information storage means for said input telephone number and, if said input telephone number is not found in said first information storage means, then searches said second information storage means for said input telephone number and retrieves point data correlated with said input telephone number found in either said first or second information storage means.

10. A navigation system comprising:

first information storage means containing stored map data for generating a map;

telephone number input means for inputting a telephone number;

point retrieval means for determining if an input telephone number is prestored in said first information storage means and for retrieving point data correlated in storage with the input telephone number when said input telephone number is determined to be prestored;

display means for reading said stored map data and for generating display of a map from the read map data;

point setting means for setting a point on the displayed map corresponding to an input telephone number; and second information storage means for registering the set point in correlation with the corresponding input telephone number when said point retrieval means determines that said input telephone number is not prestored.

11. A navigation system according to claim 10, wherein said first and second information storage means are in a single memory device.

12. A navigation system according to claim 10, wherein said first information storage means is a first memory device containing the prestored telephone numbers and said second information storage means is a separate, second memory device containing the registered telephone numbers in correlation with the set points.

* * * * *

UNITED STATES PATENT AND TRADEMARK OFFICE
CERTIFICATE OF CORRECTION

PATENT NO. : 5,537,324
DATED : July 16, 1996
INVENTOR(S) : NIMURA et al

It is certified that error appears in the above-indentified patent and that said Letters Patent is hereby corrected as shown below:

Col. 9, line 52, "acre" should read --are--.

Col. 24, line 29, delete "coordinated" insert --coordinates--.

Signed and Sealed this

Seventeenth Day of June, 1997

Attest:

BRUCE LEHMAN

Attesting Officer

Commissioner of Patents and Trademarks